(12) United States Patent
Turner

(10) Patent No.: US 10,927,605 B2
(45) Date of Patent: *Feb. 23, 2021

(54) SYSTEM, APPARATUS AND METHOD FOR GUIDING A DRILL BIT BASED ON FORCES APPLIED TO A DRILL BIT

(71) Applicant: APS Technology, Inc., Wallingford, CT (US)

(72) Inventor: William Evans Turner, Durham, CT (US)

(73) Assignee: APS Technology, Inc., Wallingford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/410,650

(22) Filed: May 13, 2019

(65) Prior Publication Data
US 2019/0278239 A1 Sep. 12, 2019

Related U.S. Application Data

(63) Continuation of application No. 14/613,342, filed on Feb. 3, 2015, now Pat. No. 10,337,250.

(60) Provisional application No. 61/935,323, filed on Feb. 3, 2014.

(51) Int. Cl.
| | | |
|---|---|---|
| E21B 7/06 | (2006.01) |
| G05B 15/02 | (2006.01) |
| E21B 47/01 | (2012.01) |
| E21B 47/02 | (2006.01) |
| E21B 47/024 | (2006.01) |
| E21B 47/09 | (2012.01) |
| E21B 47/12 | (2012.01) |
| E21B 7/10 | (2006.01) |

(52) U.S. Cl.
CPC .............. *E21B 7/06* (2013.01); *E21B 7/062* (2013.01); *E21B 7/10* (2013.01); *E21B 47/01* (2013.01); *E21B 47/02* (2013.01); *E21B 47/024* (2013.01); *E21B 47/09* (2013.01); *E21B 47/12* (2013.01); *G05B 15/02* (2013.01)

(58) Field of Classification Search
CPC ..... E21B 7/04; E21B 7/06; E21B 7/10; E21B 47/01; E21B 47/02; E21B 47/024; E21B 47/09; E21B 47/12
See application file for complete search history.

(56) References Cited

U.S. PATENT DOCUMENTS

| | | | | |
|---|---|---|---|---|
| 4,445,578 A * | 5/1984 | Millheim | ................ | E21B 44/00 175/45 |
| 5,341,886 A * | 8/1994 | Patton | ....................... | E21B 7/04 175/24 |
| 5,386,724 A * | 2/1995 | Das | ..................... | E21B 47/0006 73/152.59 |
| 2006/0260843 A1* | 11/2006 | Cobern | ................. | E21B 47/024 175/45 |
| 2011/0024188 A1* | 2/2011 | Wassell | ............... | E21B 47/0006 175/40 |

* cited by examiner

*Primary Examiner* — Tara Schimpf

(74) *Attorney, Agent, or Firm* — Offit Kurman, P.A.; Gregory A. Grissett

(57) ABSTRACT

The present disclosure relates to a system, apparatus and method for guiding a drill bit based on forces applied to a drill bit, and drilling methods related to same.

15 Claims, 37 Drawing Sheets

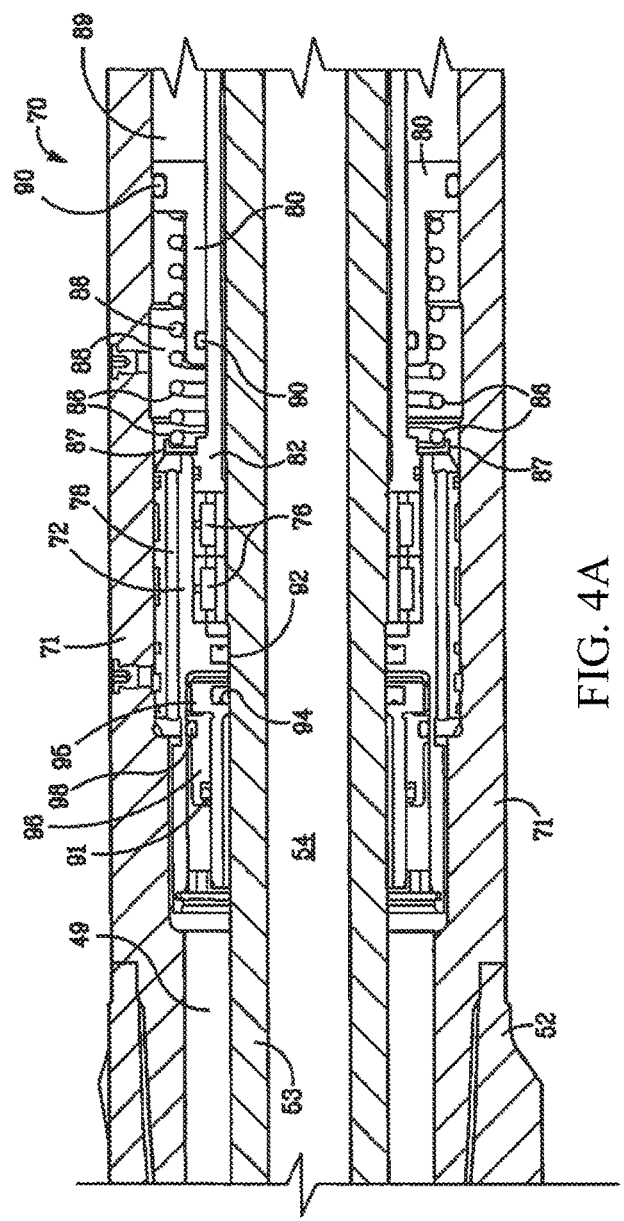
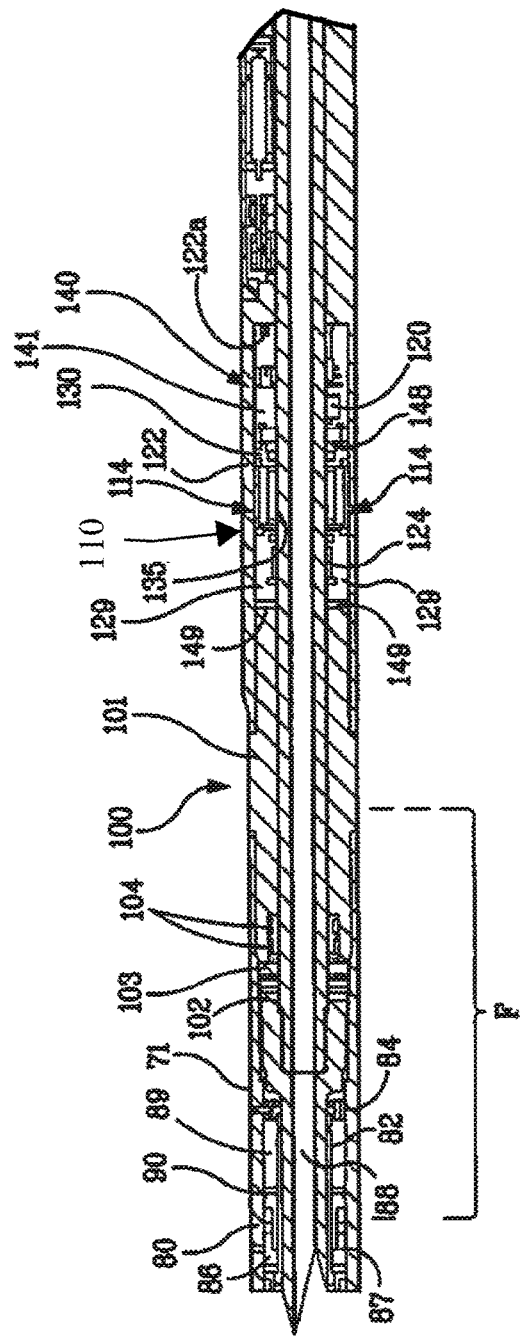
FIG. 4A
FIG. 5

SYSTEM, APPARATUS AND METHOD FOR GUIDING A DRILL BIT BASED ON FORCES APPLIED TO A DRILL BIT

CROSS-REFERENCE TO RELATED APPLICATION

The present application is a continuation of U.S. application Ser. No. 14/613,342, filed Feb. 3, 2015, which claims priority to and the benefit of U.S. Provisional Application No. 61/935,323, filed Feb. 3, 2014. The entire contents of each application listed in this paragraph are incorporated by reference into present application.

TECHNICAL FIELD

The present disclosure relates to a system, apparatus and method for guiding a drill bit based on forces applied to a drill bit, and drilling methods related to same.

BACKGROUND

Underground drilling, such as gas, oil, or geothermal drilling, generally involves drilling a wellbore through a formation deep in the earth. Such bores are formed by connecting a drill bit to long sections of pipe, referred to as a "drill pipe," so as to form an assembly commonly referred to as a "drill string." The drill string extends from the surface, to the bottom of the bore. The drill bit is rotated so that the drill bit advances into the earth, thereby forming the bore. In rotary drilling, the drill bit is rotated by rotating the drill string at the surface. Torque required to rotate the drill bit is generated above-ground, and is transferred to the drill bit by way of the drill string. Typical drilling systems use drilling mud pumped from the surface at high pressures through an internal passage in the drill string, and out through the drill bit. The drilling mud lubricates the drill bit and flushes cuttings from the path of the drill bit. The drilling mud then flows to the surface through an annular passage formed between the drill string and the surface of the bore. Drilling mud flowing through the internal passage can also be used to rotate the drill bit using what is referred as a mud motor. The mud motor is usually mounted in the drill string near the drill bit. The drill bit can be rotated by the mud motor alone, or by rotating the drill string while operating the mud motor.

Directional drilling refers to drilling systems configured to allow the drilling operator to direct the drill bit in a particular direction to reach a desired target that is located some distance vertically below the surface location of the drill rig and is also offset some distance horizontally from the surface location of the drill rig. Steerable systems use steering tools, such as bent tools, located downhole for directional drilling and are designed direct the drill bit in the direction of the bend. Rotary steerable (RS) systems use moveable arms that can be directed against the borehole wall as the drill string rotates to cause directional change of the drill bit. Finally, rotatory steerable motor (RSM) systems also use moveable arms that can be directed against the borehole wall to guide the drill bit. The more recently developed rotary steerable motor systems, unlike rotary steerable systems, use the downhole motor to operate the moveable arms and rotate the drill bit with or without drill string rotation. RS and RSM systems may help operators drill vertical wells with less tortuosity.

Many drilling systems today include instrumentation modules located downhole in the drill string. These modules include various sensors used to monitor relevant properties of the geological formation, direction and orientation of the various components of the drill string, and sometimes certain operational parameters drilling string, such as motor speed, WOB, vibration, etc. Based on the information obtained from the sensors, the drilling operator controls the drilling operation, and may in some cases elect to guide the drill string in a particular direction. In other words, rather than following a predetermined trajectory, the trajectory of the drill string can be adjusted in response to the properties of the underground formations encountered during the drilling operation using a technique referred to as "geosteering."

Boreholes deviate from the planned direction due to many factors, one of which is discontinuities in the formation being drilled due to fractures, canted formations, or other anomalies. These formation anomalies can apply a load to the drill bit which forces the drill bit off course. Drilling systems that include RS or RSM systems are used to apply forces on the drill string to reposition the drill bit in order bring the borehole back on course. Typically, instrumentation modules are located some distance back, or uphole, relative to drill bit. At times, the instrumentation module may as much as 60 feet uphole relative to the drill bit. Thus, during any deviation in drilling direction due to formation anomalies is not detected until the instrumentation module is aligned with onset of the borehole deviation. And while directional drilling systems, with or without drilling operator analysis and intervention, may be used to control the direction of the drill bit when a deviation is observed, the distance between the drill bit and the instrumentation module can create a lag-time between the time the deviation is observed and the time that corrective action is implemented. Directional drilling systems help control drilling direction but may not reduce all borehole deviations.

SUMMARY

Embodiments of the present disclosure include a guidance system comprising a force measurement system and steering module. The present disclosure includes method for guiding a drill bit carried by a drill string, the drill bit configured to define a borehole in an earthen formation during a drilling operation. The method comprises the steps of causing the drill bit to define the borehole in the earthen formation along a planned well path. The method includes obtaining, via at least one sensor assembly positioned proximate to or substantially aligned with a portion of a drill bit along a direction that is perpendicular to a central axis of the drill string, measurements indicative of one or more forces applied to the drill bit that has caused the drill bit to deviate off of the well path. Based on the measurements indicative of the one or more forces applied to the drill bit, the method includes guiding the drill bit in order to define the borehole along the planned well path.

Another embodiment is a method of measuring one or more forces applied on a drill bit of a drilling system configured to form a bore hole in an earthen formation. The method includes the step causing the drill bit to define the borehole in the earthen formation. The method also includes measuring, via at least one strain gauge carried by a drill string component adjacent to the drill bit, a magnitude of the one or more forces applied to the drill bit as the drill bit defines the borehole, a direction along which the one or more forces are applied the drill bit.

Another embodiment of the present disclosure is a method for assembling a drilling system that includes a drill string component and a drill bit configured to be coupled to the drill string component. The assembling method includes configuring at least one sensor carried by the drill string component to detect one or more forces applied to the drill bit during the drilling operation, and placing the at least one sensor in a pocket in the drill string component. The method includes configuring at least on controller to 1) determine if a direction of the drill bit has changed in response the one or more forces applied to the drill bit during the drilling operation, and 2) if the direction of the drill bit has changed in response to the one more forces, cause the redirection of the drill bit along a planned well path.

Another embodiment is a control system configured to guide a drill bit along a well path during a drilling operation. The control system includes at least one sensor configured to be carried by a drill string component adjacent to the drill bit, the at least one sensor configured to obtain measurements indicative of one or more forces applied to the drill bit during a drilling operation. The control system includes at least one communications module in communication with the at least one sensor, and at least one controller in communication with the at least one communications module. The at least one controller is configured to, in response to receipt measurements indicative of the one or more forces applied to the drill bit, determine 1) if the one or more forces applied to the drill bit has caused the drill bit to deviate from a planned well path, and 2) cause the redirection of the drill bit in a direction toward the planned well path.

Another embodiment of the present disclosure includes a measurement subassembly configured to couple to a drill bit. The measurement subassembly includes a subassembly body that extends along a central axis and includes an uphole portion and downhole portion spaced from the uphole portion along the central axis in a downhole direction, the downhole portion of the body defining a bit box configured to receive the drill bit. The measurement subassembly includes at least one sensor carried by the downhole portion, the at least one sensor configured to obtain measurements indicative of one or more forces applied on to the drill bit during a drilling operation and when the drill bit is coupled to the bit box.

BRIEF DESCRIPTION OF THE DRAWINGS

The foregoing summary, as well as the following detailed description of a preferred embodiment, are better understood when read in conjunction with the appended diagrammatic drawings. For the purpose of illustrating the invention, the drawings show an embodiment that is presently preferred. The invention is not limited, however, to the specific instrumentalities disclosed in the drawings. In the drawings:

FIG. 4A is a magnified cross-sectional view of the area of the designated "M" in FIG. 4;

FIG. 5 is a magnified cross-sectional view of the area of steering module of the drill sting component in FIG. 2, taken through the line "A-A";

DETAILED DESCRIPTION OF ILLUSTRATIVE EMBODIMENTS

Figure 1:
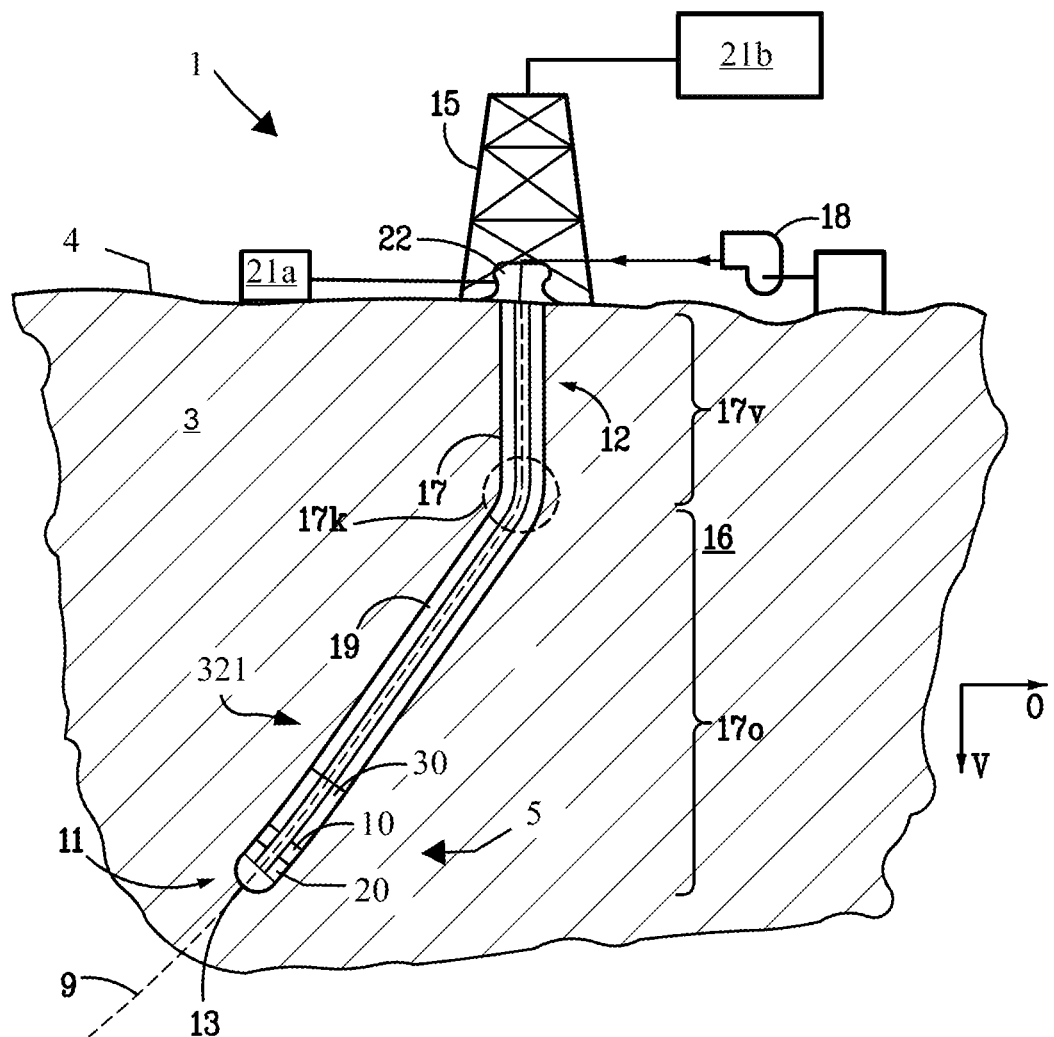
FIG. 1 is a side view of a drilling system with a drill string forming a bore in an earthen formation, and including a guidance system in accordance with an embodiment of the present disclosure.

Turning to FIG. 1, an embodiment of the present disclosure includes a guidance system 5 that can guide the direction of a drill bit 13 of a drilling system 1 during a drilling operation. In addition to guiding the overall direction of the drill bit 13 during the drilling operation, the guidance system 5 is configured to quickly correct deviations of the drill bit 13 off of a predetermined well path during a drilling operation. The guidance system 5 includes a steering module 10 that can alter the direction of the drill bit 13, and a force measurement system 20, that includes measurement subassembly (see 400 in FIG. 19 and 2000 in FIG. 37) coupled proximate or directly to the drill bit 13 and configured to obtain data indicative of forces applied to the drill bit 13 during. The steering module 10 and force measurement system 20 are described below.

Guidance systems and related methods in accordance with the present disclosure can minimize the extent of unplanned borehole deviations by correcting drill bit deviations before they significantly alter drilling direction. Furthermore, guidance systems and related methods as described further below can minimize lateral deviations of the drill bit 12 from a predetermined or planned well path. In one example, in the event a formation anomaly applies forces to the drill bit 13 that causes a deviation from a predetermined well path during drilling, the force measurement system 20 obtains data indicative of the magnitude and direction of forces applied to the drill bit. The force data is transmitted to the steering module 10. The steering module 10, in turn, guides the drill bit 13 back into alignment with the predetermined well path proximate in time to the deviation event. In typical systems, however, the distance between the drill bit 13 and instrumentation module would not result in drill bit correction until the instrumentation module actually observed the deviation, at which point the drill bit 13 would have been drilling in a direction offset from the predetermined well path for some time.

Embodiments of present disclosure can be used for underground drilling for oil and gas wells but or not limited to such wells. For instance, embodiments described herein can also be used for other drilling needs, such as drilling for waste disposal, such as nuclear waste disposal. In at least one example, embodiments described herein can be used to drill boreholes or wells that extending substantially vertically from the surface of the formation. And in some cases, waste disposal wells can be drilled without a substantial deviation from off of vertical.

Continuing with FIG. 1, the drilling system 1 includes a drill string 12 with a drill bit 13 coupled to downhole end of the drill string 12. The drill string causes the drill bit 13 to drill the borehole 17 in an earthen formation 3 with a vertical section 17v and in some cases an offset section 17o that extends along the borehole axis 9. The borehole 17 can extend along a vertical direction V in section 17v to the kickoff point 17k. From kickoff point 17k, the borehole 17 extends along an offset direction O in section 17o. The offset direction O is angularly offset from the vertical direction V and may include a horizontal direction (not shown) that is mostly perpendicular to the vertical direction V to be aligned with or parallel to the surface 4. Further, the offset direction O can extend along any direction that is perpendicular to the vertical direction V, for instance north, east, south, and west, as well as any incremental direction between north, east, south, and west. It should be appreciated that all or a portion of the borehole 17 can be angularly offset with respect to the vertical direction V along the offset direction O. The terms "vertical" and "offset" and as used herein are as understood in the drilling field, and are therefore approximations. While a directional drilling configuration is shown, the system can be used with vertical drilling operations and is similarly beneficial in vertical drilling that forms substantially a vertical borehole that extends substantially in the vertical direction V. Furthermore, downhole or downhole location means a location closer to the bottom end (not numbered) of the borehole 17 than the formation surface. Accordingly, the downhole direction refers to the direction from the surface toward a bottom end (not numbered) of the borehole, while an uphole direction refers the direction from the bottom end of the borehole toward the surface.

Figure 2:
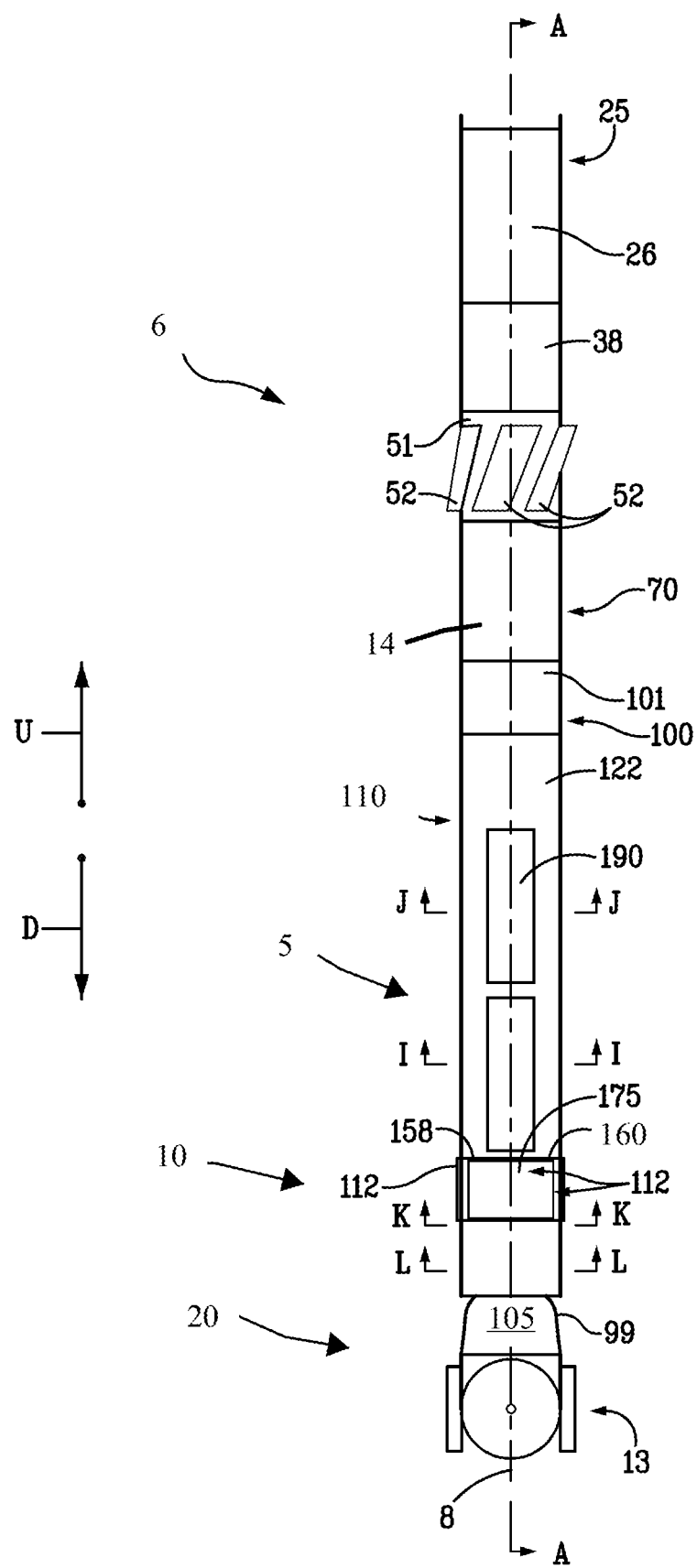
FIG. 2 is a side view a drill string component including the guidance system shown in FIG. 1.

As can be seen in FIG. 1, the drilling system 1 includes a drilling rig 15 and a drill string 12 supported by the rig 15 at the surface 4 to the drill bit 13. The drill string 12 is elongate along a central axis 9 and extends from uphole end (not numbered) to a downhole end (not numbered) along axis 9 in a downhole direction D (FIG. 2). The drill string 12 is formed from relatively long sections of drill pipe connected together during make-up as is known in the art. The length of the drill string 12 is increased as the drill bit 13 progresses deeper into the earth formation 16 by connecting additional sections of drill pipe to drill string 12.

Continuing with FIG. 1, in operation, the drilling system 1 is configured to rotate the drill bit 13 thereby causing the drill bit 13 to cut into the formation 16. The drill bit 13 is rotated, in part, by the drill string 12, which is rotated by a motor 21a located at the drilling rig 15. Drilling torque can be transmitted from the motor 21a to the drill bit 13 through a turntable 22, a kelly (not shown), and the drill string 12. The rotating drill bit 13 advances into the earth formation 16, thereby forming the borehole 17 along a well path. In one embodiment, the drill bit 13 may have side-cutting ability. During drilling, drilling mud M is pumped from the surface, through the drill string 12, and out of the drill bit 13. The drilling mud M is circulated by a pump 18 located on the surface 4. The drilling mud, upon exiting the drill bit 13, returns to the surface 4 by way of an annular passage 19 formed between the outer surface of the drill string 12 and the surface of the borehole 17. Operation of drilling system 1 can be controlled in response to operator inputs via a surface control system 21b.

Turning to FIGS. 1 and 2, the drilling system 1 also includes a bottom hole assembly (BHA) 11 that forms the down-hole portion of the drill string 12 and drill bit 12. The bottom hole assembly 11 can include one or more drill string components that support a MWD or LWD tool 30 and the guidance system 5. In one example, a drill string component 6 (FIG. 2) includes the guidance system 5, as further detailed below. Typically, the bottom hole assembly 11 is formed a section of a heaver pipe referred to as drill collars 14. The drill collars 14 add weight to the drill string 12 and help attain the desired weight-on-bit (WOB) during drilling.

The MWD tool 30 is configured to obtain data concerning the formation of positions of the BHA 11 during drilling. As shown, the MWD tool 30 is located up-hole of the steering module 10 and force measurement system 20. The MWD tool 30 includes a mud-pulse telemetry system 320 (see FIGS. 1 and 17), a controller 322, a pulser 323, a pressure pulsation sensor 324, and a flow switch, or switching device 326, as well as multiple sensors 330, 332 and a signal processor 334. The telemetry system 320, as discussed below, can facilitate communication between the bottom hole assembly 11 and the surface control system. The MWD tool 30 also includes a short-hop telemetry device 336 that facilitates communication with the steering module 10 by way of short-range radio telemetry. The MWD sensors may include three magnetometers 330 for measuring azimuth about three orthogonal axes, and three accelerometers 332 for measuring inclination about the three orthogonal axes. The MWD tool 30 includes a signal processor 334 (see FIG. 17). The signal processor 334 can process the measurements obtained from the magnetometers 330 and the accelerometers 332 to determine the angular orientation of a fixed reference point on the circumference of the drill string 12 in relation to a reference point on the bore 17. (The reference point is typically north in a vertical well, or the high side of the bore in an inclined well.) This orientation is typically referred to as "tool face," or "tool face angle."

FIG. 2 illustrates drill string component 6 and guidance system 5 coupled to the drill bit 13. More specifically, the drill string component 6 houses the steering module 10 and the force measurement system 20. Details concerning embodiment of the steering module 10 will be described next. The steering module 10 can be any module, device, or system that is configured to alter the direction of the drill string 12 and drill bit 13 during a drilling operation. For instance, the steering module 10 can be a rotary steerable (RS) system, a rotary steerable motor (RSM) system, a steerable motor, or an adjustable bit housing assembly. In accordance with the embodiment illustrated, the steering module 10 is a rotary steerable motor (RSM) system. FIGS. 2-17 illustrate an RSM type steering module 10 according to one embodiment of the present disclosure. While details concerning operation of the RSM module 10 will be described next, it should be appreciated that other types of steering modules can be used with force measurement system 20.

Continuing with FIG. 2, the RSM module 10 comprises a drilling motor 25 and a guidance module 110 that includes moveable arms 112 that selectively extend outwardly (or are activated) to apply a force to the borehole wall in order to guide the direction of the drill string 12. The guidance module 110 operates with or without rotation of the drill string 12.

Figure 3:
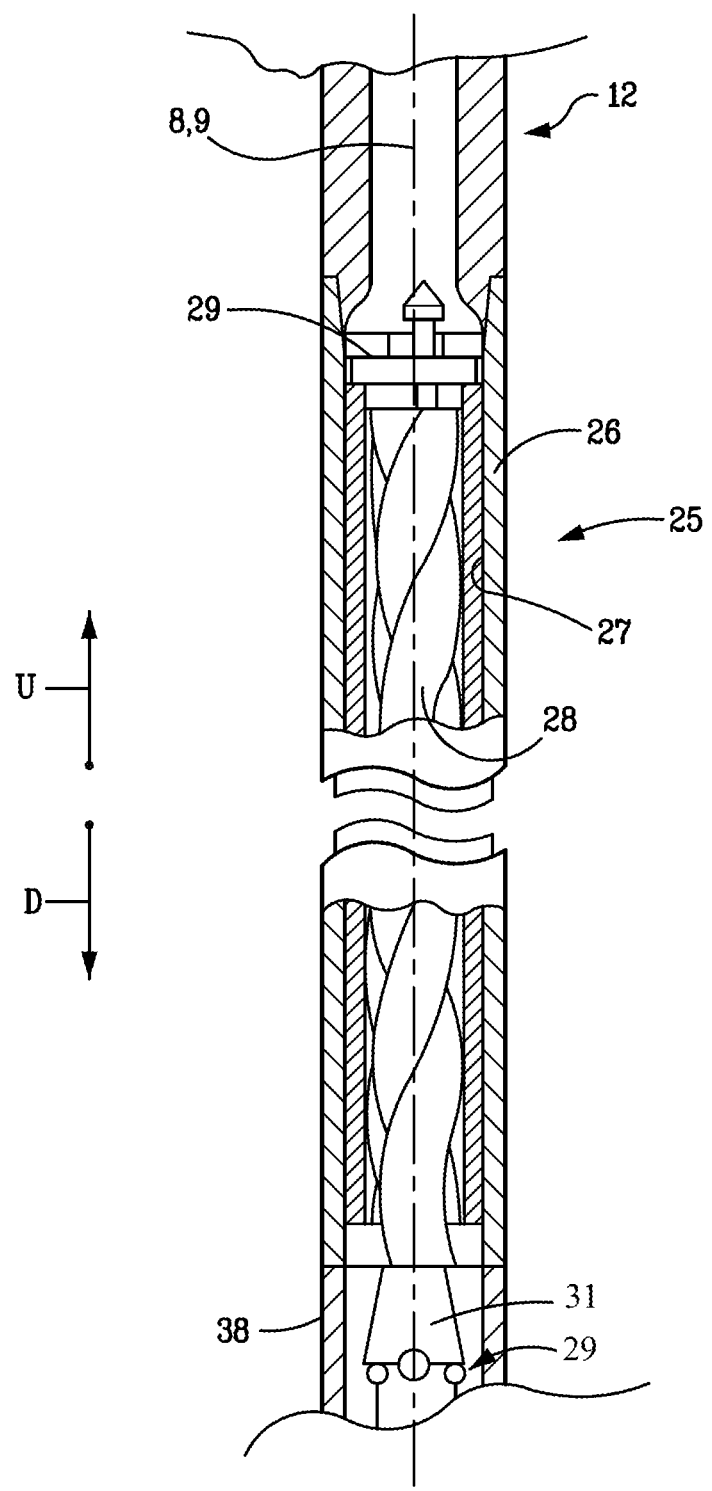
FIG. 3 is a magnified cross-sectional view of a drilling motor shown FIG. 2, taken through the line "A-A"

As shown in FIG. 3, the RSM module 10 includes the drilling motor 25 coupled to a drive shaft assembly 31. The drilling motor 25 can be a helicoidal positive-displacement pump, sometimes referred to as a Moineau-type pump. The drilling motor 25 includes a housing 26, and a stator 27 mounted on an interior surface of the housing 26. The drilling motor 25 also includes a rotor 28 supported for rotation within the stator 27. The housing 26 is secured to the section of drill pipe immediately up-hole of the drilling motor 25 by a suitable means such as a threaded connection, so that the housing 26 rotates with the drill pipe. The housing 26 therefore forms part of the drill collar 14. During operation of the drilling motor 25, drilling mud at bore pressure is forced between the rotor 28 and the stator 27. The stator 27 and the rotor 28 are shaped so that the movement of the drilling mud therethrough imparts rotation to the rotor 28 in relation to the stator 27. In other words, the rotor 28 extracts hydraulic energy from the flow of drilling mud, and converts the hydraulic energy into mechanical energy. As the housing 26 forms part of the drill collar 14, the rotational speed of the drill collar 14 is superimposed on the rotational speed of the rotor 28 induced by the flow of drilling mud. The drive shaft assembly 31 and the drill bit 13 are coupled to the rotor 28 so that the rotation of the rotor 28 is imparted to the drive shaft 31 and the drill bit 13. As noted above, a suitable drilling motor 25 can be Moineau-type pump. Other types of pumps and motors, including pumps driven by an electric motor, can be used as the drilling motor 25 in alternative embodiments.

Figure 4:
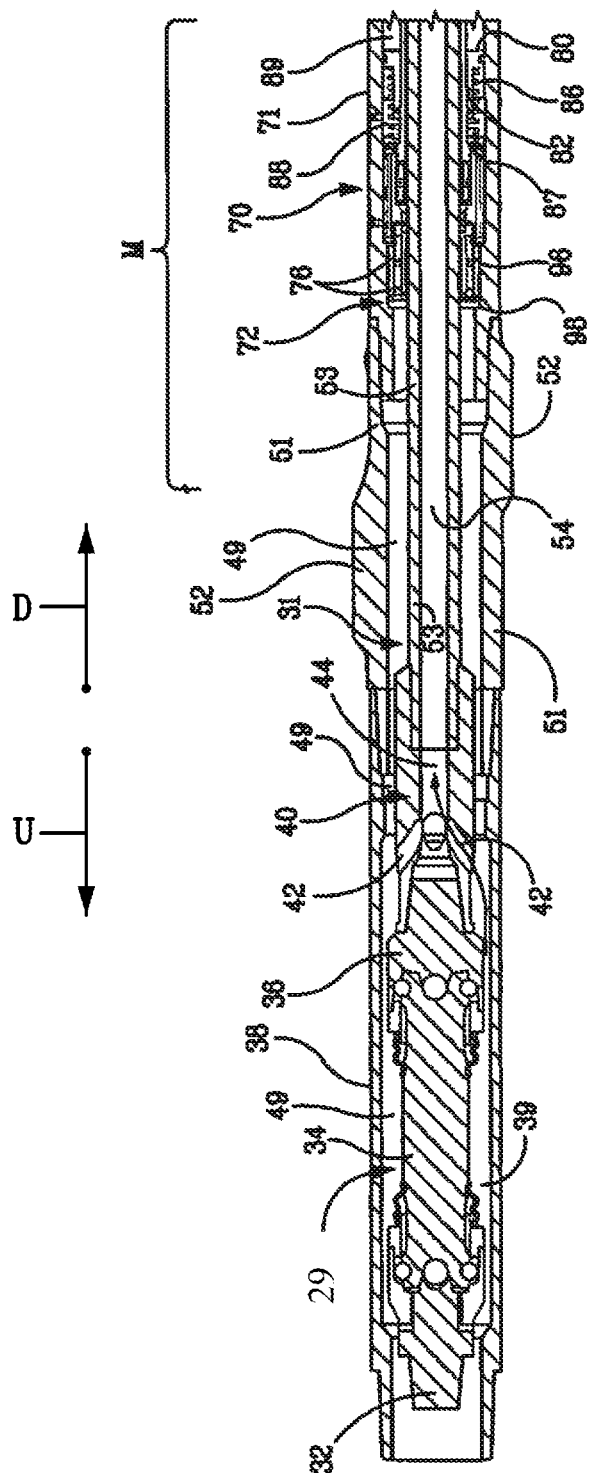
FIG. 4 is a magnified cross-sectional view of the drill string component just downhole of the drilling motor in FIG. 2, taken through the line "A-A"

As shown in FIGS. 3 and 4, the RSM module 10 also comprises a flexible coupling 29 that connects the up-hole end of the drive-shaft assembly 31 to the rotor 28 of the drilling motor 25. The downhole end of the drive-shaft assembly 31 (shown best in FIGS. 6 and 8) defines a bit box 105 that is configured to be connected to the drill bit 13. The bit box 105 can define a measurement sub assembly 400 that supports on or more components of the force measurement system 20. The flexible coupling 29 and the drive-shaft assembly 31 transfer the rotational motion of the rotor 28 of the drilling motor 25 to the drill bit 13.

Turning to FIG. 4, 5, the flexible coupling 29 comprises a first universal joint 32, a rigid shaft 34, and a second universal joint 36 (see FIGS. 3 and 4). The flexible coupling 29 is positioned within a housing 38. The housing 38 is secured to the housing 26 of the drilling motor by a suitable means such as a threaded connection, so that the housing 38 rotates with the housing 26. The housing 38 thus forms part of the drill collar 14. The first universal joint 32 is secured to the rotor 28 of the drilling motor 25 by a suitable means such as a threaded connection, so that the first universal joint rotates with the rotor 28. The first universal joint 32 is coupled to the shaft 34 so that the rotor 28 can pivot in relation to the shaft 34. The second universal joint 36 is secured to a diverter 40 by a suitable means, such as a threaded connection, so that the diverter 40 rotates with the second universal joint 36. Furthermore, the second universal joint 36 is coupled to the shaft 34 so that the second universal joint 36 and the diverter 40 can pivot in relation to the shaft 34. Thus, the flexible coupling 29 is configured to transfer rotational motion between the rotor 28 of the drilling motor 25 and the diverter 40. The flexible coupling 29 can act as a constant-velocity joint that can facilitate rotation of the rotor 28 and the diverter 40 when the rotational axes of the rotor 28 and the diverter 40 are misaligned. In addition, the housing 38 and the flexible coupling 29 define a passage 39. The passage 39 receives drilling mud exiting the drilling motor 25 at bore pressure, and facilitates the flow of drilling mud past the flexible coupling 29.

Continuing with FIG. 4, the diverter 40 forms the up-hole end of the drive shaft assembly 31. As illustrated, the diverter 40 has four passages 42 defined therein (only two of the passages 42 are visible in FIG. 4). Each passage 42 is angled so that the passages 42 extend inward toward the centerline of the diverter 40. An up-hole end of each passage 42 adjoins the passage 39 and the down-hole end of each passage 42 adjoins a centrally located passage 44 formed in the diverter 40. The passages 42, 44 facilitate the flow of drilling mud through the diverter 40. In particular, a portion of the drilling mud flowing past the flexible coupling 29 is diverted into the passage 44. The remaining drilling mud, at bore pressure, fills an internal volume 49 defined, in part, by an inner surface of the housing 38, and an outer surface of the diverter 40.

The RSM module 10 also comprises a stabilizer that includes a body 51 and three stabilizer blades 52 that project outward from the body 51. An up-hole end of the body 51 is secured to the housing 38 by a suitable means such as a threaded connection, so that the stabilizer blades 52 rotate with the housing 38. The blades 52 preferably are arranged in a helical pattern and extend outwardly distance so that the maximum diameter of the stabilizer blades 52 is slightly smaller than the diameter of the bore 17. Contact between the blades 52 and the surface of the bore 17 helps to center the RSM module 10 within the bore 17. Alternative embodiments of the stabilizer can include more or less than three of the blades 52.

Continuing with FIG. 4, the RSM module drive shaft assembly 31 also includes an upper drive shaft 53. The upper drive shaft 53 is secured to the diverter 40 by a suitable means such as a threaded connection, so that the upper drive shaft 53 rotates with the diverter 40. The upper drive shaft 53 extends through the stabilizer. An outer surface of the upper drive shaft 53 and an inner surface of the stabilizer body 51 further define the internal volume 49. The upper drive shaft 53 has a centrally-located passage 54 formed therein. The passage 54 adjoins the passage 44 of the diverter 40. The passage 54 receives the drilling mud from the passage 44, and permits the drilling mud to pass downhole through the upper drive shaft 53.

Turning to FIGS. 4 and 4A, the RSM module 10 also comprises a compensation and upper seal bearing pack assembly 70. The assembly 70 comprises a housing 71 secured to the body 51 of the stabilizer by a suitable means such as a threaded connection, so that the housing 71 rotates with the stabilizer 502. The upper drive shaft 53 extends through the assembly 70. The assembly 70 also comprises a bearing support 72 positioned within the housing 71 (see FIG. 4A). The bearing support 72 is secured to the housing 71 by a suitable means such as fasteners. Two needle roller bearings 76 are mounted on the bearing support 72. The bearings 76 substantially center the upper drive shaft 53 within the housing 71, while facilitating rotation of the upper drive shaft 53 in relation to the housing 71. The bearing support 72 has a plurality of circumferentially-spaced, axially-extending passages 78 formed therein. The passages 78 facilitate the flow of drilling mud through the bearing support 72. The drilling mud reaches the passages 78 by way of an annulus formed between the up-hole end of the bearing support 72, and an inner circumference of the housing 71.

The assembly 70 also comprises a piston 80, and a piston shaft 82. An up-hole end of the piston shaft 82 is positioned within the bearing support 72. A down-hole end of the piston shaft 82 is supported by a mounting ring 84 secured to an inner circumference of the housing 71 (see FIG. 5). The piston 80 is disposed around the piston shaft 82, so that the piston 80 can translate in the axial direction in relation to the piston shaft 82. The assembly 70 also comprises a spring 86a positioned around the piston shaft 82. The spring 86a contacts an up-hole end of the piston 80, and a spring retainer 87 disposed around the piston shaft 82 (see FIG. 4A). The spring retainer 87 abuts the bearing support 72 and the piston shaft 82. The spring 86a biases the piston 80 in the down-hole direction.

Turning to FIGS. 4A and 5, the assembly 70 defines an internal volume 88 uphole relative to the piston 80 and a downhole volume 89 downhole relative to the piston 80. The volume 88 receives drilling mud, at bore pressure, from the volume 49 by way of the passages 78 formed in the bearing support 72. Because the piston 80 defines the down-hole end of the internal volume 88, the up-hole face of the piston 80 therefore is exposed to drilling mud at annulus pressure.

As shown in FIGS. 4A and 5, housing 71, the piston shaft 83, the upper drive shaft 53, and the down-hole end of the piston 80 define the internal volume 89 downhole of the piston 80 (see FIGS. 4A and 5). The volume 89 is filled with oil, and forms part of a first hydraulic circuit within the RSM module 10. The down-hole face of the piston 80 therefore is exposed to the oil in the first hydraulic circuit. O-ring seals 90 are positioned around the inner and outer circumference of piston 80 substantially isolate the volume 89 from the volume 88, and thereby reduce the potential for contamination of the oil by the drilling mud. The oil can be a suitable high-temperature, low compressibility oil. The oil, as discussed below, functions as a lubricant, a hydraulic fluid, and an oil. The bearings 76 are wetted by oil from the volume 88. The oil reaches the bearings 76 by way of an annulus formed between the inner circumference of the piston shaft 82, and the upper drive shaft 53. The annulus and the wetted volume around the bearings 76 form part of the first hydraulic circuit.

The piston 80 can move axially in relation to the piston shaft 82. The piston 80 therefore can raise or lower the pressure of the oil in the volume 89, in response a pressure differential between the drilling mud and the oil. In particular, the combined force of the drilling mud and the spring 86a on the piston 80 urges the piston 80 in the down-hole direction, thereby increasing the pressure of the oil, until the force of the oil on the piston 80 is approximately equal to the combined, opposing force of the drilling mud and the spring 86a on the piston 80. The additional force provided by the spring 86a helps to ensure that the pressure of the oil in the first hydraulic circuit is higher than the pressure of the drilling mud, thereby reducing the potential for infiltration of the drilling mud into the oil.

The pressure of the drilling mud can vary with the depth of the RSM module 10 within the bore 17. The piston 80 causes the pressure of the oil in the first hydraulic circuit to vary proportionately with changes in the pressure of the drilling mud, so that the pressure of the oil remains higher than the pressure of the drilling mud. In other words, the piston 80 compensates for variations in the pressure of the drilling mud during drilling operations.

The assembly 70 also comprises a first and a second seal 92, 94. The first and second seals 92, 94 can be, for example, rotary shaft lip seals or rotary shaft face seals. The first and second seals 92, 94 are positioned around the upper drive shaft 53 (see FIG. 4A). The first seal 92 is located within an annulus formed in the bearing support 72. A down-hole end of the first seal 92 is exposed to the oil used to lubricate the bearings 76, i.e., the oil in the first hydraulic circuit. An up-hole end of the first seal 92 is exposed to oil contained within a second hydraulic circuit. The first seal 92 substantially isolates the oil in the first hydraulic circuit from the oil in the second hydraulic circuit. The oil in the second hydraulic circuit, while isolated from the oil in the first hydraulic circuit, can be the same type of oil used in the first hydraulic circuit. The second seal 94 is located within an annulus formed in a seal housing 95. The seal housing 95 is positioned within the bearing support 72. A down-hole end of the second seal 94 is exposed to the oil in the second hydraulic circuit. An up-hole end of the second seal 94 is exposed to drilling mud. The second seal 94 substantially isolates the oil from the drilling mud.

A second piston 96 is positioned around the seal housing 95, so that the piston 96 can translate axially in relation to the seal housing 95. A down-hole face of the piston 96 is exposed to the oil in the second hydraulic circuit. An up-hole face of the piston 96 is exposed to drilling mud, at bore pressure, in the volume 49. O-ring seals 98 are positioned around the inner and outer circumference of piston 96 and substantially isolate the oil from the drilling mud, and thereby reduce the potential for contamination of the oil by the drilling mud. The pressurization of the oil in the second hydraulic circuit by the piston 96 substantially equalizes the pressure across the second seal 94. Equalizing the pressure across the second seal 94 can discourage infiltration of the drilling mud into the second hydraulic circuit, and can reduce the rate of wear of the second seal 94 resulting from by contact with the upper drive shaft 53. The pressurization of the oil in the second hydraulic circuit by the piston 96 also substantially equalizes the pressure across the first seal 92, potentially reducing the rate of wear of the first seal 92 resulting from by contact with the upper drive shaft 53.

Figure 6:
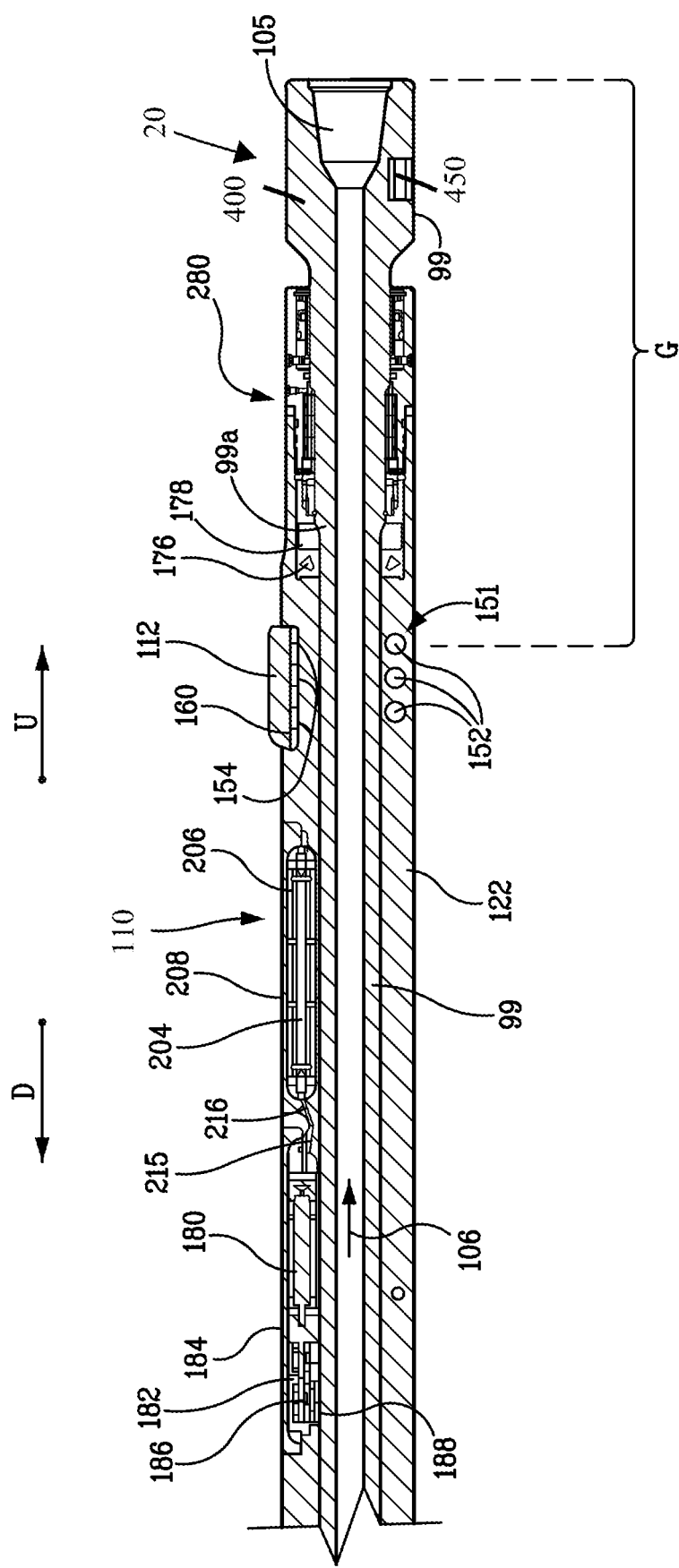
FIG. 6 is a magnified cross-sectional view of a downhole portion and bit box of the drill string component in FIG. 2, taken through the line "A-A"
Figure 7:
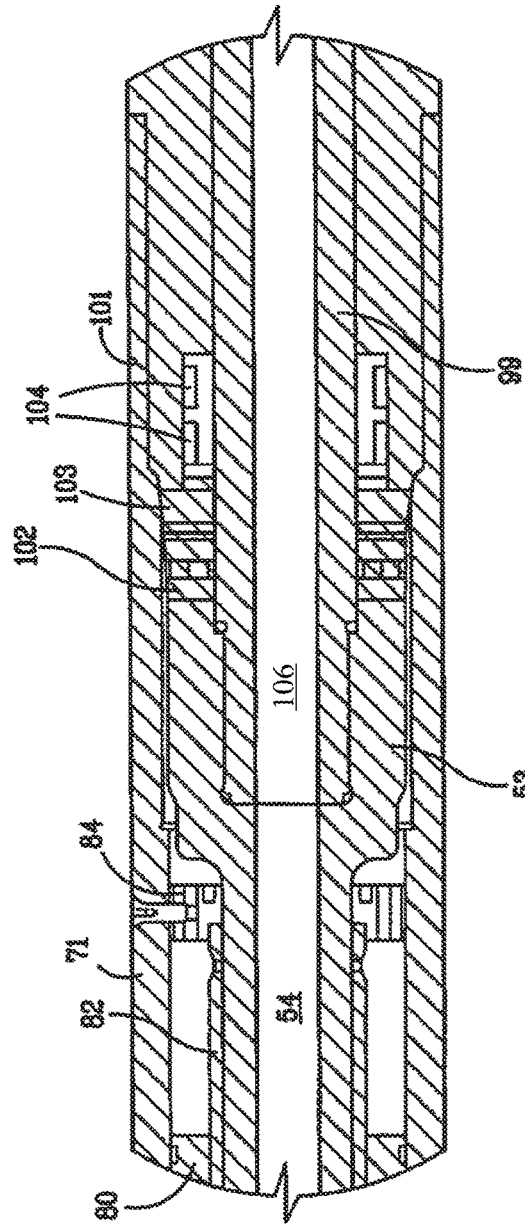
FIG. 7 is a magnified cross-sectional view of the area designated "F" in FIG. 5.

As shown in FIG. 6, the RSM module 110, and in particular the drive shaft assembly 31, further comprises a lower drive shaft 99. The up-hole end of the lower drive shaft 99 is secured to the down-hole end of the upper drive shaft 53 by a suitable means such as a threaded connection, so that the lower drive shaft 99 rotates with the upper drive shaft 53. The downhole end of the shaft 99 defines the bit box 105 into which the drill bit 13 is mounted. Thus, drilling torque therefore is transferred from the drilling motor 25 to the drill bit 13 by way of the diverter 40, the upper drive shaft 53, and the lower drive shaft 99. The lower drive shaft 99 has a centrally-located passage 1061 formed therein. The passage 1061 adjoins the passage 54 of the upper drive shaft 53. The passage 1061 receives the drilling mud from the passage 54, and directs the drilling mud to pass down-hole to the drill bit 13.

The lower drive shaft 99 may be referred to as a measurement subassembly 400. The measurement assembly 400 can include the bit box 105 and portions of the force measurement system 20. More specifically, in FIGS. 6, 8 and 19, the bit box 105 can include one or more sensors 450 carried in a respective number of pockets or recess, communications module (not shown), and a power source (not shown), as further discussed below.

Turning back to FIG. 5, the RSM module 10 further comprises a crossover subassembly 100. The crossover subassembly 100 includes a housing 101. An up-hole end of the housing 101 is secured to the housing 71 of the assembly 70 by a suitable means such as a threaded connection, so that the housing 101 rotates with the housing 71. The housing 101 thus forms part of the drill collar 14. The lower drive shaft 99 extends through the housing 101. The crossover subassembly 100 also comprises a thrust bearing 102, and a spacer 103 located immediately down-hole of the bearing 102 (see FIGS. 5 and 7). The bearing 102 and the spacer 103 are positioned around the lower drive shaft 99, between the down-hole end of the upper drive shaft 53 and the up-hole end of the housing 101. The bearing 102 supports the lower drive shaft 99 and the drill bit 13 by way of the spacer 103 and the housing 101, as the drill string 12 is raised and lowered within the bore 17. The bearing 102 and the spacer 103 are sized so that an axial clearance exists between the bearing 102 and the spacer 103 during drilling operations. The bearing 102 therefore is unloaded as the drill string 12 is urged in the down-hole direction during drilling operations. The crossover subassembly 100 also includes two needle roller bearings 104 positioned around the lower drive shaft 99, between the spacer 103 and the housing 101. The bearings 104 substantially center the lower drive shaft 99 within the housing 101, while facilitating rotation of the lower drive shaft 99 in relation to the housing 101. The bearings 104 are lubricated by the oil in the first hydraulic circuit. The oil reaches the bearing 104 by way of various passages and clearances within the crossover subassembly 100 and other components of the RSM module 10.

The RSM module 10 further includes a guidance module 110.). The guidance module 110 can guide the drill bit 13 in a direction coinciding with a desired direction of the bore 17 at a particular location in the earth formation 16. The guidance module 110 comprises three actuating arms 112 that extend and retract on a selective basis to push the drill bit 13 in a desired direction (see FIGS. 3, 1, and 12-15). The actuating arms 112 are actuated by oil contained in a third hydraulic circuit within the RSM module 10. The extension and retraction of the actuating arms 112, however, is controlled by a microprocessor-based controller 1118, and three electro-hydraulic valves 120 that direct the oil toward a respective one of the actuating arms 112 in response to commands from the controller 1118 (see FIGS. 9, 10A-10E, 16, and 17).

The guidance module 110 also includes a housing 122 secured to the housing 101 of the crossover assembly 100 by a suitable means, such as a threaded connection. The guidance module 110 includes two needle roller bearings 124 positioned around the lower drive shaft 99 (see FIG. 5). The bearings 124 substantially center the lower drive shaft 99 within the housing 122, while facilitating rotation of the lower drive shaft 99 in relation to the housing 122. The bearings 124 are lubricated by the oil in the first hydraulic circuit. The oil reaches the bearing 124 by way of various passages and clearances within the guidance module 110 and the crossover subassembly 100.

The guidance module 110 includes a pump 114 configured to increase the pressure of the oil to a level suitable for forcing the actuating arms 112 against the surface of the bore 17. As illustrated, the pump 114 is positioned immediately downhole of the bearing housing 126. The pump 114 preferably is a hydraulic vane pump. The pump 114 comprises a stator 127, and a rotor 128 disposed concentrically within the stator 127 (see FIGS. 11A and 11B). The pump 114 also comprises a bearing seal housing 129 secured to a downhole end of the stator 127, and a manifold 130 secured to an up-hole end of the stator 127. The bearings 124 are disposed concentrically within the bearing seal housing 129. The manifold 130 has three inlet ports 131a, and three outlet ports 131b formed therein. Oil from within the third hydraulic circuit enters the hydraulic pump 114 by way of the inlet ports 131a. The oil in the third hydraulic circuit, while isolated from the oil in the first and second hydraulic circuits, can be the same type of oil used in the first and second hydraulic circuits. (Other types of fluids can be used in the third hydraulic circuit, in the alternative.) The lower drive shaft 99 extends through the pump 114 so that the housing 122, the pump 114, and the lower drive shaft 99 are substantially concentric. The stator 127, bearing seal housing 129, and manifold 130 of the pump 114 are restrained from rotating in relation to the housing 122, as discussed below.

The pump rotor 128 is rotated in relation to the stator 127 by the drive shaft 99, as discussed below. Spring-loaded vanes 132 are disposed in radial grooves 133 formed in the rotor 128. Three cam lobes 134 are positioned around the inner circumference of the stator 127. The cam lobes 134 contact the vanes 132 as the rotor 128 rotates within the stator 127. The shape of the cam lobes 134, in conjunction with the spring force on the vanes 132, causes the vanes 132 to retract and extend into and out of the grooves 133. Each vane 132 moves radially outward as the vane 132 rotates past the inlet ports 131a, due to the shape of the cam lobes 134 and the spring force on the vane 132. This movement generates a suction force that draws oil through the inlet ports 131a, and into an area between the rotor 128 and the stator 127. Further movement of the vane 132 sweeps the oil in the clockwise direction, toward the next cam lobe 134 and outlet port 131b (from the perspective of FIG. 11B). The profile of the cam lobe 134 reduces the area between the rotor 128 and the stator 127 as the oil is swept toward the outlet port 131b, and thereby raises the pressure of the oil. The pressurized oil is forced out of pump 114 by way of the outlet port 131b.

The use of a hydraulic vane pump such as the pump 114 is described for exemplary purposes only. Other types of hydraulic pumps that can tolerate the temperatures, pressures, and vibrations typically encountered in a down-hole drilling environment can be used in the alternative. For example, the pump 114 can be an axial piston pump in alternative embodiments.

The pump 114 is driven by the lower drive shaft 99. In particular, the portion of the lower drive shaft 99 located within the rotor 128 preferably has splines 135 formed around an outer circumference thereof. The spines 135 extend substantially in the axial direction. The splines 135 engage complementary splines 136 formed on the rotor 128, so that rotation of the lower drive shaft 99 in relation to the housing 122 imparts a corresponding rotation to the rotor 128 (see FIGS. 5 and 11A). The use of the axially-oriented spines 135, 136 facilitates a limited degree of relative movement between lower drive shaft 99 and the rotor 128 in the axial direction. This movement can result from factors such as differential thermal deflection, mechanical loads, etc. Permitting the rotor 128 to move in relation to the drive lower shaft 99 can reduce the potential for the pump 114 to be subject to excessive stresses resulting from its interaction with the lower drive shaft 99. A ball bearing 148 is concentrically within the manifold 130 and helps to center the lower drive shaft 99 within the pump 114, and thereby reduces the potential for the pump 114 to be damaged by excessive radial loads imposed thereon by the lower drive shaft 99. The bearing 148 is lubricated by the oil in the third hydraulic circuit.

The guidance module 110 further includes a hydraulic manifold assembly 140 located downhole of the pump 114 (see FIGS. 5 and 9-10F). The hydraulic manifold assembly 140 comprises the valves 120, a body 141, a casing 162 positioned around a portion of the body 141, and a bypass valve 144. The valves 120 and the bypass valve 144 are mounted on the body 141.

The pump 114 and hydraulic manifold assembly 140 are positioned between the housing 101 of the crossover subassembly 100, and a lip 122a of the housing 122. A crush ring 149 is positioned between the housing 101, and the up-hole end of the pump 114. The crush ring 149 is sized so that the stacked length (axial dimension) of the crush ring 149, pump 114, and hydraulic manifold assembly 140 is greater than the distance between the down-hole end of the housing 101, and the lip 122a. The crush ring 149 deforms as the crossover subassembly 100 and the guidance module 110 are mated. The interference generated by the crush ring 149 results in axial and frictional forces between the housing 101, crush ring 149, pump 114, hydraulic manifold assembly 140, and housing 122. These forces help to secure the pump 114 and the hydraulic manifold assembly 140 to the housing 122. The pump 114 and the hydraulic manifold assembly 140 are restrained from rotating in relation to the housing by pins.

The body 141 of the hydraulic manifold assembly 140 has circumferentially-extending, outwardly-facing first and second grooves 163a, 163b formed therein (see FIGS. 9, 10A, 10C, and 10E). The first groove 163a and the overlying portion of the casing 162 define a first annulus 143a in the hydraulic manifold assembly 140. The second groove 163b and the overlying portion of the casing 162 define a second annulus 143a in the hydraulic manifold assembly 140. The first and second annuli 143a, 143b form part of the third hydraulic circuit. The first annulus 143a is in fluid communication with the inlet ports 131a of the pump 114 by way of passages 165a formed in the body 141 (see FIGS. 9, 10A, 10D, 10E). The first annulus 143a therefore holds oil at a pressure approximately equal to the inlet pressure of pump 114 during operation of the RSM module 10. The second annulus 143b is in fluid communication with the outlet ports 131b of the pump 114 by way of passages 165b formed in the body 141. The second annulus 143b therefore holds oil at a pressure approximately equal to the outlet (discharge) pressure of pump 114 during operation of the RSM module 10.

Figure 9:
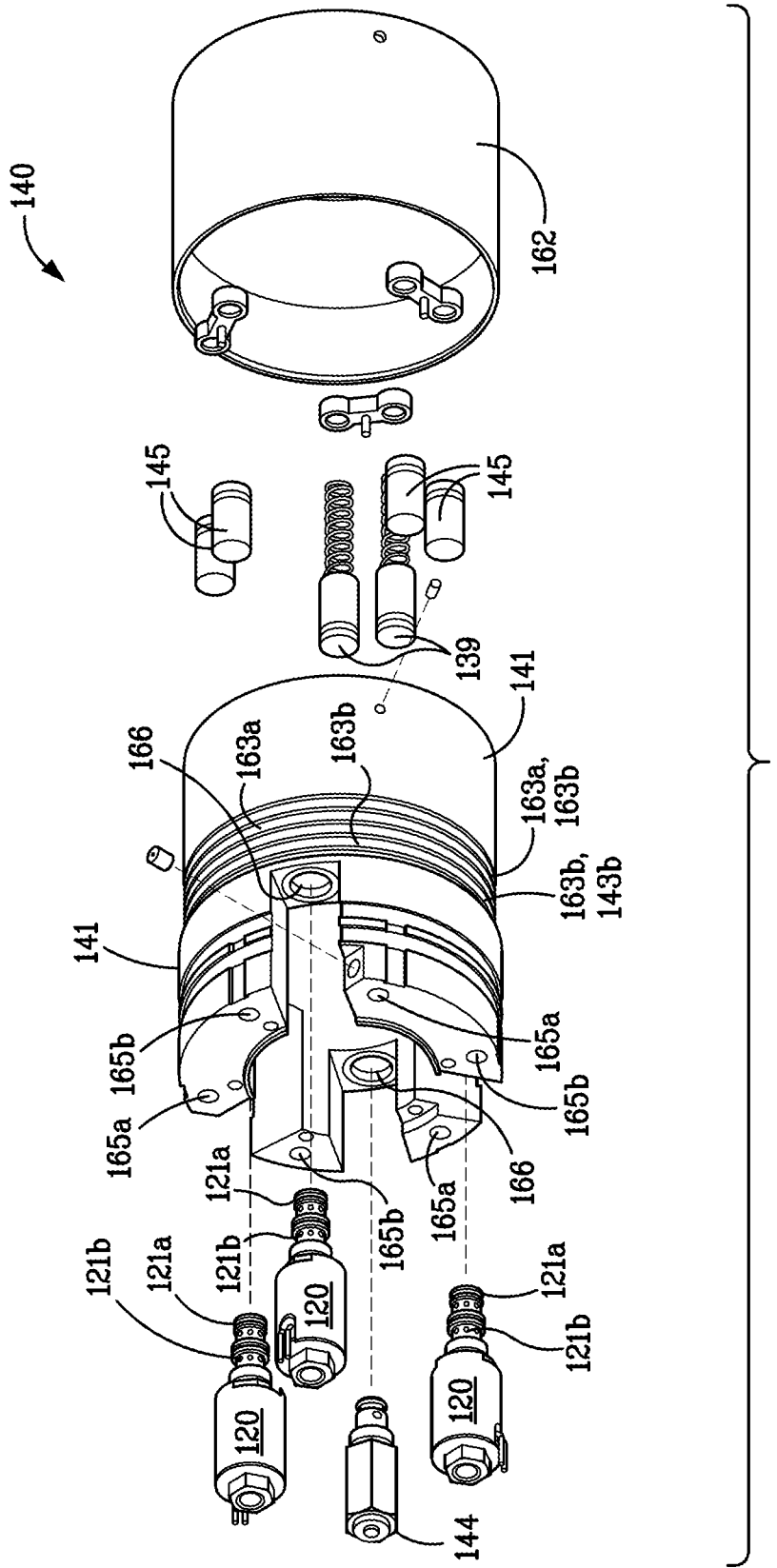
FIG. 9 is an exploded perspective view of a manifold assembly of the steering module system shown in FIGS. 1-8.
Figure 10A:
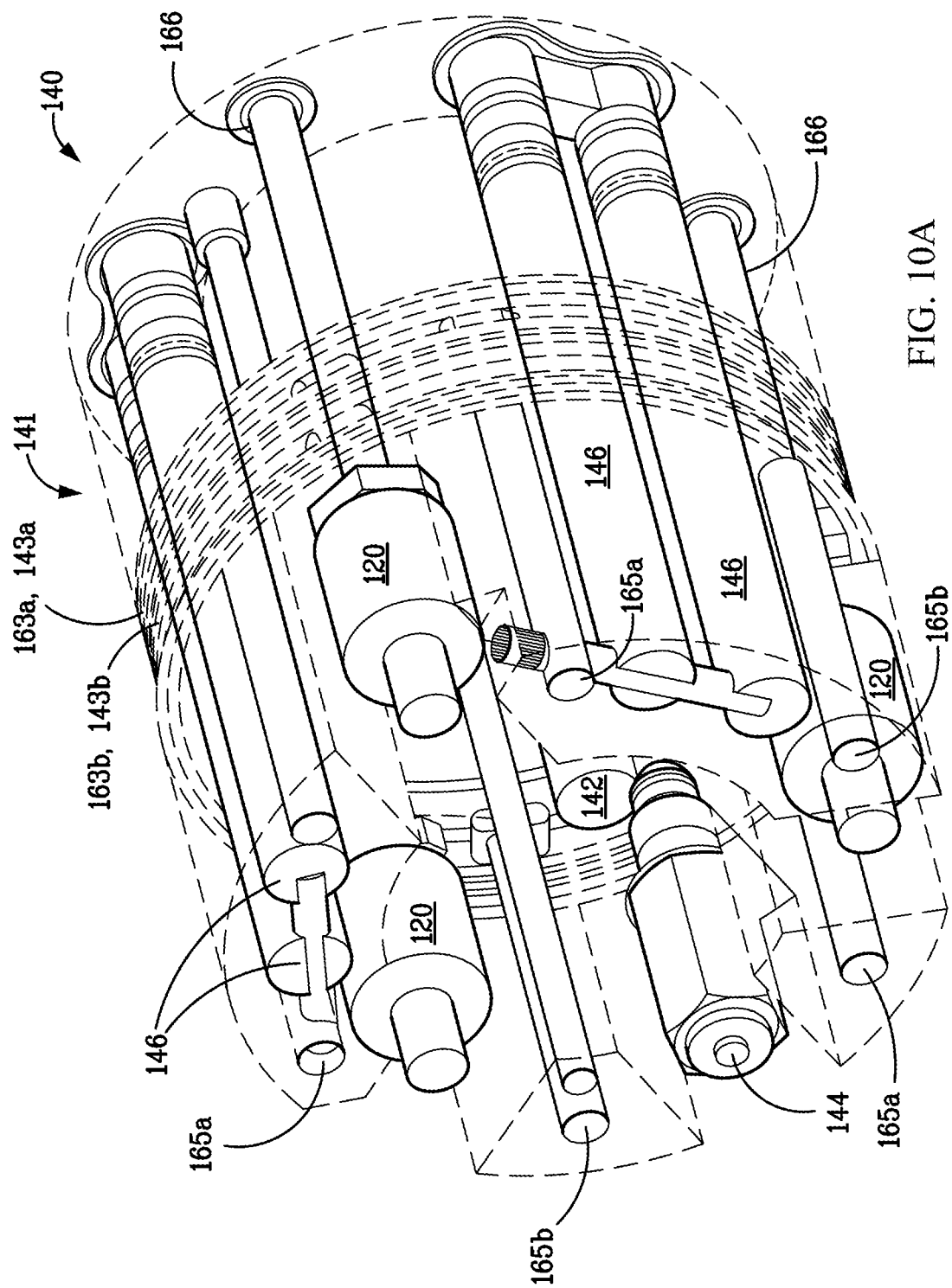
FIG. 10A is a perspective view of the manifold assembly shown in FIG. 9, with a body of the manifold assembly shown semi-transparently, and with a casing of the manifold assembly removed.
Figure 10B:
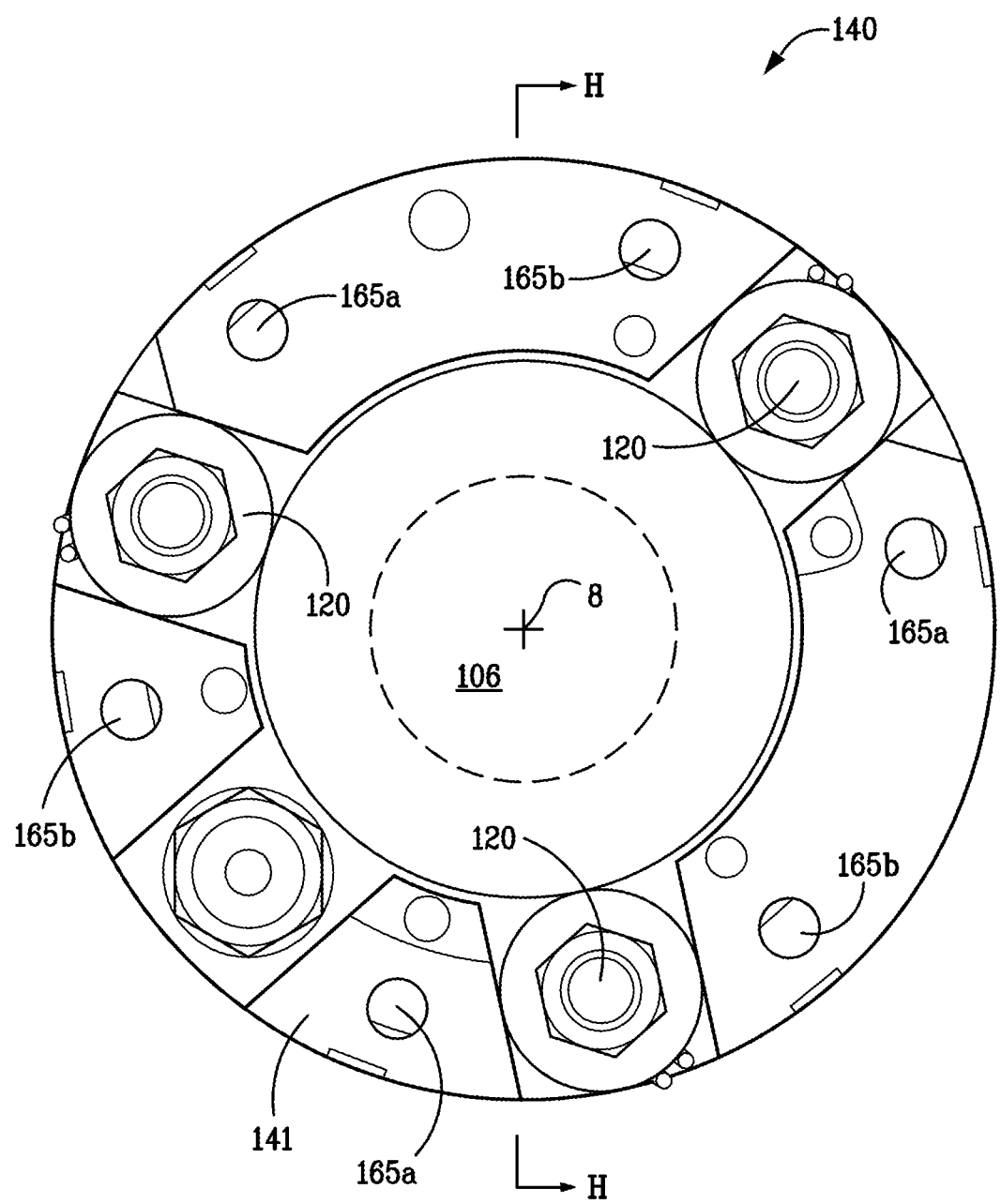
FIG. 10B is a side view of the manifold assembly shown in FIGS. 9 and 10A.
Figure 10C:
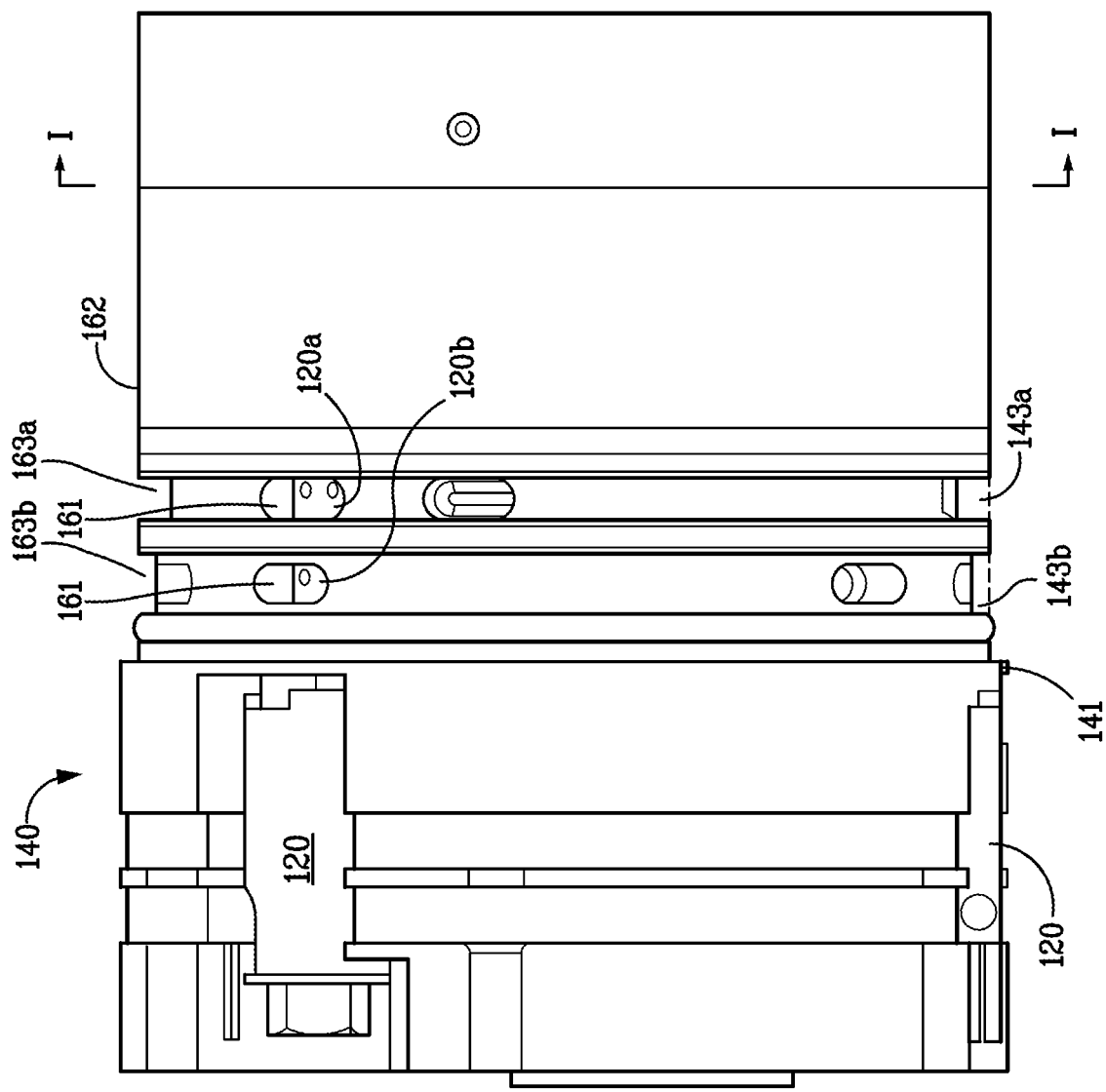
FIG. 10C is a side view of the manifold assembly shown in FIGS. 9-10B, with the casing of the manifold assembly removed.
Figure 10D:
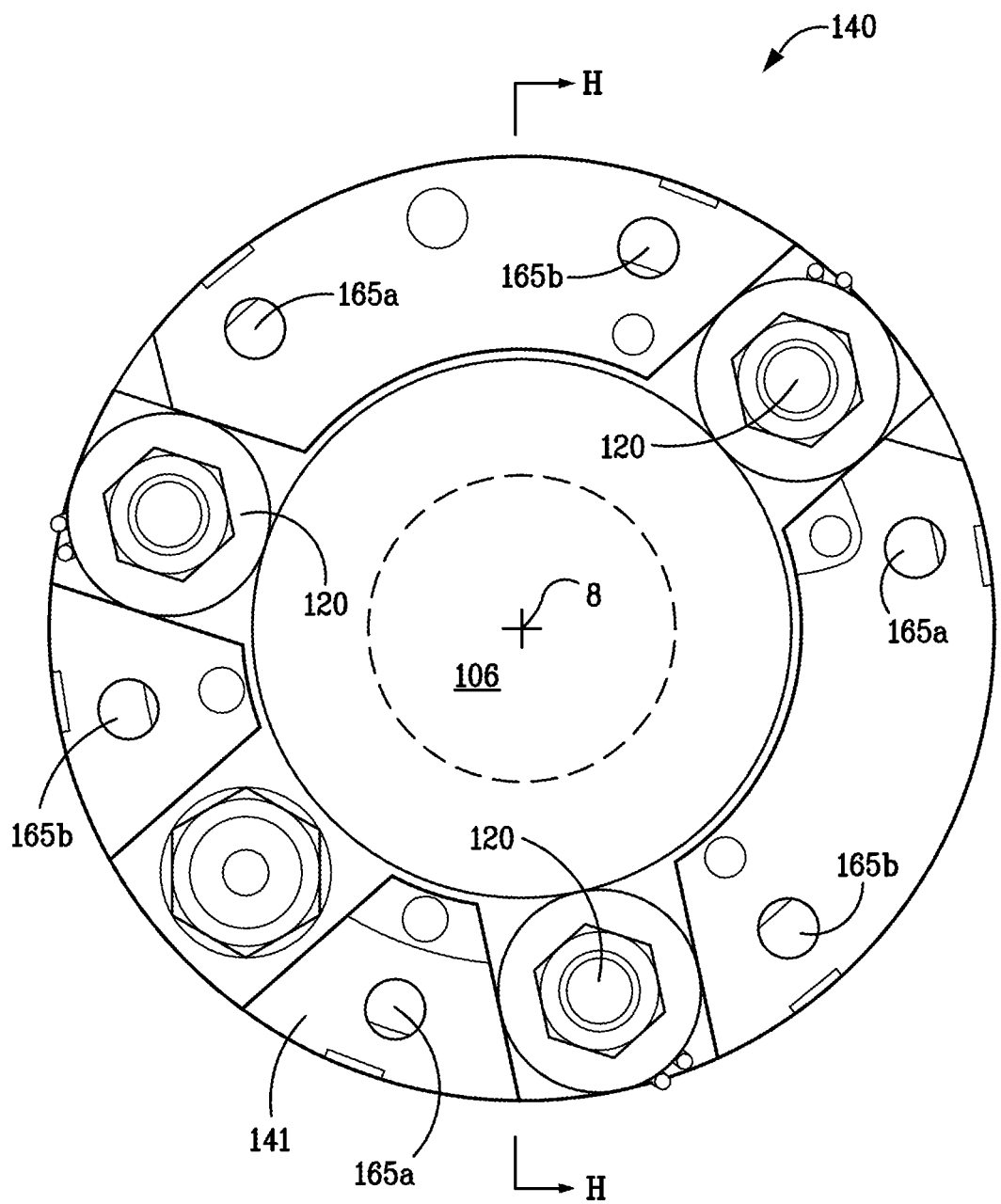
FIG. 10D is a view of the manifold assembly shown in FIGS. 9-10C, from a perspective up-hole looking downhole.
Figure 10E:
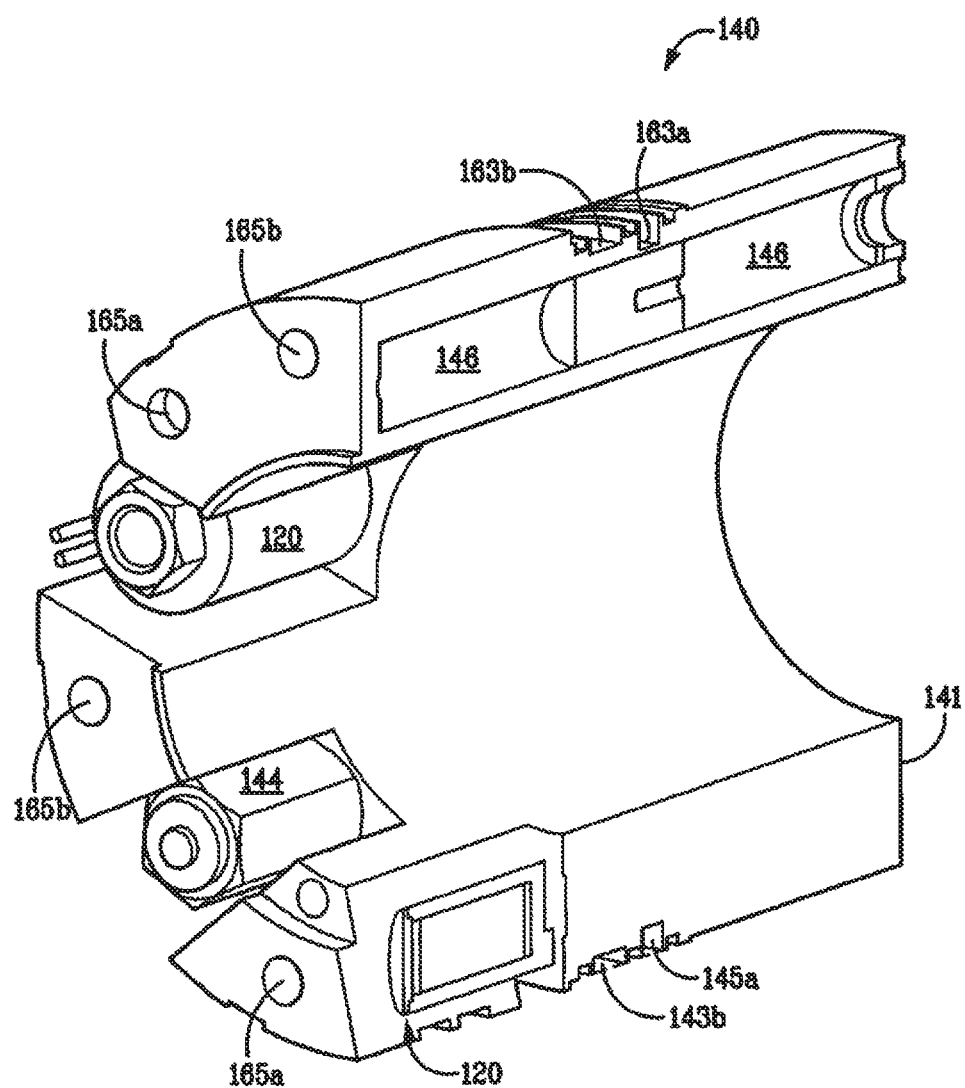
FIG. 10E is a cross-sectional perspective view of the manifold assembly shown in FIGS. 9-10D, taken through the line "H-H" of FIG. 10D, with the casing of the manifold assembly removed.
Figure 10F:
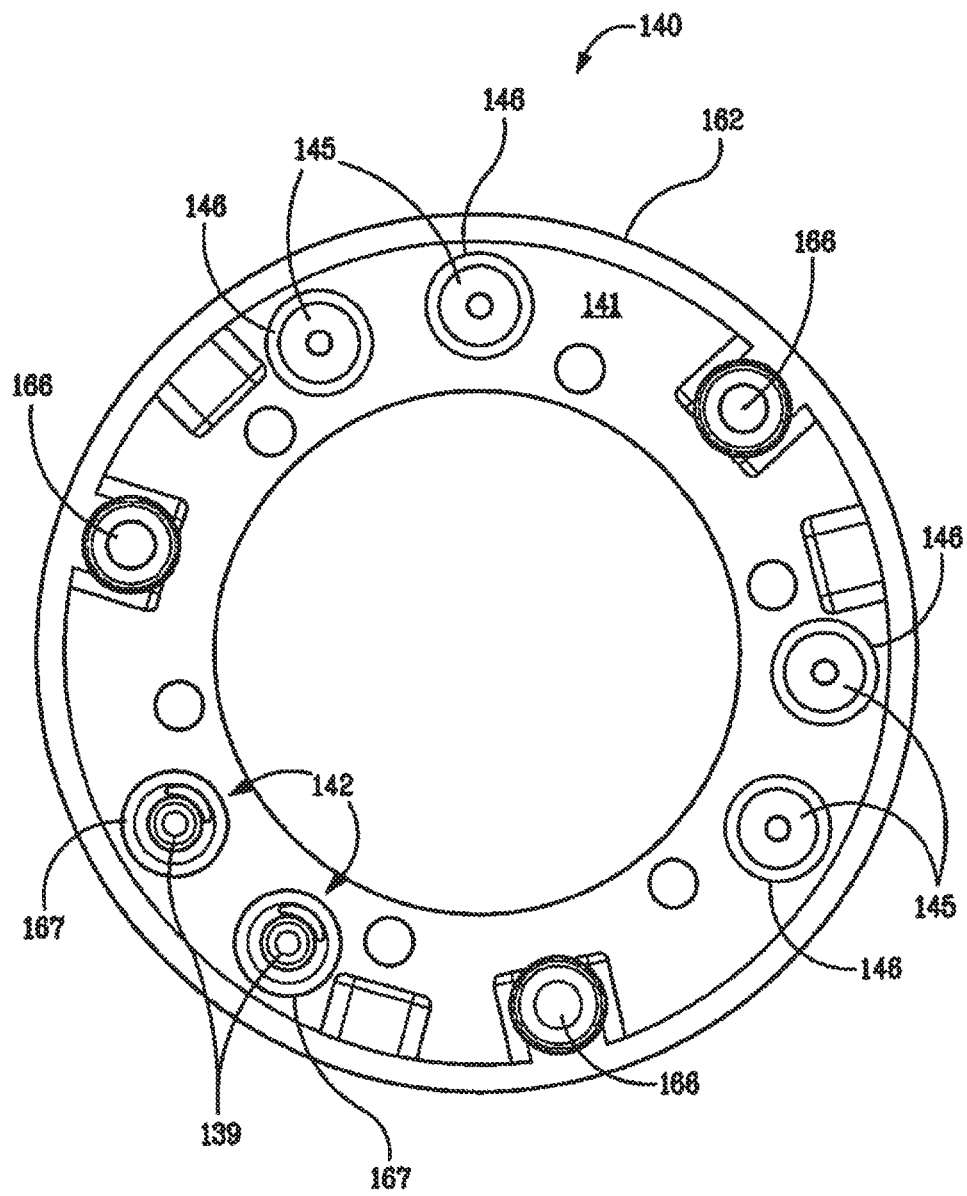
FIG. 10F is a cross-sectional perspective view of the manifold assembly shown in FIGS. 9-10D, taken through the line "I-I" of FIG. 10C.
Figure 11A:
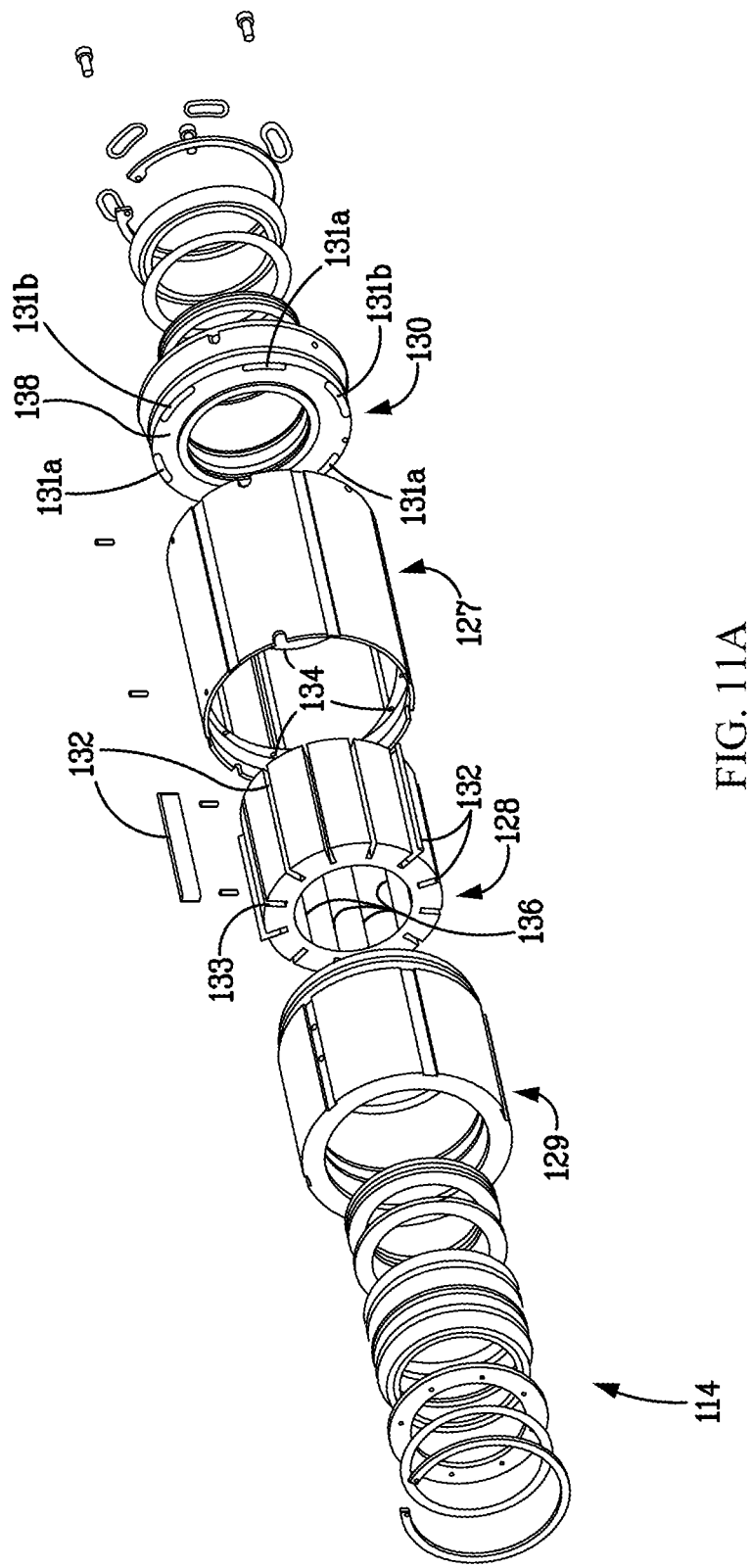
FIG. 11A is an exploded, perspective view of a pump of the steering module shown in FIGS. 1-10F.
Figure 11B:
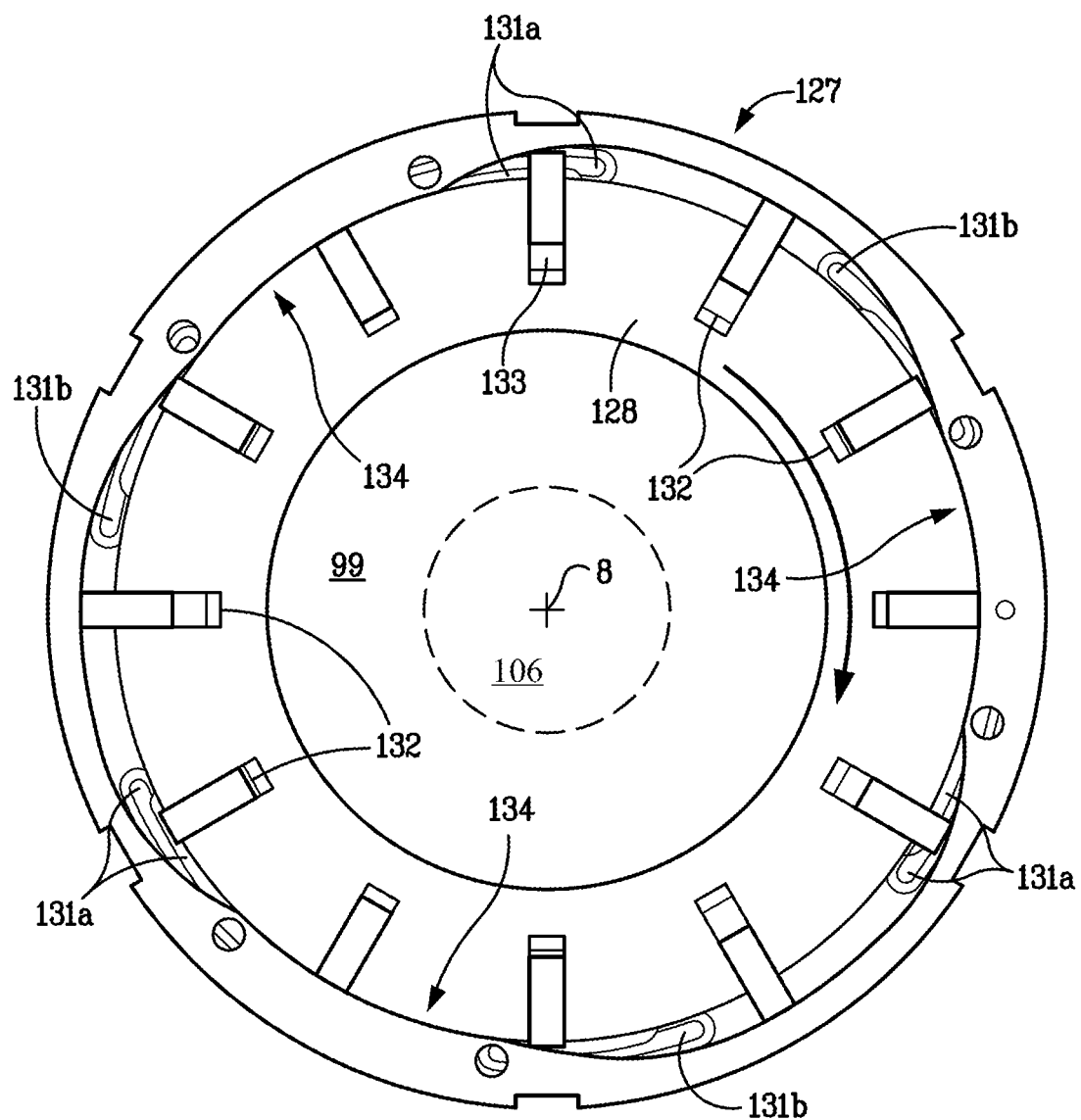
FIG. 11B is a transverse cross-sectional view of the pump shown in FIG. 11A.

Each valve 120 has a first inlet 121a and a second inlet 121b (see FIG. 9). The valves 120 are mounted on the body 141 so that the first inlet 121a communicates with the first annulus 143a by way of a port 161 formed in the body 141, and the second inlet 121b communicates with the second annulus 143b by way of another port 161 (see FIG. 10C). The first inlet 120a therefore is exposed to oil at a pressure approximately equal to the inlet pressure of the pump 114, and the second inlet 120b is exposed to oil at a pressure approximately equal to the discharge pressure of the pump 114.

The body 141 has three passages 166 formed therein (see FIGS. 9 and 10F) and each passage 166 is in fluid communication with the outlet of an associated valve 120, and extends to the down-hole end of the body 141. The passages 166 further define the third hydraulic circuit.

The hydraulic manifold assembly 140 also includes four pistons 145 (see FIG. 9, 10A, 10E, 10F). The pistons 145 are each disposed within a respective cylindrical bore 146 formed in the body 141. A down-hole end of each piston 145 is exposed to oil from the first hydraulic circuit, at approximately bore pressure. The up-hole end of each piston 145 is in fluid communication with the inlet of the pump 114. The pistons 145 therefore help to pressurize the oil at the inlet of the pump 114 to a pressure approximately equal to bore pressure.

The hydraulic manifold assembly 140 also includes two spring-loaded pistons 139 (see FIGS. 9 and 10F) each disposed within a respective cylindrical bore 167 formed in the body 141. The portion of each cylinder 167 located up-hole of the associated piston 139 is in fluid communication with the second annulus 143b, and therefore contains oil at a pressure approximately equal to the discharge pressure of pump 114. A down-hole end of each piston 139 is exposed to drilling mud at bore pressure, by way of various passages formed in the body 141 and the housing 122. The combined force of the drilling mud and the associated spring against the down-hole end of the piston 139 helps to maintain the pressure in the up-hole of the piston 139 above bore pressure. Each bore 167 and its associated piston 139 thus function as an accumulator 142 that stores a reservoir of high-pressure oil in fluid communication with the second inlet 121b of the valves 120. The optimal number of accumulators 142 is application-dependent, and can vary, for example, with the amount of force required to actuate the arms 112. More, or less than two accumulators 142 can be used in alternative embodiments. Other alternative embodiments can be configured without any accumulators 142.

Figure 12:
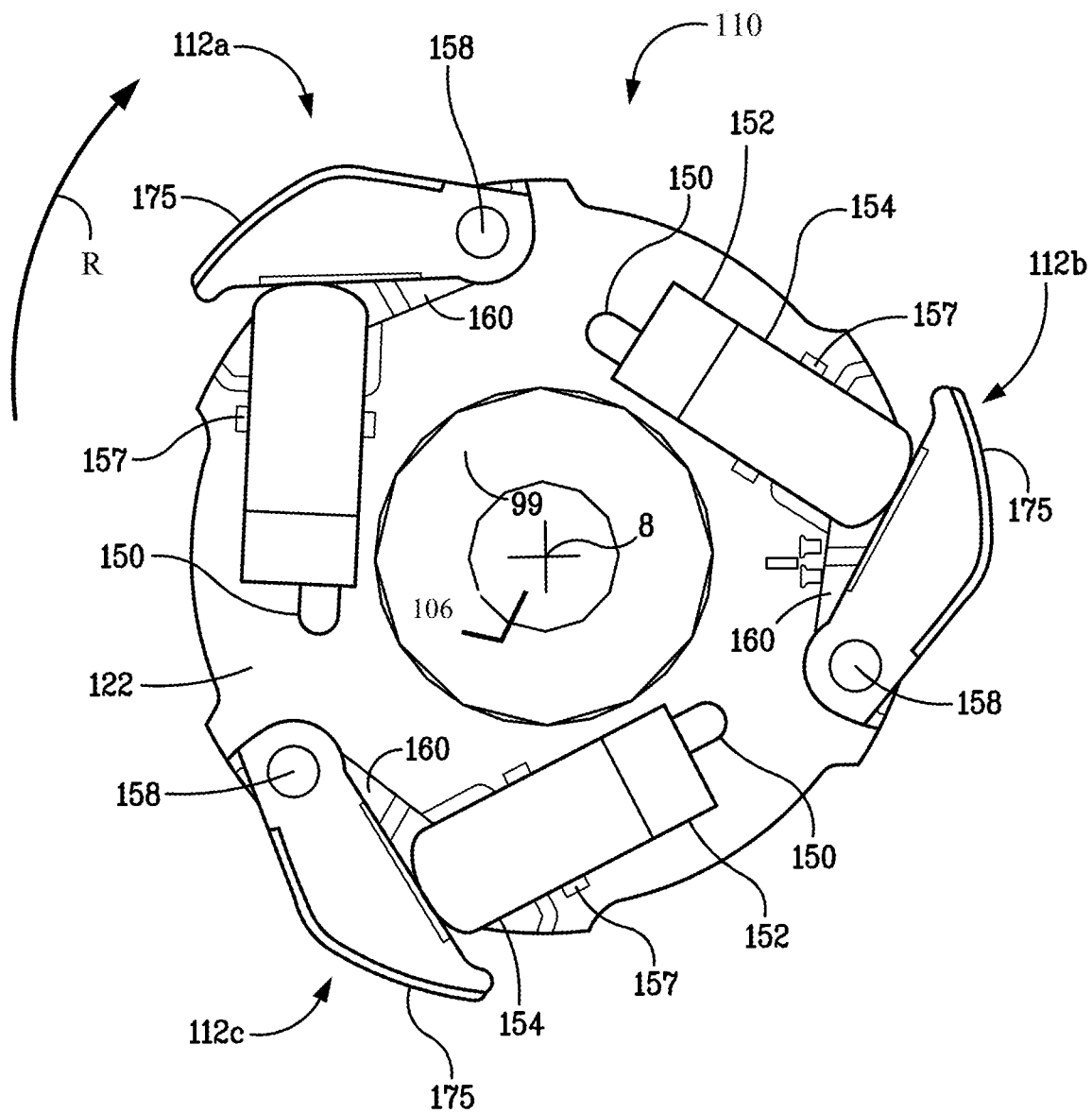
FIG. 12 is a cross sectional view of the rotary steering module shown in FIGS. 1-11B, taken through the line "K-K" of FIG. 2.
Figure 13:
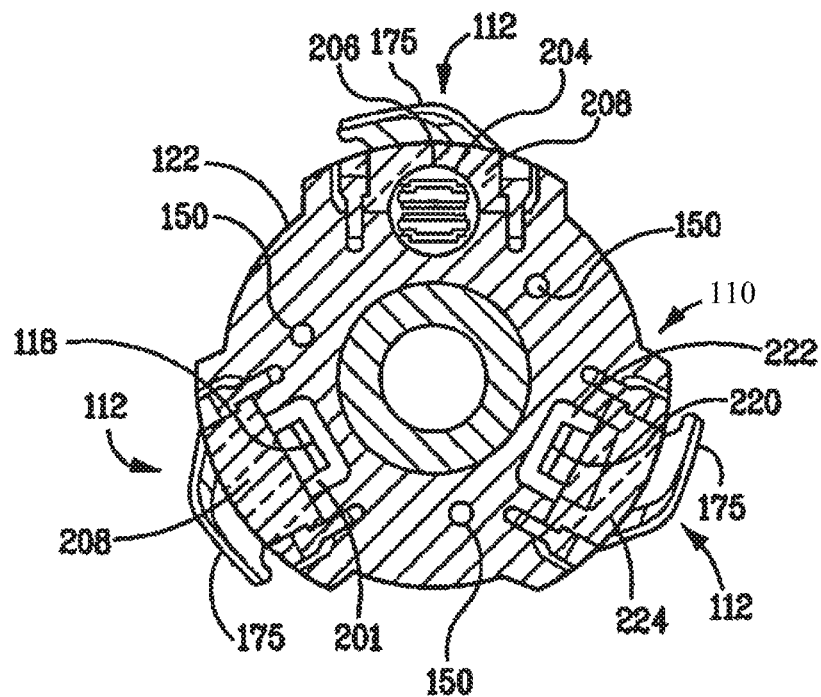
FIG. 13 is a cross sectional view of the steering module shown in FIGS. 1-12, taken through the line "I-I" of FIG. 2.
Figure 14:
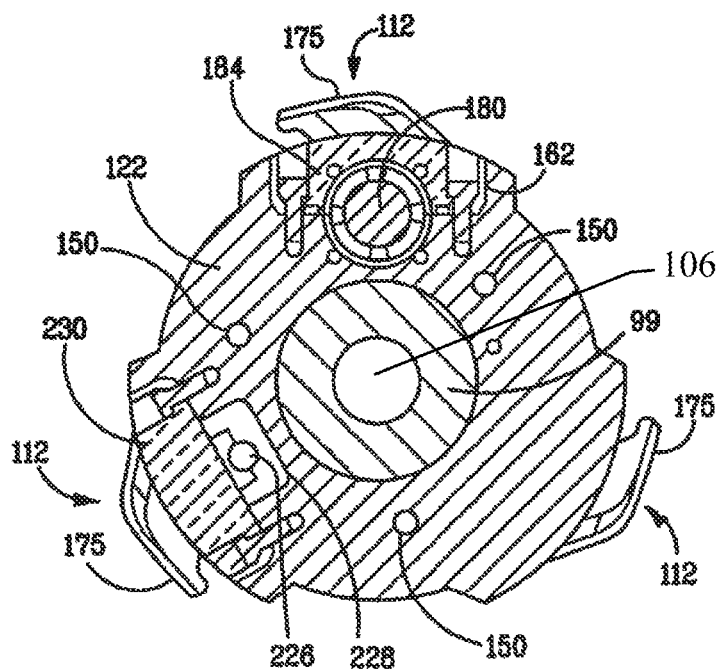
FIG. 14 is a cross sectional view of the steering module shown in FIGS. 1-13, taken through the line "J-J" of FIG. 2.

The housing 122 has three deep-drilled holes 150 (see FIGS. 12-14). The holes 150 form part of the third hydraulic circuit. Each hole 150 substantially aligns with, and is in fluid communication with an associated one of the passages 166 in the body 141 of the hydraulic manifold assembly 140. The holes 150 each extend down-hole, in a substantially axial direction, to a position proximate a respective one of the actuating arms 112. Each valve 120, as discussed below, selectively routes relatively high-pressure oil from the discharge of the pump 114 to an associated hole 150, in response to commands from the controller 1118.

The housing 122 has three banks 151 of cylinders 152 formed therein (see FIGS. 6 and 12). The cylinders 152 further define the third hydraulic circuit. The cylinder banks 151 are circumferentially spaced at intervals of approximately 120 degrees. Each cylinder bank 151 includes three of the cylinders 152. The cylinder banks 151 are each positioned beneath a respective one of the actuating arms 112. Each of the holes 150 is in fluid communication with a respective cylinder bank 151. In other words, the three cylinders 152 in each cylinder bank 151 are supplied with oil from an associated hole 150. The cylinders 152 each receive a respective piston 154. The diameter of the each piston is sized so that the piston 154 can translate in a direction substantially coincident with the central (longitudinal) axis of its associated cylinder 152. An end of each piston 154 is exposed to the oil in its associated cylinder 152. The opposite end of the piston 154 contacts the underside of an associated actuating arm 112. Seals 157 are mounted on the housing 122 (or on the pistons 154) to seal interface between the cylinder 152 and the associated piston 154, and thereby contain the high-pressure oil in the cylinder 152.

Figure 15:
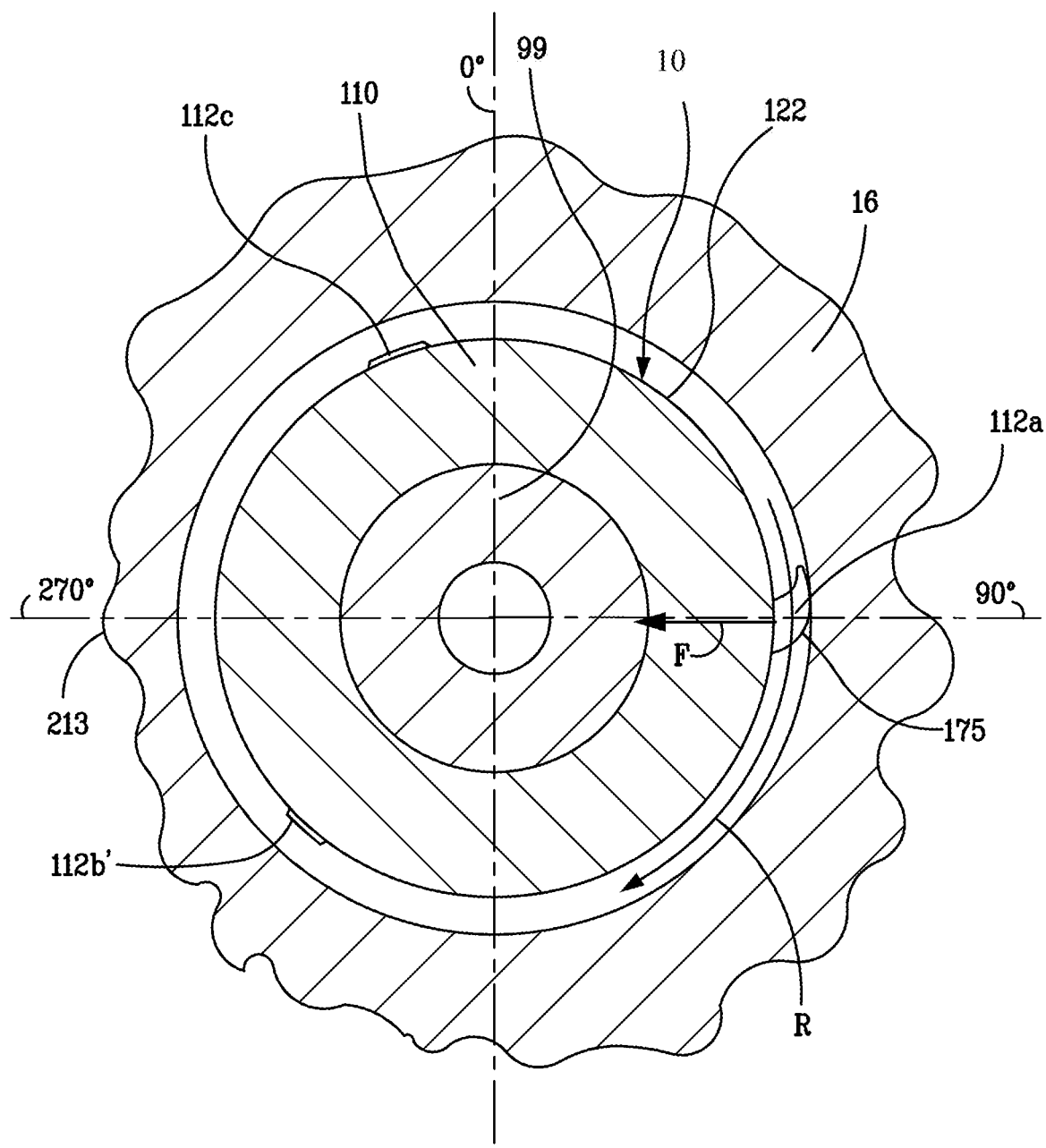
FIG. 15 is a cross sectional view of the steering module shown in FIGS. 1-14, taken through the line "L-L" of FIG. 2.
Figure 16:
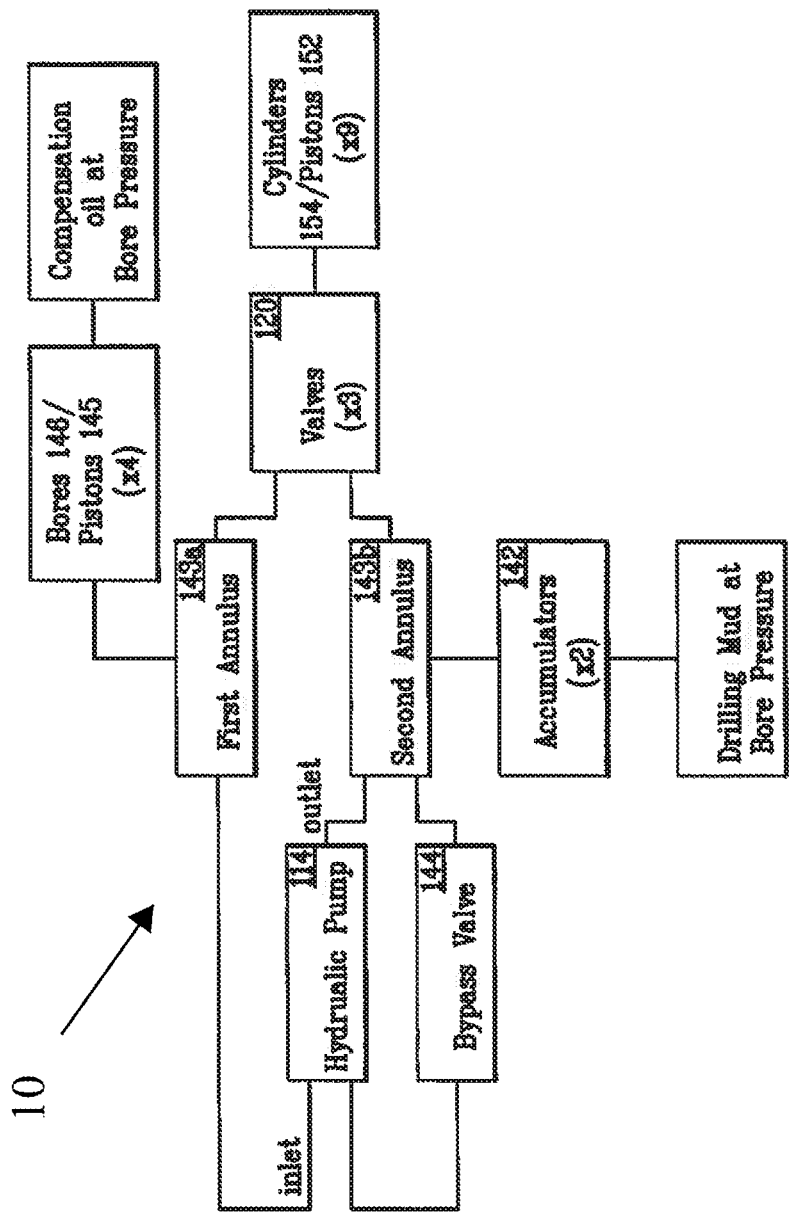
FIG. 16 is a block diagram depicting a portion of a fluidic circuit of the steering module shown in FIGS. 1-15.

Each actuating arm 112 is pivotally coupled to the housing 122 by a pin 158, so that the arm 112 can pivot between an extended position (FIGS. 12-15) and a retracted position (FIGS. 2, 6, and 15). All three of the actuating arms 112 are shown in their extended positions in FIGS. 12-14, for illustrative purposes only. Only one of the arms 112 is normally extended at one time, as discussed below. Ends of the pin 158 are received in bores formed in the housing 122, and are retained by a suitable means such as clamps. Recesses 1160 are formed in the housing 122 (see FIGS. 2, 6, and 12). Each recess 1160 accommodates an associated actuating arm 112, so that the outer surface of the actuating arm 112 is nearly flush with the adjacent surface of the housing 122 when the actuating arm 112 is in its retracted position. Each actuating arm 112 can be biased toward its retracted position by a torsional spring (not shown) disposed around the corresponding pin 158, to facilitate ease of handling as the system is lowered into the raised form the bore 17.

The valves 120 preferably are double-acting spool valves. The first inlet 121a of each valve 120 has is in fluid communication with the inlet of the pump 114 by way of the first annulus 143a, and the second inlet 121b in fluid communication with the outlet of the pump 114 by way of the second annulus 143b, as noted above. The outlet of each valve 120 is in fluid communication with a respective one of the holes 150, by way of the passages 166.

The valve 120 permits relatively low-pressure oil from the inlet of the pump 114 to enter the associated hole 150, when the valve 120 is not energized. In other words, the valve 120 places the associated hole 150 and cylinder bank 151 in fluid communication with the inlet of the pump 114 when the valve 120 is not energized. As the relatively low-pressure oil from the inlet of the pump 114 is insufficient to force the associated actuating arm 112 against the borehole wall, the actuating arm 112 remains in (or near) its retracted position under this condition.

Energizing the valve 120 activates a solenoid within the valve 120, in turn causing the arm 112 to project outwardly. More specifically, the activated solenoid reconfigures the flow path within the valve 120 so that the outlet of the valve 120 is placed in fluid communication with the outlet of the pump 114 by way of the second inlet 120b of the valve 120. Energizing the valve 120 therefore causes the oil from the discharge of the pump 114 to be directed to the associated hole 150 and cylinder bank 151. The relatively high-pressure oil acts again the underside of the associated pistons 154, and causes the pistons 154 to move outwardly, against the actuating arm 112. The outward movement of the pistons 154 urges the actuating arm 112 outward. The restraint of the arm 112 exerted by the associated pin 158 causes the actuating arm 112 to pivot about the pin 158, toward its extended position.

When the arms 112 are extends, an outwardly-facing surface portion 175 of the actuating arm 112 contacts the surface of the bore 17, i.e., the borehole wall, and exerts a force thereon in a first direction (see FIG. 15), due to the relatively high force exerted on the pistons 154 and the actuating arm 112 by the high-pressure oil at pump-discharge pressure. The surface of the bore 17 exerts a reactive force on the actuating arm 112, in a second direction substantially opposite the first direction. This force is denoted by the reference character "F" in FIG. 15. The reactive force F urges the drill bit 13 substantially in the second direction, thereby effecting directional drilling. The surface portion 175 of the actuating arm 112 preferably is curved, to substantially match the curvature of the surface of the bore 17 (see FIGS. 12-15). This feature causes the contact forces to be distributed over a relatively large area on the actuator arm 112, and can thereby help to reduce wear of the actuating arm 112.

De-energizing the valve 120 causes the solenoid to reconfigure the flow path within the valve 120, so that the outlet of the valve 120 is placed in fluid communication with the inlet of the pump 114 by way of the first inlet 121a of the valve 120. As the relatively low-pressure oil from the inlet of the pump 114 is insufficient to force the associated actuating arm 112 against the borehole wall, the actuating arm 112 returns to its retracted position.

The valves 120, when energized, subject the associated holes and the cylinders 152 to a hydraulic pressure approximately equal to the discharge pressure of pump 114. The valves 120 do not otherwise regulate the hydraulic pressure. Alternative embodiments can be equipped with proportional valves that can change the pressure and flow to the holes 150 and cylinders 152 in response to a control input to the valve. This feature can be used, for example, to maintain a desired pressure and flow rate to the holes 150 and cylinders 152 as the pump 114 wears or otherwise deteriorates.

Furthermore, the cylinders 152 preferably are oriented at an angle of approximately ninety degrees in relation to the radial direction of the housing 122 (see FIG. 12). In other words, the longitudinal axis of each cylinder 152 is disposed at an approximate right angle in relation to a reference line that extends radially outward from the centerline of the housing 122 and intersects the cylinder 154. The feature helps to maximize the length of cylinders 152, the stroke of the pistons 154, and the actuating force generated by the pistons 154.

The actuating arms 112 preferably are formed from a relatively hard, wear-resistant material capable of withstanding the contact forces generated when the actuating arm 112 contacts the borehole wall. For example, the actuating 112 arms can be formed from stainless steel, or other suitable materials. A wear coating, such as a tungsten carbide coating (or other suitable coatings) can be applied to the surfaces of the actuating arms 112 that contact the borehole wall and the pistons 154, to provide additional durability.

The bypass valve 144 is configured to route the discharge of the pump 114 to the inlet of the pump 114 when the pressure of the oil in the manifold 143 exceeds a predetermined value. The bypass valve 144 can accomplish this bypass function by placing the first and second annuli 143a, 143b in fluid communication so that oil can flow from the second annulus 143b to the first annulus 143a. The predetermined value should be chosen so that the bypass valve 144 performs its bypass function when none of the three valves 120 is activated, i.e., when outlet of pump 114 is not in fluid communication with any of the cylinder banks 151. This feature can reduce the potential for deadheaded oil to cause an overpressure condition in the third hydraulic circuit.

Alternative embodiments of guidance module 110 can include more, or less than three actuating arms 112 and cylinder banks 151. Moreover, each cylinder bank 151 can include more, or less than three cylinders 152 in alternative embodiments. The actuating arms 112 and cylinder banks 151 can be circumferentially spaced in unequal angular increments in alternative embodiments.

A thrust bearing 176 and a spacer 178 are mounted between a lip formed on the housing 122 of the guidance module 110, and a neck 99a of the lower drive shaft 99 (see FIG. 6). The thrust bearing 176 preferably is a spherical roller bearing. The thrust bearing 176 transfers axial loads between the lower drive shaft 99 and the housing 120 during drilling operations. The thrust bearing 176 thus transfers the axial force exerted on the drill collar 14 to advance the drill bit 13 into the earth formation 16. The thrust bearing 176 is lubricated by the oil from the first hydraulic circuit. The oil reaches the thrust bearing 176 by way of various passages and clearances within the guidance module 110 and other components of the RSM module 10.

The guidance module 110 also includes a power source 180, such as an alternator 180. The alternator 180 is mounted on the housing 122, within a cavity 182 formed in the housing 122. The cavity 182 is covered and sealed by a hatch cover 184 (see FIGS. 2, 6, and 14). The alternator 180 generates electrical power for the controller 1118 and the other electrical components of the RSM module 10. The alternator 180 preferably is a three-phase alternator that can tolerate the temperatures, pressures, and vibrations typically encountered in a down-hole drilling environment. The alternator 180 is driven by the lower drive shaft 99, by way of a gear train 186. The gear train 186 is mounted on the housing 122, within the cavity 182. A portion of the lower drive shaft 99 has teeth 188 formed thereon (see FIG. 6). The teeth 188 engage a complementary gear of the gear train 186, so that rotation of the lower drive shaft 99 in relation to the housing 122 causes the teeth 188 to drive the gear train 186. Preferably, the gear train 186 is configured to drive the alternator 180 at a rotational speed approximately thirteen times greater than the rotational speed of the lower drive shaft 99. The cavity 182 is filled with oil from the first hydraulic circuit. The oil lubricates the alternator 180 and the gear train 186. The oil reaches the cavity 182 by way of various passages and clearances within the guidance module 110 and other components of the RSM module 10.

The controller 1118 is mounted in a cavity 201 formed in the housing 122 (see FIG. 13). The cavity 201 is covered and sealed by a hatch cover 202.

Figure 17:
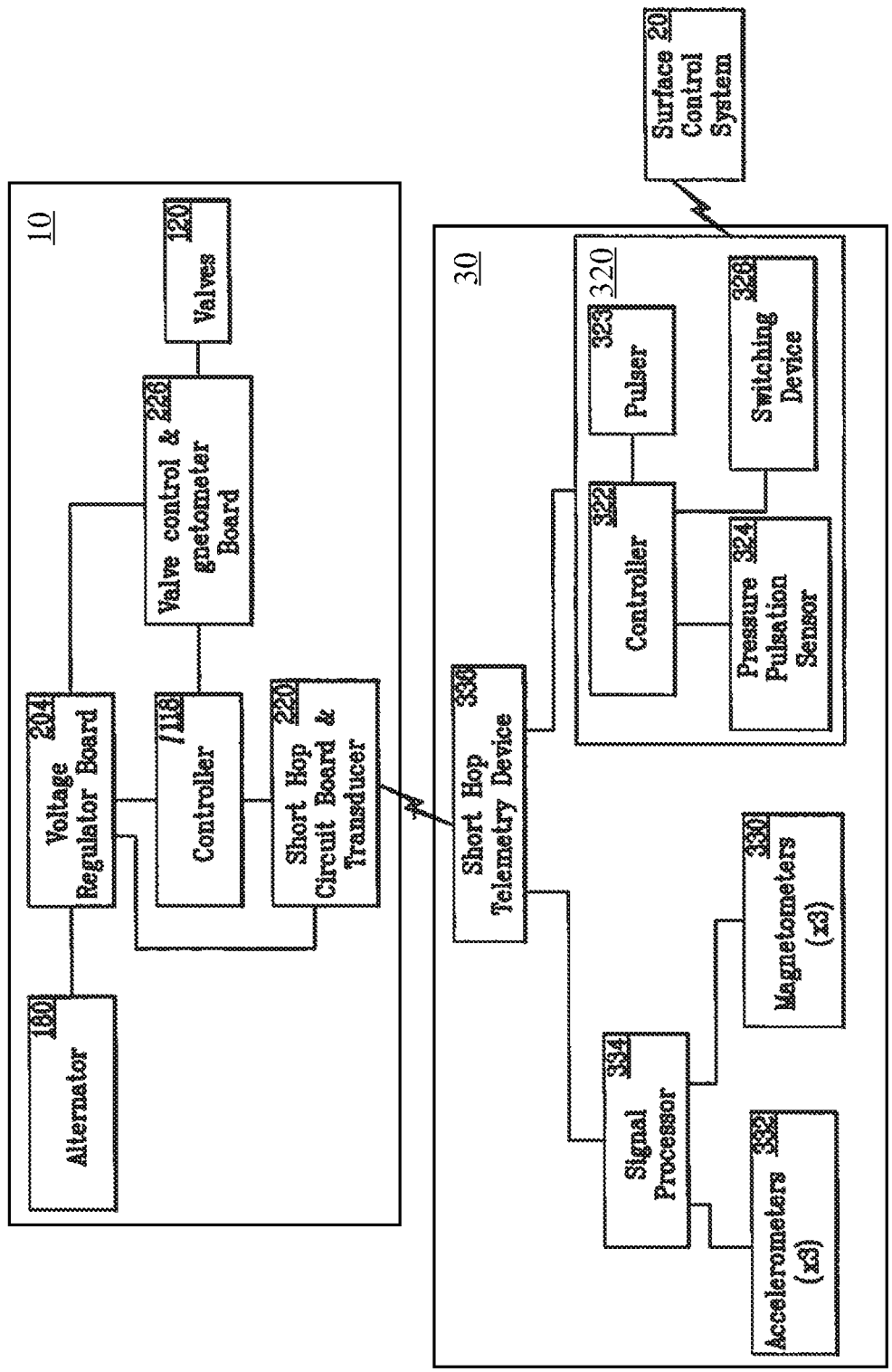
FIG. 17 is a block diagram depicting various components drilling system shown in FIGS. 1-16.

The guidance module 110 also includes a voltage regulator board 204 (see FIGS. 6, 13, and 17). The voltage regulator board 204 is mounted in a cavity 206 formed in the housing 122. The cavity 206 is covered and sealed by a hatch cover 208. The voltage regulator board 204 comprises a rectifier and a voltage regulator. The rectifier receives the alternating-current (AC) output of the alternator 180, and converts the AC output to a direct-current (DC) voltage. The voltage regulator regulates the DC voltage to a level appropriate for the controller 1118 and the other electrical components powered by the alternator 180. Wiring (not shown) that interconnects the alternator 180 with the voltage regulator board 204 is routed through a header 215, and through a passage 216 formed in the housing 122 between the cavities 182, 206 (see FIG. 6). The header 215 isolates the pressurized oil in the cavity 182 from the air at atmospheric pressure within the cavity 202.

The guidance module 110 also includes a short-hop circuit board and transducer 220 (see FIGS. 13 and 17). The short-hop circuit board and transducer 220 is mounted in a cavity 222 formed in the housing 122. The cavity 222 is covered and sealed by a hatch cover 224. The short-hop circuit board and transducer 220 is communicatively coupled to the controller 1118 via wiring (not shown). The short-hop circuit board and transducer 220 facilitates communication between the controller 1118 and the controller 322 of the mud-pulse telemetry system 320, via short-range telemetry.

The guidance module 110 also includes a valve control and magnetometer board 226 (see FIGS. 14 and 17). The valve control and magnetometer board 226 is mounted in a cavity 228 formed in the housing 122. The cavity 228 is covered and sealed by a hatch cover 230. The valve control and magnetometer board 226 is communicatively coupled to the controller 1118 by wiring (not shown), and energizes the valves 120 in response to commands from the controller 1118. The valve control and magnetometer board 226 can also include a biaxial magnetometer that facilitates calculation of tool face angle, as discussed below.

The controller 1118, voltage regulator board 204, short-hop circuit board and transducer 220, and valve control and magnetometer board 226 can be isolated from shock and vibration as required, by a suitable means such as a suspension.

Figure 8:
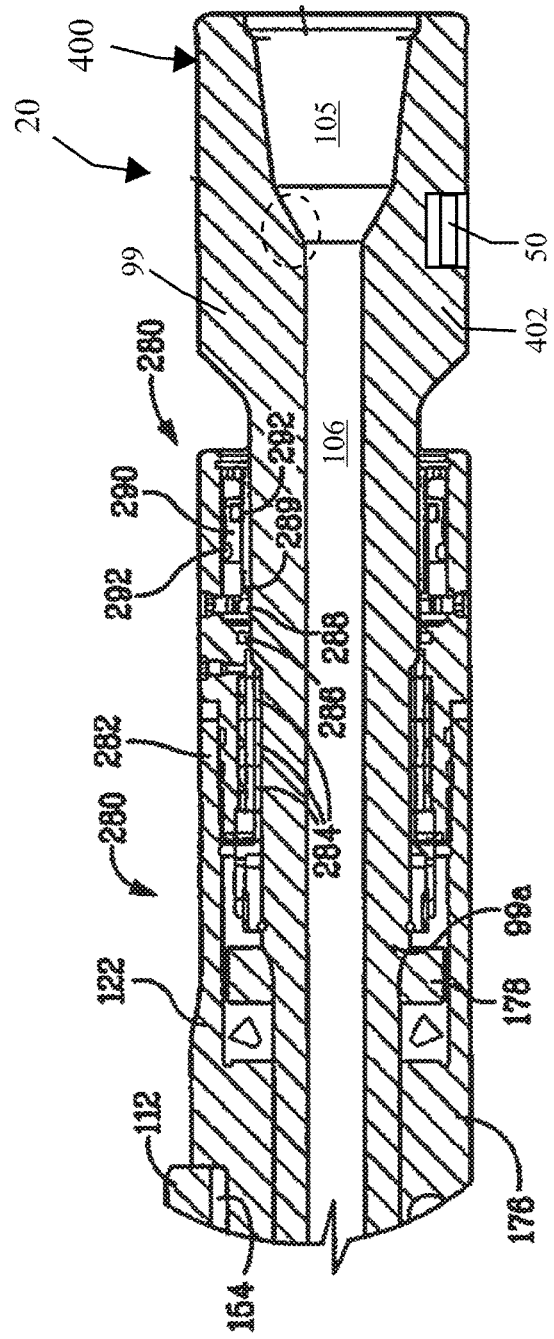
FIG. 8 is a magnified cross-sectional view of the area designated "G" in FIG. 6.

The RSM module 10 also comprises a lower seal bearing pack assembly 280 (see FIGS. 6 and 8). The assembly 280 comprises a housing 282 that is secured to the housing 122 of the guidance module 110 by a suitable means such as a threaded connection, so that the housing 122 rotates with the housing 122. The housing 282 thus forms part of the drill collar 14. The lower drive shaft 99 extends through the housing 282.

The assembly 280 comprises three radial bearings 284 for substantially centering the lower drive shaft 99 within the housing 282. The bearings 284 are lubricated by the oil from the first hydraulic circuit. The oil reaches the bearing 284 by way of various passages and clearances formed in the guidance module 110 and other components of the RSM module 10.

The assembly 280 also comprises a first and a second seal 286, 288. The first and second seals 286, 288 can be, for example, rotary shaft lip seals or rotary shaft face seals. The first and second seals 286, 288 are positioned around the lower drive shaft 99. The first seal 286 is located within an annulus formed in the housing 282. An up-hole end of the first seal 286 is exposed to the oil used to lubricate the bearings 284, i.e., the oil in the first hydraulic circuit. An up-hole end of the first seal 286 is exposed to oil contained within a fourth hydraulic circuit. The second seal 288 substantially isolates the oil in the first hydraulic circuit from the oil in the fourth hydraulic circuit. The oil in the fourth hydraulic circuit, while isolated from the oil in the first hydraulic circuit, can be the same type of oil used in the first hydraulic circuit. The second seal 288 is located within an annulus formed in a piston shaft 289 (see FIG. 8). The piston shaft 289 is positioned within the housing 282. An up-hole end of the second seal 288 is exposed to the oil in the fourth hydraulic circuit. A down-hole end of the second seal 288 is exposed to drilling mud, as annulus pressure. The second seal 288 substantially isolates the oil from the drilling mud.

A piston 290 is positioned around the piston shaft 289, so that the piston 290 can translate axially in relation to the piston shaft 289. An up-hole face of the piston 290 is exposed to the oil in the fourth hydraulic circuit. A down-hole face of the piston 290 is exposed to the drilling mud in the annular passage 19 formed between the drill collar 14 and the surface of the bore 17. O-ring seals 292 are positioned around the inner and outer circumference of piston 290. The O-ring seals 292 substantially isolate the oil from the drilling mud, and thereby reduce the potential for contamination of the oil by the drilling mud. The pressurization of the oil in the fourth hydraulic circuit by the piston 290 substantially equalizes the pressure across the second seal 288. Equalizing of the pressure across the second seal 288 can discourage infiltration of the drilling mud into the fourth hydraulic circuit, and can reduce the rate of wear of the second seal 288 resulting from by contact with the lower drive shaft 99. The pressurization of the oil in the fourth hydraulic circuit by the piston 290 also substantially equalizes the pressure across the first seal 286, and can reduce the rate of wear of the first seal 286 resulting from by contact with the lower drive shaft 99.

Further operational details of the RSM module 10 are as follows. The casing 122 of the guidance module 110 forms part of the drill collar 14, as discussed above. The casing 122, and the attached actuating arms 112, therefore rotate in response to the torque exerted on the drill string 12 by the drilling rig 15, in the direction R as shown in FIGS. 12 and 15 and at a speed equal to the rotational speed of the drill collar 14.

The actuating arms 112 are in their retracted positions during straight-hole drilling. Directional drilling can be achieved by selectively extending and retracting each actuating arm 112 on a periodic basis, so that the drill bit 13 is pushed in the desired direction of drilling. Each arm 112 can be extended and retracted once per revolution of the housing 122. Alternatively, each arm 112 can be extended and retracted once per a predetermined number of revolutions. The optimal frequency of the extension and retraction of the actuating arms 112 can vary with factors such as the pressure and flow rate of the oil or other hydraulic fluid used to actuate the actuating arms 112, the amount of angle built each time the actuating arms 112 are extended, etc.

The extension and retraction of the actuating arms 112 is effectuated by energizing and de-energizing the associated valves 120, as discussed above. This process is controlled by the controller 1118. In particular, the controller 1118 can determine the instantaneous angular orientation of each actuating arm 112 based on the tool face angle of the housing 122. The controller 1118 includes algorithms that cause the controller 1118 to energize and de-energize each valve 120 as a function of its angular position. The controller 1118 determines the angular positions at which the valves 120 are energized and de-energized based on the desired direction of drilling, and the lag between energization of the valve and the point at which the valve is fully extended.

For example, the drill bit 13 can be guided in the 270° direction denoted in FIG. 15 by actuating each actuating arm 112 so that the actuating arm 112 is fully extended as the actuating arm 112 passes the 90° position. The resulting contact between the extended actuating arm 112 and the borehole wall causes the wall to exert a reactive force F that acts in a direction substantially opposite the 90° direction, i.e., the force F acts substantially in the 270° direction. The force F is transferred to the housing 122 through the actuating arm 112 and its associated pin 158. The force F is subsequently transferred to the drill bit 13 by way of the drive shaft assembly 31, and the various bearings that restrain the drive shaft assembly 31. The force F thereby urges the drill bit 13 in the 270° direction.

FIG. 15 depicts a first of the actuating arms 112, designated 112', at the 90° position. The actuating arm 112' is shown in its fully extended position, to urge the drill bit 13 in the 270° direction. A second of the actuating arms 112, designated 112", is located at the 210° position, since the actuating arms 112 are spaced apart in angular increments of approximately 120°. A third of the actuating arms 112, designated 112''', is located at the 330° position. The second and third actuating arms 112", 112''' are retracted at this point, and therefore do not exert any substantial forces on the borehole wall.

Since the drill string 12 can rotate at a relatively high speed (250 rpm or greater), the actuating arms 112 should be extended and retracted in a precise, rapid sequence, so that the actuating arms 112 push the drill bit 13 in the desired direction. In the example depicted in FIG. 15, the first actuating arm 12' should begin retracting immediately after reaching the 90° position, so that force F acts primarily in the desired direction, i.e., in the 270° direction. The third actuating arm 112''' should begin extending at a predetermined distance from the 90° position, so that the third actuating arm 112''' is fully extended upon reaching the 90° position. The predetermined distance is a function of the lag time between the activation of the associated valve 120, and the point at which the actuating arm 112 reaches its fully extended position. The lag time is application dependent, and can vary with factors such as the discharge pressure of the pump 114, the size and weight of the actuating arms 112, the size of the holes 150 and cylinders 152, etc. A specific value for the predetermined distance therefore is not specified herein. The accumulators 142 provide a reservoir of the relatively high-pressure oil used to actuate the actuating arms 112. Moreover, the pistons 145 help to ensure that the pressure in the accumulators 142 remains above bore pressure as the valve 120 is energized and the oil within the accumulators is drawn into the associated hole 150. The accumulators 142 can thereby help to minimize the lag time between activation of the valve 120 and the point at which the associated actuating arm 112 is fully extended, by ensuring that a sufficient amount of high-pressure oil is available to actuate the actuator arms 112. The second actuating arm 112'' should remain retracted as the first and third actuating arms 112', 112''' are retracting and extending, respectively, so that the second actuating arm 112'' does not exert any substantial force on the drill bit 13 during this period.

The signal processor 334 of the MWD tool 30 can be configured to calculate tool face angle based on the azimuth and inclination measurements obtained from the magnetometers 330 and accelerometers 332, using conventional techniques known to those skilled in the art of underground drilling. Alternatively, tool face angle can be calculated based on the techniques described in U.S. provisional application 60/676,072 entitled "Method and Apparatus for Measuring Instantaneous Tool Orientation While Rotating,"0 filed Apr. 29, 2005, the contents of which is incorporated by reference herein in its entirety. The calculated tool face angle can be transmitted from the signal processor to the controller 1118 by way of the short-hop telemetry device 336, and the short-hop circuit board and transducer 220. Information and commands relating to the direction of drilling can be transmitted between the surface and the RSM module 10 using the mud-pulse telemetry system 320, short-hop telemetry device 336, and the short-hop circuit board and transducer 220 (see FIG. 17). The pulser 323 of the mud-pulse telemetry system 320 can generate pressure pulses in the drilling mud being pumped through the drill collar 14, using techniques known to those skilled in the art of underground drilling. The controller 322 can encode the directional information it receives from the controller 1118 as a sequence of pressure pulses, and can command the pulser 323 to generate the sequence of pulses in the drilling mud. Furthermore, a strain-gage pressure transducer (not shown) located at the surface can sense the pressure pulses in the column of drilling mud, and can generate an electrical output representative of the pulses. The electrical output can be transmitted to surface control system 21b (FIG. 1), which can decode and analyze the data originally encoded in the mud pulses. The drilling operator can use this information, in conjunction with predetermined information about the earth formation 16, and the length of the drill string 12 that has been extended into the bore 17, to determine whether, and in what manner the direction of drilling should be altered.

Pressure pulses also can be generated in the column of drilling mud within the drill string 12, by a pulser (not shown) located on the surface. Directional commands for the RSM module 10 can be encoded in these pulses, based on inputs from the drilling operator. The pressure pulsation sensor 324 can sense the pressure pulses, and can send an output to the controller 322 representative of the sensed pressure pulses. The controller 322 be programmed to decode the information encoded in the pressure pulses. This information can be relayed to the controller 1118 by the short-hop telemetry device 336 of the MWD tool 30, and the short-hop circuit board and transducer 220, so that the controller 1118 can direct the drill bit 13 in a direction commanded by the drilling operator. The switching device 326 senses whether drilling mud is being pumped through the drill string 12. The switching device 326 is communicatively coupled to the controller 322. The controller 322 can be configured to store data received from the controller 1118 and the other components of the MWD tool 30 when drilling mud is not being pumped, as indicated by the output of the switching device 326. The controller 322 can initiate data transmission when the flow of drilling mud resumes. A suitable switching device 326 can be obtained from APS Technology, Inc. as the FlowStat™ Electronically Activated Flow Switch.

One embodiment of the rotary steerable module is described above. It should be appreciated that other rotatory steerable system, such a system whereby the arm 112 do not rotate along with housing 122, or other RSM systems can be used as described herein.

Figure 18:
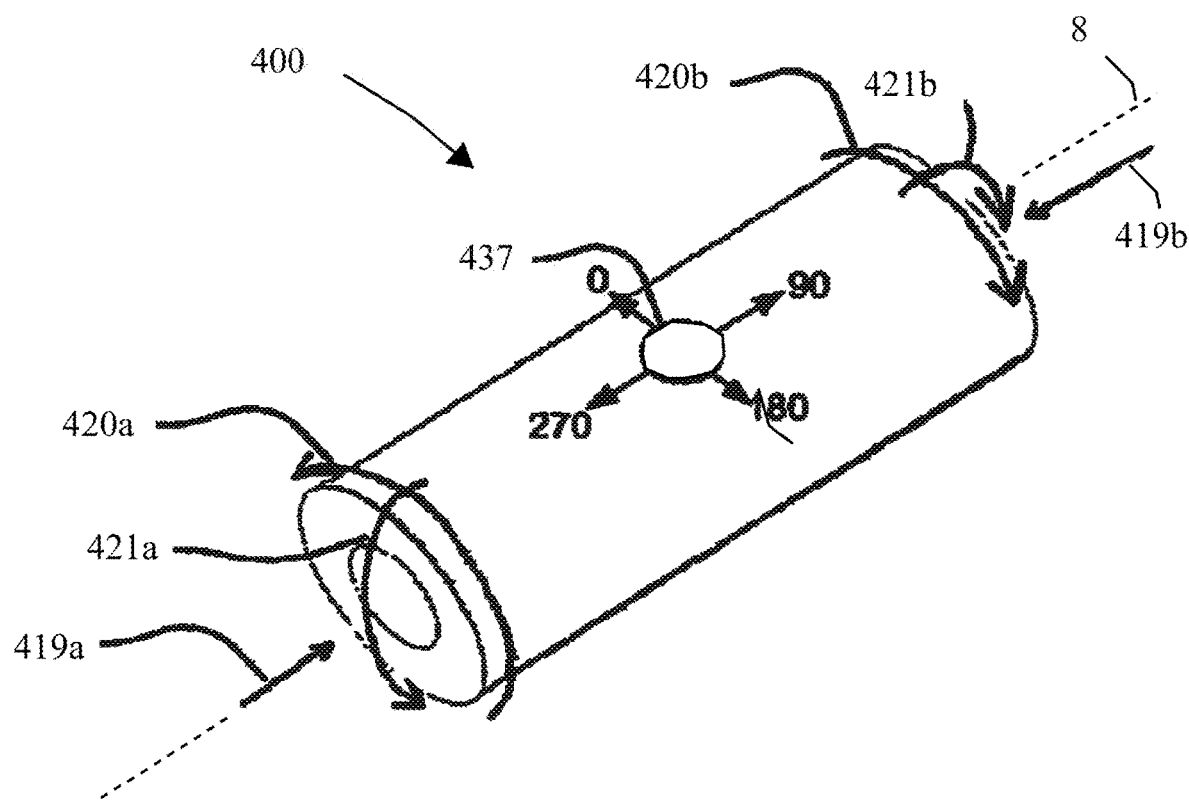
FIG. 18 is a perspective schematic view of a measurement subassembly of a force measurement system shown in FIGS. 1-17.
Figure 19:
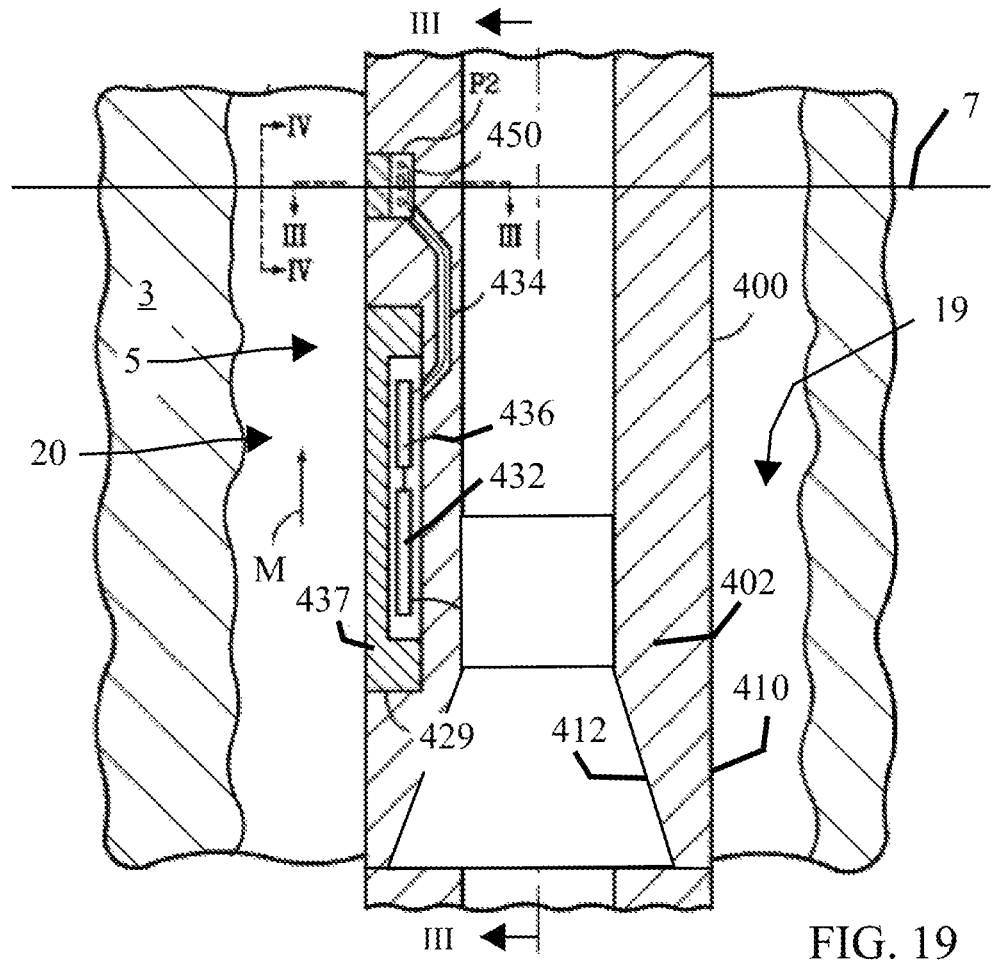
FIG. 19 is a longitudinal cross-sectional view of the measurement subassembly shown in FIGS. 1-17 through the drill collar portion of the drill string.

Turning to FIGS. 18-39, as noted above, the drill string component 6 includes a steering module 10 and force measurement system 20. With reference to FIGS. 18 and 19, the force measurement system 20 can be housed within a measurement subassembly 400 of drill string component 6, such as in the bit box. The measurement subassembly 400 can include one or more sensors carried by the bit box so that the sensor is close proximity to the drill bit 13 when the drill bit 13 is coupled the drill string component 6. In one embodiment, the one or more sensors are number a strain gauges 450 applied to a wall of a pocket or recess of the subassembly 400, as shown in FIGS. 18-27. In another embodiment, the one or more sensors can be replaceable strain sensor assembly 450 as shown in FIGS. 28 to 37, that is configured to be press-fit in the pocket and responsive to loads applied on or around the location where the strain sensor assembly 50 is contact with the subassembly wall. The force measurement system 20 is therefore configured to measure one or more forces applied to a drill bit 13 during a drilling operation and in particular during a drill bit deviation. According to one embodiment, the force measurement system 20 is configured to detect a bending load applied to drill bit 13, or bending-on-bit (BOB). During a drilling operation, a bending moment may be imposed on the drill bit 13 by the reaction forces on the bit 13, e.g. anomalies in the formation, and or the gravitational force applied to drill bit when the drilling system is drilling in a "tangential mode." The submerged weight of the drill string in the drilling fluid (e.g., mud) can also impact bending moment.

FIG. 18 illustrates three of the primary loads of interest acting on a schematic of a portion of the measurement subassembly 400 and drill bit 13(not shown). The tensile load is a force, or forces 419a, 419b, that attempt to stretch or compress the subassembly along the longitudinal axis 8. The torsion load 420a, 420b attempts to twist the subassembly about the longitudinal axis 8. The bending load 421a, 421b is bending of the longitudinal axis 8. The bending load on the drill bit 13 may result from the anomaly in the formation abutting the lower lateral edge of the drill bit 13 or from the curvature of the hole through which the drill string is boring. For example, if the desired borehole to form in a foundation is not directly downward into the earth, but rather changes direction or is to be bored at an angle (as shown in FIG. 1), the drill string bends to accommodate the directional changes. The weight on bit can cause buckling or bending stress at various points along the drill string. The amount of "weight on bit" may vary by adjusting the weight applied to the drill bit 13 when suspending a succession of drill collars and drill pipes from the rig 15. When rotating the drill string 12, the bending stress may change, which may modify the tensile stress values. As described in more detail below, at least one sensor, for instance a plurality of sensors, may be mounted in a respective pocket in the measurement subassembly 400 in suitable positions to detect one or more forces acting on the drill bit 13. The one or more forces may include bending loads acting on the drill bit 13 in particular.

Figure 20:
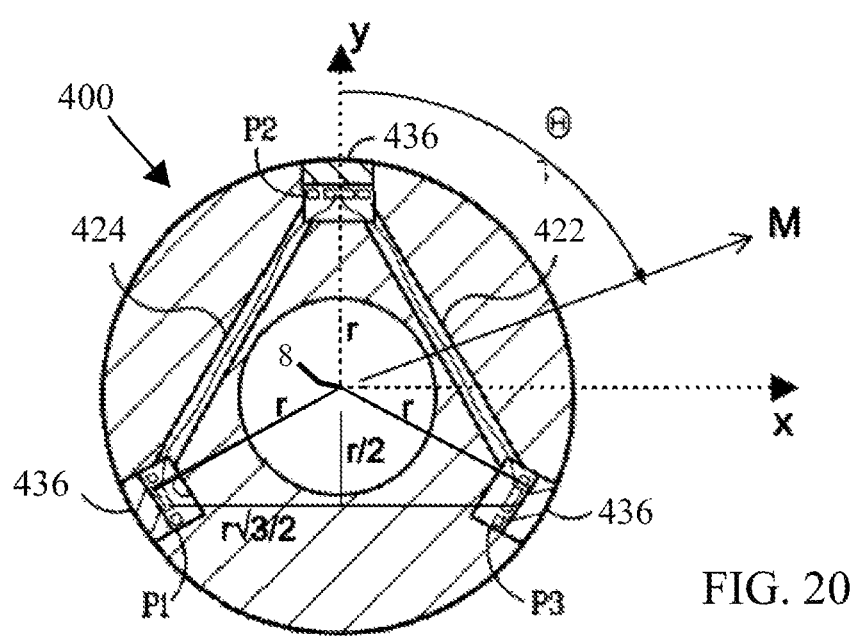
FIG. 20 is a cross-sectional view of measurement subassembly taken along line in FIG. 19.

FIGS. 19 and 20 are cross-sectional side view and sectional top views, respectively, or measurement subassembly 400 of the drill string component 6. The measurement subassembly 400 can be configured as a bit box that can be coupled the drill bit 13. As shown, the measurement subassembly 400 includes a body 402 having an outer surface 410 and an opposed inner surface 412. The inner surface 412, in turn, defines an internal passage 414 for permitting drilling mud to pass therethrough. The downhole end of the passage 414 forms lower tapered section sized to receive portion of the drill bit 13. The inner surface 412 of the body 402 includes a connection member, such as a standard API threaded connections or other suitable connections, for coupling the drill bit 13 to the subassembly 400. The body 402 defines multiple pockets or recesses P1, P2 and P3, each holding one or more sensors. The sensors 450 can be configured as strain gauges 450 designed to detect loads applied to the surfaces to which they are attached. The body 402 defines an additional pocket 429 for electronic components of the force measurement system 20, such as controller 432, a communications module 436, and a power source (not shown). The communications module 436 can be located further uphole as needed. As illustrated, pockets P1, P2, and P3 are circumferentially spaced around central axis 8 of the drill string component 6. In one example, the pockets, P1, P2, and P3 are located on a common plane 7 oriented perpendicularly to the central axis 8 of the drill string component 6 such that one or more of the strain gauges 450 in each pocket are aligned along the plane 7. The pockets P1, P2, P3 extend radially inward from and an outer surface 410 body 402 toward the central axis 8. The body 402 defines an inner wall 435 spaced from an outer surface 410 of the body 402, and a side wall 438 that extends from the outer surface 410 to the inner wall 435. Each pocket is closed by a cap 436, which is secured to the body 402 via any suitable fasteners, such as a snap ring (not shown). The cap 436 or wall 438 can incorporate O-rings (not shown) that seal the pocket from the drilling mud. The measurement subassembly 400 also includes several passageways interconnecting the pockets P1, P2 and P3. As shown in FIGS. 19 and 20, a first transversely extending passage 424 connects pockets P1 and P2, and a second transversely extending passage 422 connects pockets P2 and P3. As shown in FIG. 19, an axially extending passage 434 connects pocket P2 to the pocket 429 formed in the drill string component 6. The controller 432, which may be a microprocessor, can be housed within the pocket 429 and sealed with cap 437. The passages 422, 424, and 434 permit electrical conductors to extend between the pockets P1, P2 and P3 and between the pocket P2 and the pocket or 429 so as to complete the circuitry described below.

During drilling, the bending moment applied the subassembly 400 can be determined via one or more processors of the controller 432. For instance, during drilling the drill string component 6 and pockets P1, P2, P3 rotate. If both the drill string 12 and drill bit 13 are rotating, the axial tension or compression will vary with time. On the inside of the bend, the strain gauges 450 will be in compression and on the outside the strain gauges 450 will be in tension. The measured bending will vary, approximately sinusoidally, as the pockets P1, P2, P3 rotate. In such a case, the process calculates that the bending moment will be equal to one-half of the difference between the maximum and minimum readings over a time that covers several rotation periods, i.e., t1, t2, etc. The processor can average the results for all of the pockets P1, P2, and P2. This method of measurement can eliminate the contributions to the bending measurement that result from the weight on the drill bit or pressure, as the WOB and pressure measurements will be equal for all pockets and not dependent upon the orientation of the drill string component 6. This particular method can be used with one or more Wheatstone bridges. To determine whether or not the drill string or r subassembly 400 is rotating, in the absence of a rotation sensor, a limit on the variation of the individual readings can be used. Such a limit can be used as disclosed in U.S. Pat. No. 8,397,562 (the 562 patent), the entire contents of which are hereby incorporated by reference herein.

As noted above, the measurement subassembly 400 includes multiple strain gauges 450 in each pocket. For instance, certain strain gauges can be configured for bending-on-bit (BOB) and are referred to as BOB strain gauges 450A, other strain gauges are positioned to measure weight-on-bit (WOB) and are referred to as WOB strain gauges 450B, and other strain gauges are positioned to measure torque-on bit (TOB) and are referred to as TOB strain gauges 450C. In one example, the strain gauges in each pocket P1, P2, P3 are electrically connected so as to form three different sets of strain gauges (i.e., a BOB, WOB and TOB set of strain gauges). Each set is comprised of four strain gauges. For three pockets, then twelve strain gauges can be used to measures various forces applied to the subassembly 400.

Figure 21:
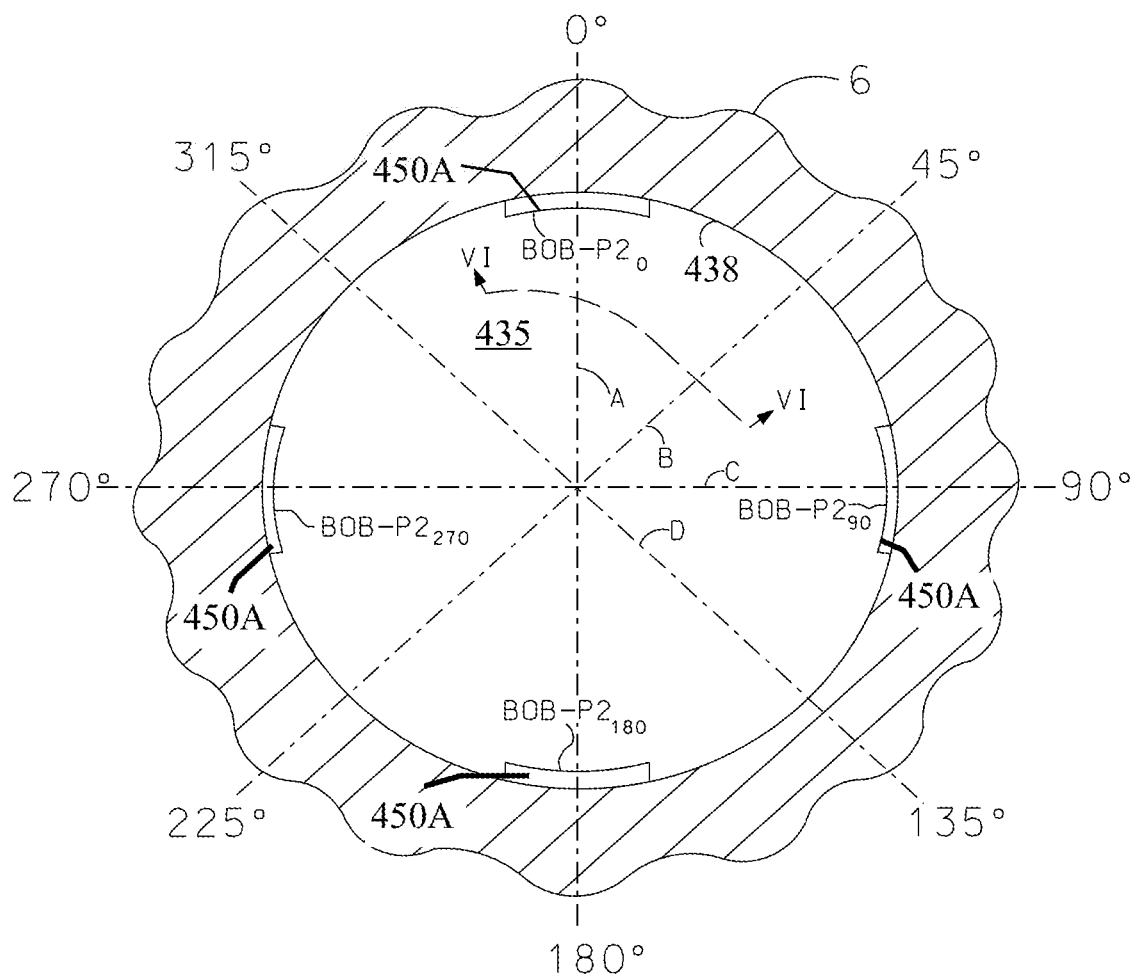
FIG. 21 is an elevation view taken along line IV-IV in FIG. 19 looking into a pocket, with the cap removed, showing the orientation of bending on bit sensors.
Figure 22:
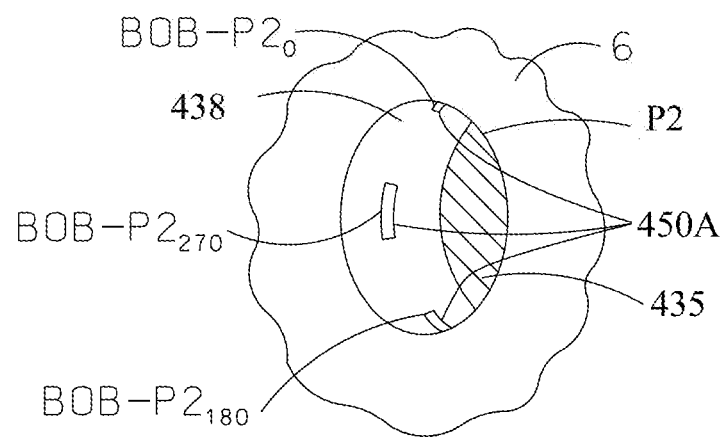
FIG. 22 is an isometric view of the pocket shown in FIG. 21.

FIGS. 21 and 22 illustrates sensors 450A positioned in pocket P2 to measure bending-on-bit (BOB). As shown in FIG. 21, four BOB strain gauges 450A are equidistantly spaced around the circumference of the pocket P2 at angles 0, 90, 180, and 270 orientations with the respect to the line A. For instance, BOB-P20 refers to strain gauge 450A at 0 degrees, BOB-P290 is the strain gauge 450A at 90 degrees, BOB-P2 180 is the strain gauge 450A at 180 degrees and BOB-P2270 is the strain gauge 450A at 270 degrees.

The set BOB strain gauges 450A in pocket P2 identified as BOB-P20, BOB-P290, BOB-P2180, and BOB-P2270, together with similarly oriented strain gauges in the other two pockets, are used to obtain data indicative of forces applied to the bit 13, and in particular the bending the drill bit 13. Strain gauges identified as BOB-P20 and BOB-P2180 are disposed on opposite sides of the pocket side wall 438 aligned along a line A that is parallel with the center axis 8 of the drill string component 6 so that BOB-P20 is located at the 0 degree circumferential orientation and BOB-P2180 is located at the 180 degree orientation, with 0 degree being top center of the pocket P2. Strain gauges identified as BOB-P290 and BOB-P2270 are also disposed on opposite sides of the pocket side wall 438 and located along a line C that is perpendicular to line A, and therefore to the center axis 8 of the drill string component 6. Strain gauge identified as BOB-P290 is located at the 90 degree orientation and strain gauge referred to as BOB-P2270 is located at the 270 degree orientation.

Figure 23:
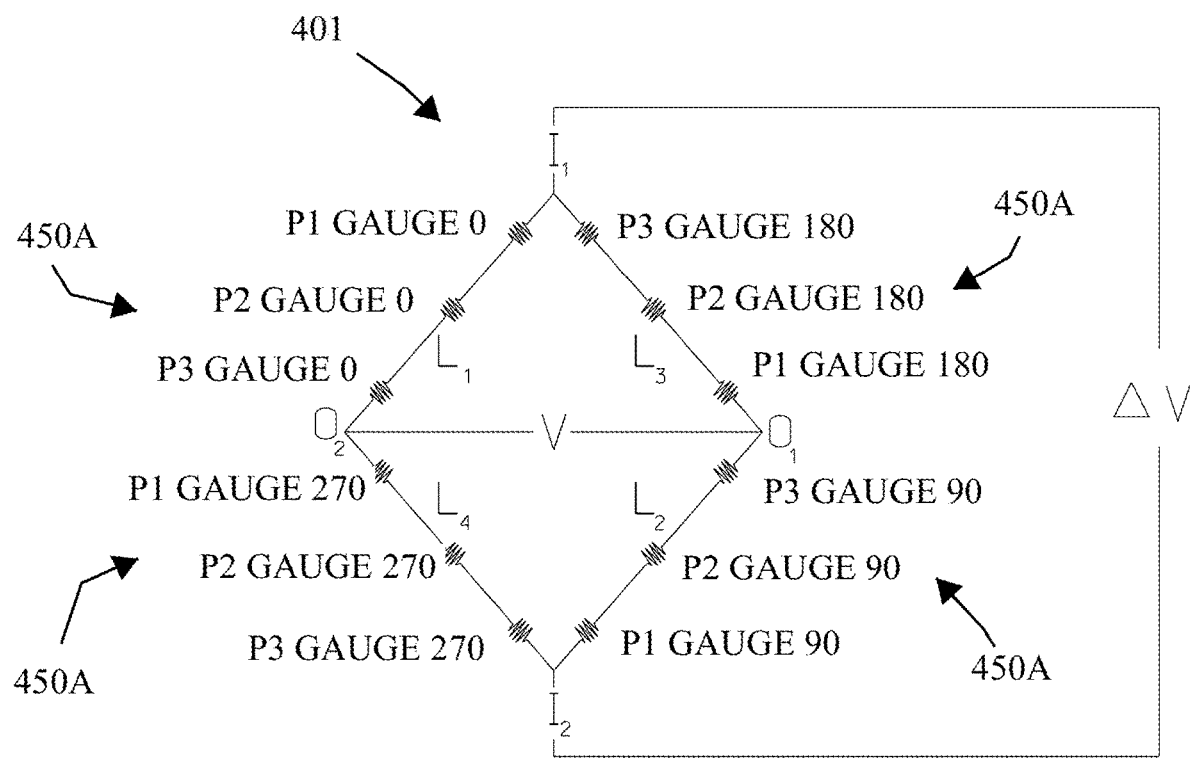
FIG. 23 is schematic diagram of a Wheastone Bridge for measuring the bending, according to the present disclosure.

FIG. 23 illustrates an exemplary Wheatstone bridge 401 used by the force measurement system 20 to obtain data indicative of BOB. As shown, the Wheatstone bridge 401 includes of twelve BOB strain gauges 450 arranged in four legs L1, L2, L3, and L4. Leg L1 is opposite to leg L2 and leg L3 is opposite to leg L4. Each leg, L1, L2, L3, and L4, uses three strain gauges 450A, one from a similar position in each of the pockets P1, P2 and P3. As shown, the BOB strain gauges 450A at the 0 degree orientation in each of the three pockets are connected in series along leg L1, illustrated as P1 GAUGE 0 P2 GAUGE 0 P3, GAUGE 0. The BOB strain gauges 450A at the 180 degree orientation in each of the three pockets are connected in series along leg L3 and are illustrated as P1 GAUGE 180, P2 GAUGE 180, P3 GAUGE 180. The BOB strain gauges 450A at the 90 degree orientation in each of the three pockets are connected in series along leg L2, and are illustrated as P1 GAUGE 90, P2 GAUGE 90, P3 GAUGE 90. The BOB strain gauges 450A at the 270 degree orientation in each of the three pockets are connected in series along leg L54, and are illustrated as P1 GAUGE 270, P2 GAUGE 270, P3 GAUGE 270. The junction formed by legs L1 and L3 forms a first input terminal I1 while the junction formed by legs L2 and L4 forms a second input terminal I2. The junction formed by legs L2 and L3 forms a first output terminal O1, while the junction formed by legs L4 and L1 forms a second output terminal O2. A voltage V is applied to bridge 401 and output signals along output terminal O2 is applied to an amplifier, if needed. The output signal is received by a relay and directed to a processor of the controller 432, where the signal is digitized.

The processor of the controller 432, based on the digitized signals, computes the bending loads applied to the strain gauges 450A in the respective pockets. In this example, the loads are indicative of bending forces applied to the drill bit 13 and includes a magnitude of the measured bending loads. The controller 432 causes the force data, along with data regarding the direction the forces were applied to drill bit 13, to the communications module 436. The magnitude of the force and the direction of a force application data can be referred to herein as force response data. The communications module 436 initiates a transmission of the force response data to the steering module 10. More specifically, the communication module 436 can transmit the force response data to a transducer/receiver housed in the controller system of the steering module 110, via one or more relays disposed at the downhole end of the drill collar 14 adjacent the bit box 105. The force response data is transmitted to controller 18 of steering module 10. The steering module controller 118, can cause activation of the actuating arms 112 to redirect or guide the drill bit 13 toward the predetermined well path in a direction that is opposite the direction the forces are applied the drill bit 13. This has effect of minimizing the deviation event and maintains the drill bit 13 on the well path. Accordingly, the force measurement system 20 and measurement subassembly 400 can include sensors, such as strain gauges 450A, arranged to determine bending on the drill bit 13. And to the extent that side forces acting on the drill bit 13 results in a deviation event, the force detection system 20, utilizing strain gauges 450A can determine the magnitude of the forces directed against drill bit 13, can correct the deviation by redirect the drill bit 13. As will be described next, in other examples, additional strain gauges can be used to obtain tensile and torsional force data.

Figure 24:
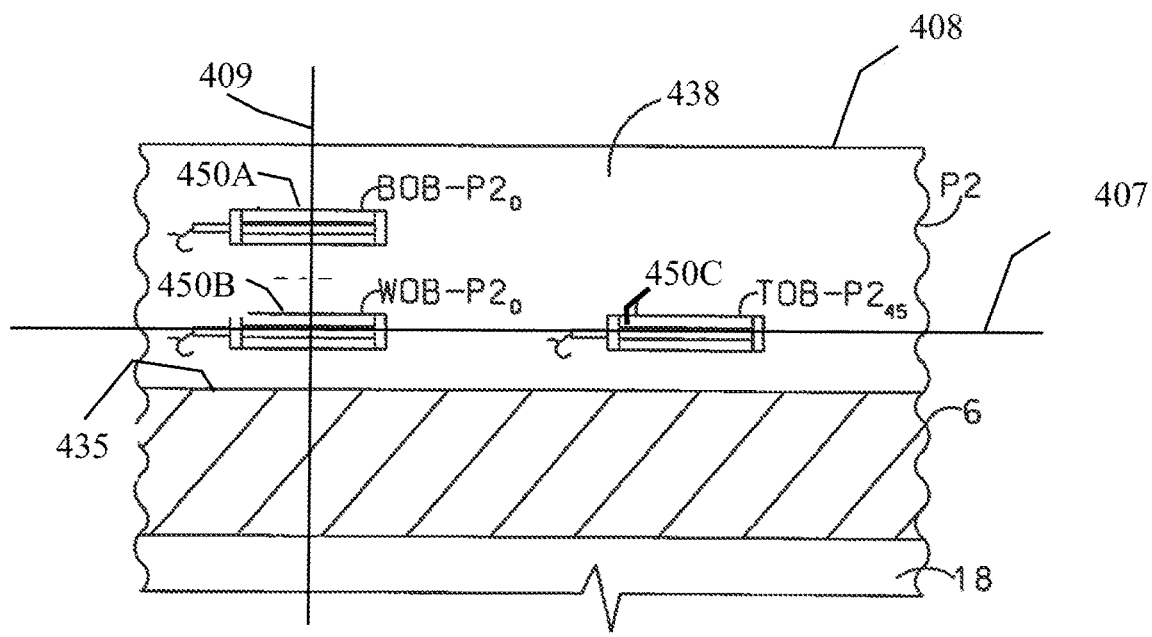
FIG. 24 is a view taken along line VI-VI in FIG. 21 showing a portion of the pocket with sensors affixed to pocket wall.

Turning to FIGS. 24-27, the force measurement system 20 can be configured to detect tensile, torsional, and bending loads applied to the subassembly 400 and drill bit 13. As shown in FIG. 24, the pocket P2 of measurement subassembly 400 can include BOB strain gauges 450A (similar to that shown in FIG. 23), WOB strain gauges 450B, and TOB strain gauges 450C. The WOB strain gauge 450B and TOB gauges 450C are positioned common plane 407 that is parallel to inner wall 435. The BOB strain gauge 450A is positioned between the WOB strain gauge 450B and the outer surface 410 along a radial axis 409 that is perpendicular to the plane 407. Both the BOB and WOB strains gauges 450A and 450A have the same orientation (0, 90, 180, and 270) in the pocket P2 (as well as other pockets). However, it is noted that the BOB gauges 450A may be placed either above or below the WOB gauges 450B. The arrangement is represented as "W/BOB", indicating that both a WOB and a BOB strain gauge are located at the particular orientation in and aligned along the radial axis 409, with one type of gauge located above the other type.

Figure 25A:
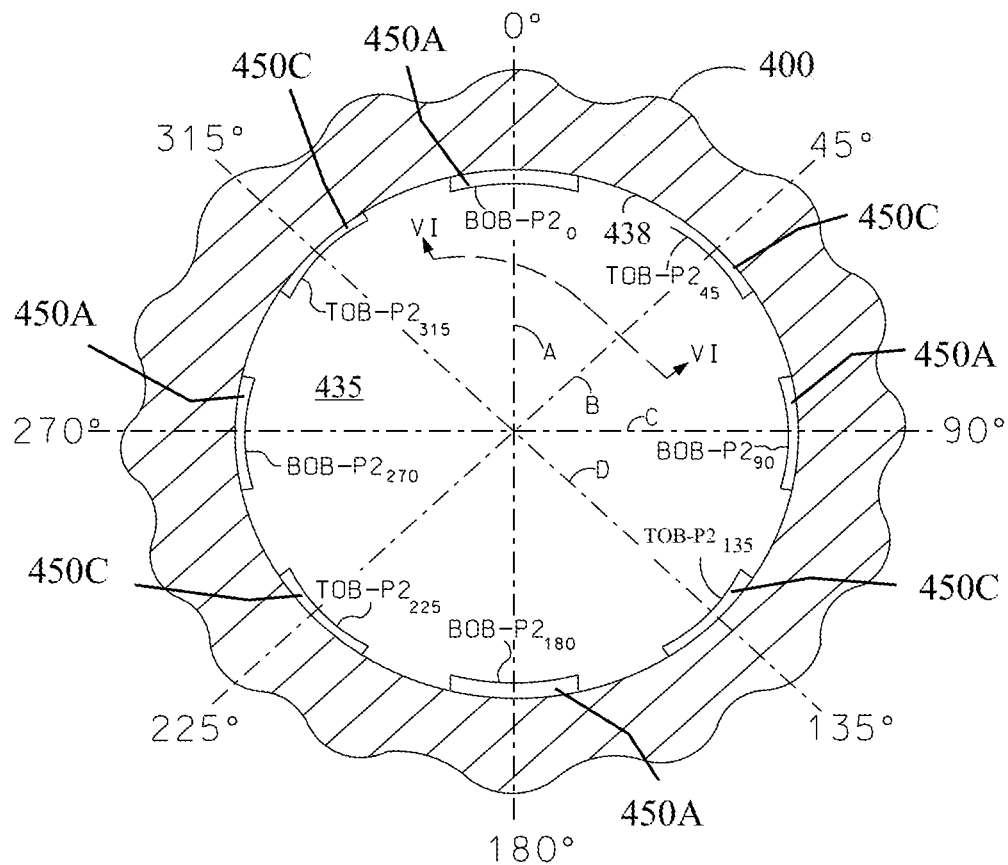
FIG. 25A is an elevation view taken along line IV-IV in FIG. 19 looking into the pocket, with the cap removed, showing the orientation of the weight on bit, torque on bit, and bending on bit sensors.
Figure 25B:
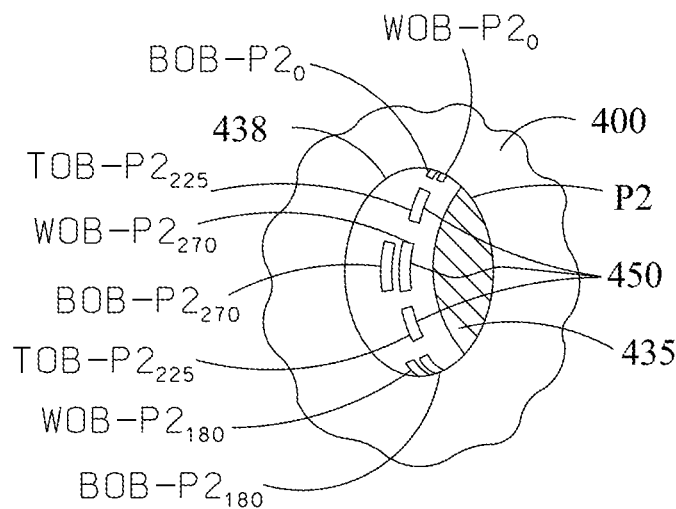
FIG. 25B is an isometric view of the pocket shown in FIG. 25A.

FIGS. 25A and 25B illustrate pocket P2 with BOB strain gauges 450A, TOB strain gauges 450C, and WOB strain gauges 450B. Figure except that TOB strain gauges 450C and WOB strain gauges 450B are, the strain gauges in each pocket are electrically connected so as to form three sets of strain gauges, each set comprised of four gauges. The second set or TOB strain gauges 450C in pocket P2 are identified as TOB-P245, TOB-P2135, TOB-P2225, and TOB-P2 and, together with similarly oriented strain gauges in the other two pockets, are used to determine the torque on the drill bit 13. Strain gauges TOB-P245 and TOB-P2225 are disposed on opposite sides of the pocket side wall 438 and located along a line B that is oriented 45° to the center line E of the drill collar 6 so that TOB-P245 is located at the 45° circumferential orientation and TOB-P2225 is located at the 225° orientation. Strain gauges TOB-P2135 and TOB-P2315 are also disposed on opposite sides of the pocket side wall 438 and are located along a line D that is perpendicular to line B, and therefore is also oriented at 45° to the center line 8 of the drill string component 6, so that TOB-P2135 is located at the 135° circumferential orientation and TOB-P2315 is located at the 315° orientation. The third set of strain gauges, or WOB strain gauges 450B in pocket P2, are identified as WOB, WOB-P20, WOB-P290, WOB-P2180, and WOB-P2270 can be positioned directly beneath each of the four BOB gauges shown in FIGS. 24 and 25A. Strain gauges WOB-P20 and WOB-P2180 can be disposed on opposite sides of the pocket side wall 38 along a line A that is parallel with the center line E of the drill collar 6 so that WOB-P20 is located at the 0° circumferential orientation and WOB-P2180 is located at the 180° orientation, with 0° being top dead center of the pocket P2. Also, similar to strain gauges BOB-P290 and BOB-P2270, strain gauges WOB-P290 and WOB-P2270 can also disposed on opposite sides of the pocket side wall 438 and located along line C so that WOB-P290 is located at the 90° circumferential orientation and WOB-P2270 is located at the 270° orientation.

The WOB, BOB and TOB gauges are connected into an electrical bridge arrangement. This allows the force measurement system 20 to measure the desired measurement, while canceling out the effects of the other measurements. For example, when an axial load is applied, the bridge arrangement combines the strain measures to calculate this load. The bridge arrangements for the BOB and the TOB stain gauges cancel out the axial load. As described in more detail with respect to FIG. 27, the arrangement of WOB and BOB gauges 450B and 450A, including the electrical connection between the different types of gauges, allow for measuring the weight on bit while canceling out the effect of bending, and for measuring the bending on bit while canceling out the effects of strain.

Figure 26A:
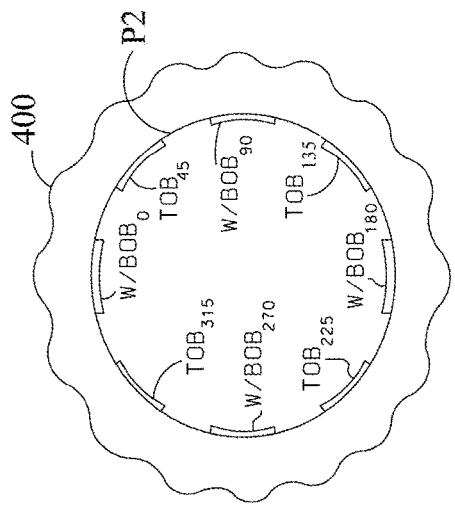
FIGS. 26A, 26C, and 26D show exaggerated views of the distortion of a pocket under compression, tension, and torsion, respectively.

As shown in FIG. 26A, when the portion of the drill string component 6 in the vicinity of a pocket P2 is subjected to pure axial compression, the strain gauges W/BOB0 and W/BOB180 are placed in tension, while strain gauges W/BOB90 and WBOB270 are placed in compression.

Figure 26B:
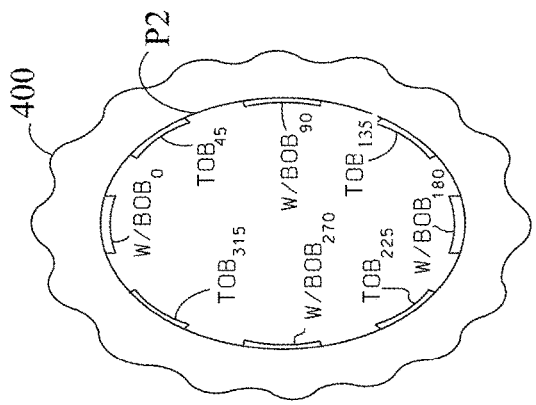
FIG. 26B depicts another example of the strain pattern in the hole for tension and torque.
Figure 26C:
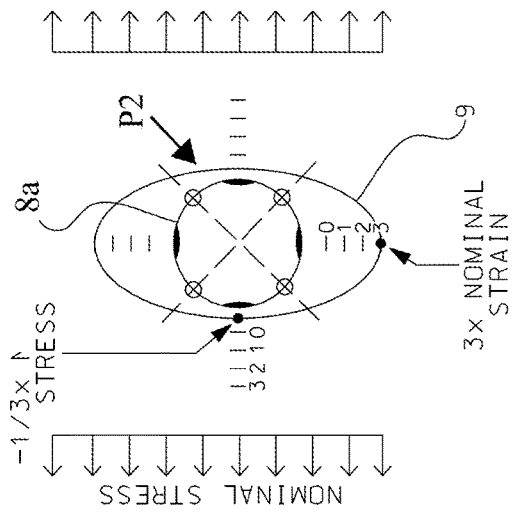

In FIG. 26B, when the portion of the drill string component 6 in the vicinity of a pocket P2 is subjected to pure axial tension, the strain gauges W/BOB0 and W/BOB180 are placed in compression, while strain gauges W/BOB90 and W/BOB270 are placed in tension. The WOB and BOB strains at each of the torque gauge locations for the same particular gauge are the same. However, the strain is not zero. The TOB bridge arrangement is designed to cancel out these strains. Strains developed from torque loads are dissimilar and occur in different directions at the torque gauge locations and the TOB bridge is arranged to measure these strains along those specific directions of orientation. Axial tension can result in a bending stress and/or strain on the drill bit. The BOB0, BOB180, BOB90, and BOB270 strain gauges measure the bending stress that results from the bending. The WOB0, WOB180 WOB 90, and WOB270 strain gauges measure the strain that results from the axial tension. In FIG. 26C, the inner line 8a is representative of an un-deflected pocket P2 and the outer line 9 is representative of a stress profile when the pocket P2 is under tension, such as that shown in FIG. 26B. The strain gauges located at 0 and 180 degrees sense 3× the nominal strain at this section in the subassembly 400. For example, if there is a nominal tensile strain, the strain at the location of these gauges is a tensile strain 3× the nominal strain. The strain at 90 and 270 is a compressive stress equal to −⅓× the nominal strain. For example, as shown in FIG. 26B, at W/BOB0 and W/BOB180, the strain is three times the nominal strain. At W/BOB90 and W/BOB270, the strain is −⅓ times the nominal strain.

Figure 26D:
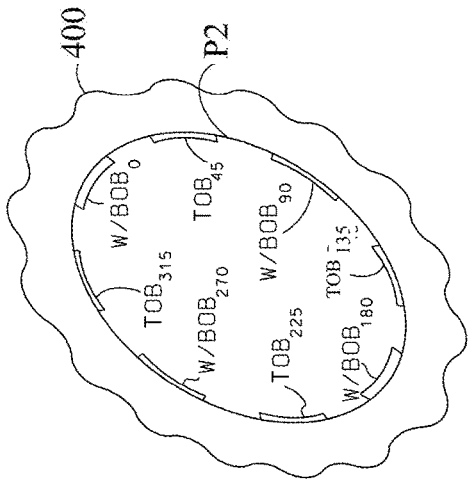

As shown in FIG. 26D, when the portion of the drill string component 6 in the vicinity of a pocket P2 is subjected to pure torsion, the strain gauges TOB45 and TOB225 are placed in compression, while strain gauges TOB135 and TOB315 are placed in tension. The four WOB and the four BOB strain gauges, however, are unaffected. The TOB bridge arrangement, using the TOB gauges as shown in FIG. 26D, is designed to cancel out these strains. Strains developed from torque loads are dissimilar and occur in different directions (not numbered) at the torque gauge locations. The TOB bridge is arranged to measure these strains the different locations.

Figure 27:
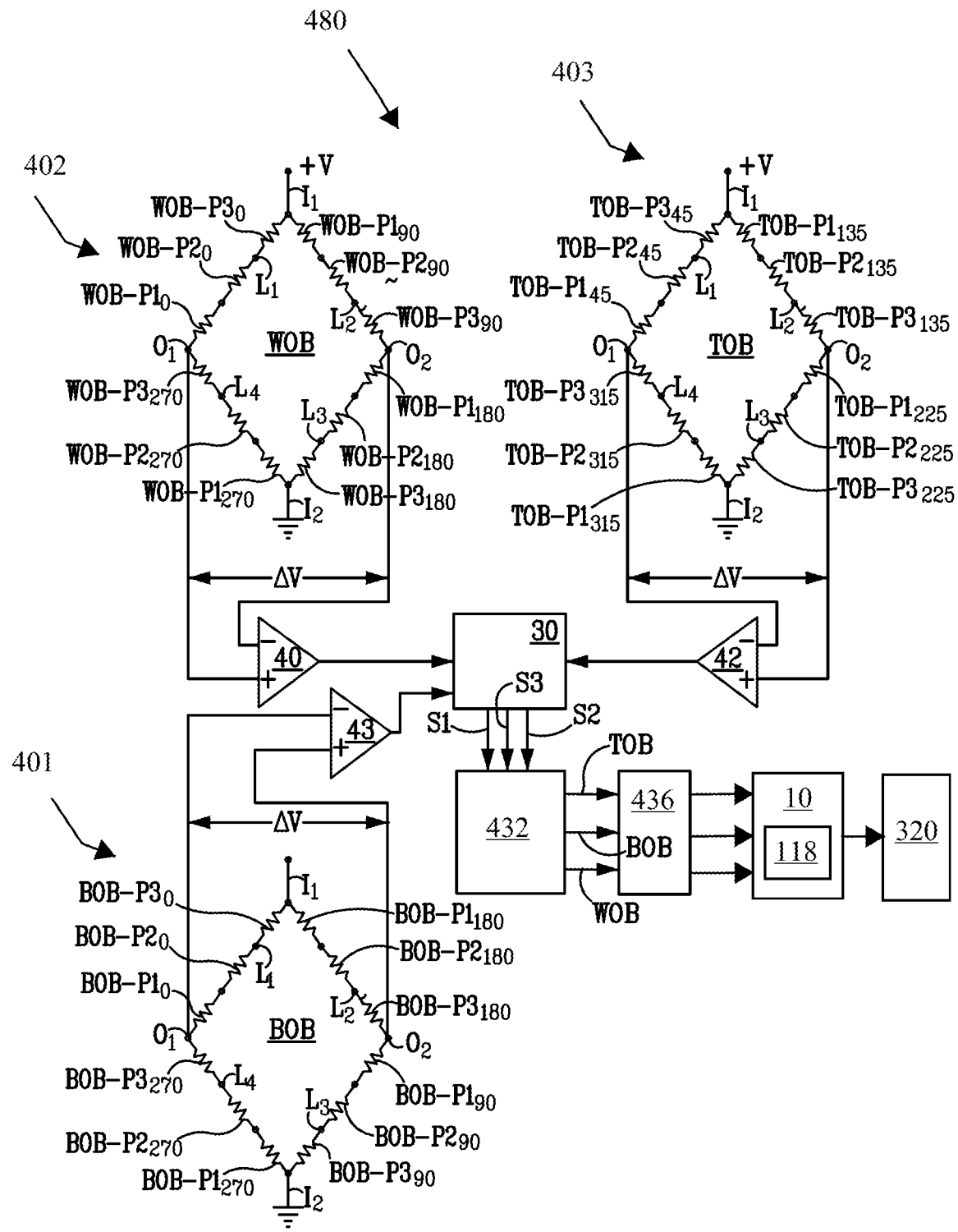
FIG. 27 is a schematic diagram of a circuit of a control system used to measure system tension, torque, and bending on a drill bit according to the present disclosure.

Turning to FIG. 27, a schematic diagram is shown for a circuit 480 that includes a control system for measuring the weight, bending, and torque on the drill bit 13. The circuit 480 includes a first Wheatstone bridge 402, a first Wheatstone bridge 403, and a third Wheatstone bridge 401, one each for the WOB gauges 450B, the TOB gauges 450C, the BOB gauges 450C, respectively. The circuit 480 includes multiple amplifiers 40, 42 and 43, voltage measurement devices (not numbered) arranged on the circuit board 30, the controller 432, and communications module 436 configured for communications with, or transmission data signals to the steering module 10.

Continuing with FIG. 27, the four WOB strain gauges in the first set of strain gauges from each of the three pockets, P1, P2, P3, are electrically connected to form the first Wheatstone bridge 402. The first Wheatstone bridge 701 includes of twelve WOB strain gauges arranged in four legs L1, L2, L3, and L4, with leg L1 being opposite to leg L3 and leg L2 being opposite to leg L4. For example, leg L1 includes WOB-P10 (WOB gauge from pocket P1, at the 0 degree orientation), WOB-P20 (WOB gauge from pocket P2, at the 0 degree orientation), and WOB-P30 (WOB gauge from pocket 3, P3, at the 0 degree orientation). Each leg, L1, L2, L3 and L4, uses three strain gauges, one from a similar position in each of the pockets. As shown, the WOB strain gauges at the 0 degree orientation in each of the three pockets are connected in series along leg L1, the WOB strain gauges at the 90 degree orientation in each of the three pockets are connected in series along leg L2, the WOB strain gauges at the 180 degree orientation in each of the three pockets are connected in series along leg L3, and the WOB strain gauges at the 270 degree orientation in each of the three pockets are connected in series along leg L4. The junction formed by legs L1 and L2 forms a first input terminal I1, while the junction formed by legs L3 and L4 forms a second input terminal I2. The junction formed by legs L2 and L3 forms a first output terminal O1, while the junction formed by legs L4 and L1 forms a second output terminal O2.

As also shown in FIG. 27, the four TOB strain gauges in the second set of strain gauges from each of the three pockets are formed into the second Wheatstone bridge 403. The second Wheatstone bridge 403 includes twelve TOB strain gauges arranged in four legs L1, L2, L3, and L4, with leg L1 being opposite to leg L3 and leg L2 being opposite to leg L4. As shown, the TOB strain gauges at the 45 degree orientation in each of the three pockets are connected in series along leg L1, the TOB strain gauges at the 135 degree orientation in each of the three pockets are connected in series along leg L2, the TOB strain gauges at the 225 degree orientation in each of the three pockets are connected in series along leg L3, and the TOB strain gauges at the 315 degree orientation in each of the three pockets are connected in series along leg L4. The junction formed by legs L1 and L2 forms a first input terminal I1, while the junction formed by legs L3 and L4 forms a second input terminal I2. The junction formed by legs L2 and L3 forms a first output terminal O1, while the junction formed by legs L4 and L1 forms a second output terminal O2.

Continuing with FIG. 27, the third BOB Wheatstone bridge 401 is similar to that described above with respect to FIG. 23. Wheatstone bridge 401 includes of twelve BOB strain gauges 450A arranged in four legs L1, L2, L3, and L4, with leg L1 being opposite to leg L2 and leg L3 being opposite to leg L4. As shown, the BOB strain gauges at the 0 degree orientation in each of the three pockets are connected in series along leg L1, the BOB strain gauges at the 180 degree orientation in each of the three pockets are connected in series along leg L3, the BOB strain gauges at the 90 degree orientation in each of the three pockets are connected in series along leg L2, and the BOB strain gauges at the 270 degree orientation in each of the three pockets are connected in series along leg L4.

In operation, for instance during a drilling operation, voltages V are applied across the circuit 480 at the pair of input terminals I1, I2, I3, of each of the bridges 401, 402, and 403. The resistance of the strain gauges in each bridge 401, 402, and 403 is such that when the strain gauges are unstrained, each bridge 401, 402, and 403 is balanced and the voltage ΔV across the pair of output terminals O1, O2, O3, is at or near zero. However, the resistance of the strain gauges varies proportionately with the strain so that distortion of the portion of the subassembly 400 around the pocket wall 438 to which the gauges 450 are affixed will result in a voltage drop ΔV across the output terminals O1, O2, O3. The voltage drop ΔV is indicative of strain applied the strain gauges. The equations for determining voltage drop ΔV across the bridges is known to persons of skill in the art and are further disclosed in the '562 patent. The equations set forth in the '562 patent are incorporated by reference into this disclosure.

The strain gauges 450 in the pockets of the subassembly 400 so that only a particular measurement value is evaluated based on the type of load applied the subassembly 400. Due to the positions of strain gauges 450 and their arrangement along the respective bridges, variations in the bending load on the subassembly 400 resulting from side forces applied to the drill bit 13 will have little, if any effect on the output voltages V of either the WOB or TOB bridges 402 and 403. Because the net effect of strain induced by bending is canceled out within each of the legs of the bridges 402 and 403. Similarly, the weight or torque voltages cancel out such that the net effect of weight and torque are canceled out within each of the legs of the BOB bridge. The differences are noted between the arrangement of legs in the WOB Wheatstone bridge 402 and the legs in the BOB Wheatstone bridge 401. The variation in the electrical connection cancels out the WOB measurements such that the bending on bit alone can be evaluated.

With respect to the WOB measurement, the torque and bending loads will have little, if any, effect on the output voltage of the WOB bridge. Bending is cancelled due to each arm of the bridge having a net change of resistance at or near "0," as determined in the '562 patent for example. Assuming that the collar is oriented such that pocket P1 has the full bending strain, then the other two pockets P2 and P3 located 120 degrees from pocket P1 have half the strain as pocket P1. The strain is also opposite that of pocket P1. Therefore, for torque, the strain in each of the WOB gauges is at or near zero and therefore does not influence the measurement.

Figure 28:
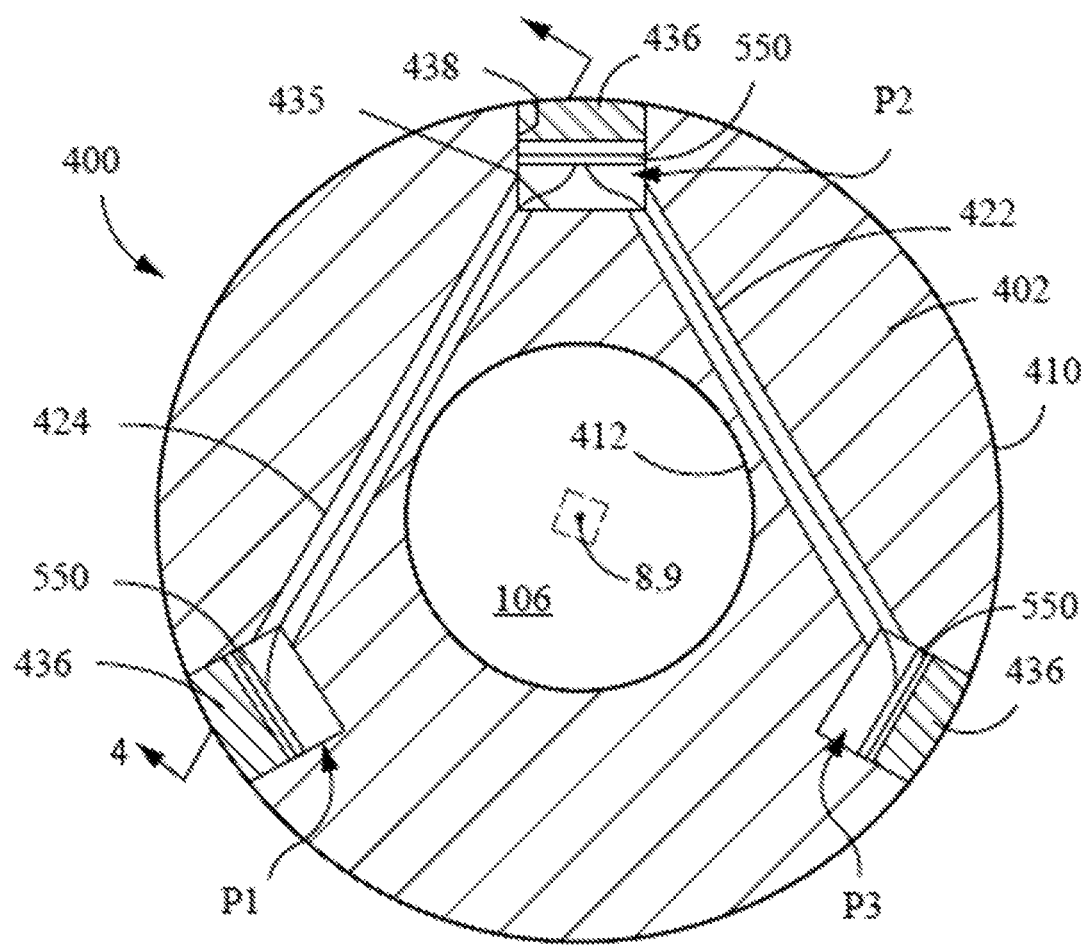
FIG. 28 is a view similar to FIG. 19 showing an alternate embodiment of a sensor assembly for measuring forces applied to the drill bit.
Figure 29:
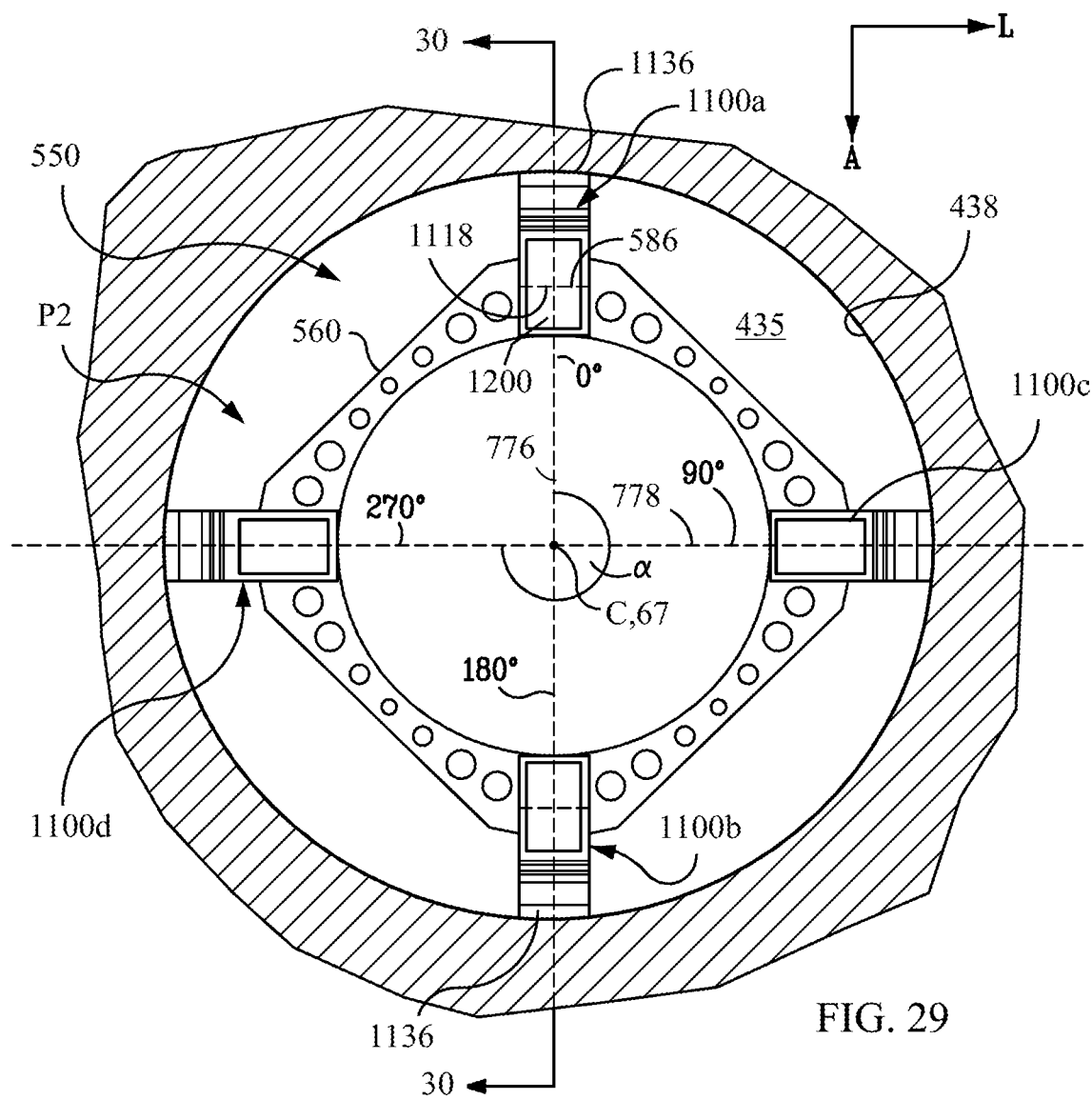
FIG. 29 is a side view of sensor assembly disposed in a recess of the measurement subassembly, with a cap removed to illustrate the sensor assembly having an interference fit within a recess.
Figure 30:
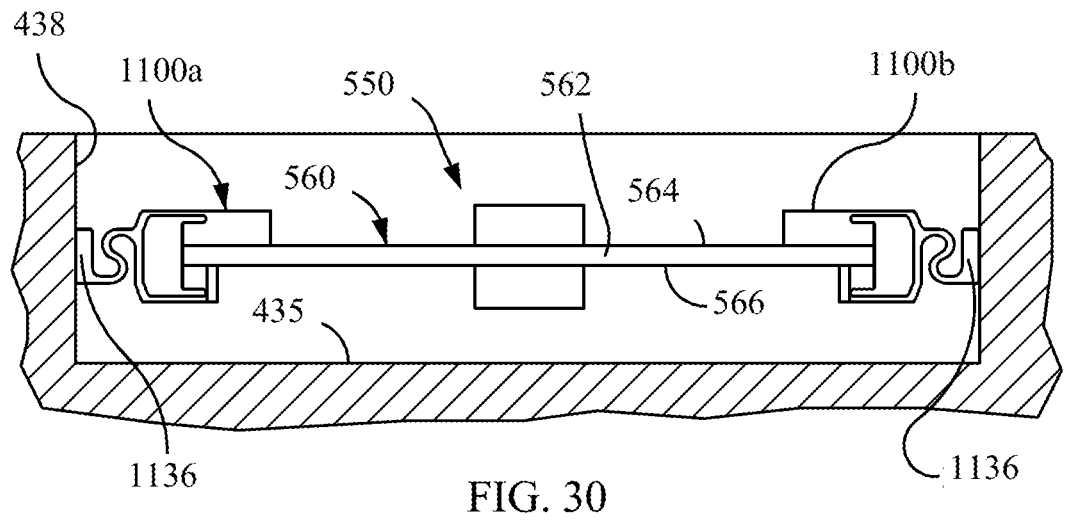
FIG. 30 is a cross-sectional view of the strain sensor assembly in a recess taken along line 30-30 in FIG. 29.

With respect to the TOB measurement, the TOB gauges are oriented in such a way that so as to measure torque induced strains on the subassembly 400. For example, the TOB gauges are mounted 45 degrees from the WOB gauges (FIG. 28). Torque develops tensile strain on two gauges in each pocket P2 that are opposite to each other, and compressive stress in the other two TOB strain gauges. The bridge circuit 403 (FIG. 27) is arranged such that the similar strain gauges are in opposite legs of the bridge 403. The WOB strains at the TOB gauges are identical for all gauges. The effect of WOB on the TOB bridge is at or near "0" and therefore WOB strains are self-canceling for the TOB bridge 403. Furthermore, when the top of the drill string component 6 bends, pocket P2 is placed in axial compression (as indicated in FIG. 26A) and gauge WOB-P20 is placed in tension, thereby increasing its resistance. However, pockets P2 and P3 would be placed in axial tension (FIG. 26B) so that gauges WOB-P10 and WOB-P30 are each placed in compression, thereby decreasing their resistance along the bridge. Since the gauges WOB-P10, WOB-P20, and WOB-P30 are connected in series in leg L1 of the WOB bridge 403, there is no net change in the resistance of this leg. A similar canceling out occurs in the other three legs of the WOB bridge 403 so that the bending strain on the subassembly results in no change in the voltage across the output terminals of the WOB bridge 403. Since the TOB gauges 450C are located along lines that are oriented at 45 degree to the centerline of the drill string component 6, the TOB bridge 403 is also unaffected by bending strain.

Continuing with FIG. 27, as noted above strains indicated by the WOB, TOB, and BOB bridges 402, 403 and 401, respectively, can be determined from the change in voltage across their respective output terminals O1, O2, and O3, by equations familiar to a person of skill in art and included in the '562 patent as noted above. With reference to circuit 480, a process of obtaining voltage drop signals from each bridge 401, 402 and 403, and further processing the voltages drop signals into force response data indicative of loads applied the subassembly 400. As shown in FIG. 27, the voltage drop ΔV from BOB bridge 401, WOB bridge 402 and, TOB 403, and 401 are amplified by optional amplifiers 43, 42, and 41, respectively and are relayed to voltage meters (not numbered) on board 30. The output signals S1, S3, and S2, which are representative of the strain sensed by the BOB gauges 450A, WOB gauges 450B, and TOB gauges 450C, respectively, are relayed to the controller 432, where they are digitized. Using the digitized signals, the at least one controller 432 determines the magnitude of force components applied to the subassembly 400. More specifically, the processor computes the weight, torque, and bending force data applied to the subassembly 400. The force data is related to the communication module 436. The controller 432 further cause the directional components of the force data to be transmitted to the controller 118. For instance, in what direction relative to the central axis 8 that a predominate force applied the subassembly 400 that cause the deviation of the bit 13. The controller 118, based on the force response data (which includes magnitude of the forces and directions of application) received from the controller 432 of the force measurement system 20, activates the arms 112 (FIG. 2) as needed to redirect the drill bit 13 to the well path along a direction that is opposed to the direction the forces where applied to the drill bit 13 as measured at the subassembly 400. The force response data can be further transmitted to the surface via the telemetry system 320.

The measurement subassembly 400 can include annulus and bore pressure transducers as well as a temperature sensor to permit temperature and pressure compensation. Using techniques well known in the art, the processor uses the pressure measurement to calculate the strain due to pressure and then subtract or add this from the apparent forces values, such as strain, to get the true WOB and TOB strains. Similarly, based on a data supplied by the strain gauge manufacturer and stored in the controller 432, the processor is configured to make a a temperature correction to the force data.

As illustrated, the subassembly 400 includes four strain gauges 450 for each Wheatstone bridge (WOB, TOB, and BOB), the force measurement system 20 could also be practiced used only two TOB strain gauges in each pocket provided that they oppose each other—for example, TOB-P245 and TOB-P2225 or TOB-P2135 and TOB-P2315. In this case, precision resistors would be used in the other two legs to balance the bridge. Furthermore, although the subassembly 400 has been described with three pockets P1, P2 and P3, any greater number of pockets could also be utilized provided that the pockets are circumferentially spaced equidistantly and provided that each of the strain gauges are oriented in the same location in each respective pocket (e.g., each of the 0 degree gauges) and connected into the same leg of the respective bridges. Moreover, although in the embodiment discussed above, each pocket is aligned along a common plane oriented perpendicularly to the axis of the pocket, the gauges could be located along in pockets located along different planes oriented perpendicularly to the axis of the pocket but displaced from each other along that axis. In such an embodiment, each pair of opposing gauges (e.g., the 0 degree and 180 degree pair of gauges) should be located in approximately the same plane. Furthermore, the WOB and TOB strain gauges 450B and 450C need not be located in the same pocket—the WOB gauges 450B could be located in one set of at least three equidistantly spaced pockets and the TOB gauges 450C located in another, independent set of at least three equidistantly spaced pockets.

Figure 34:
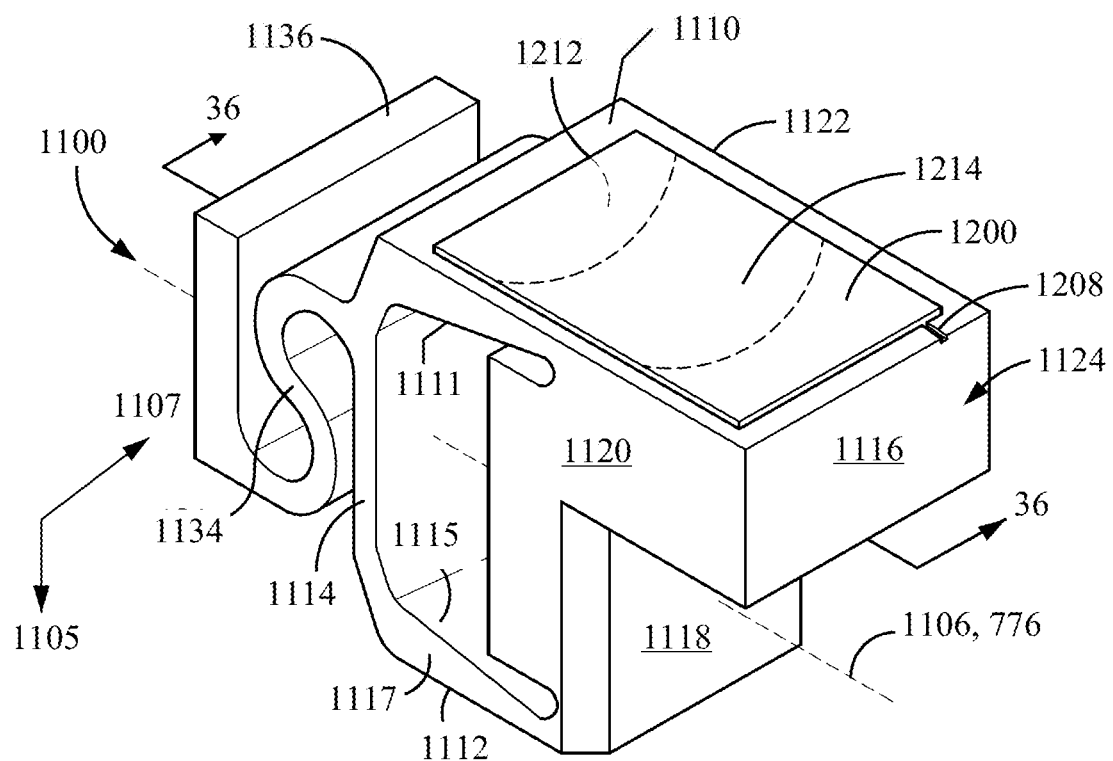
FIG. 34 is a perspective view of a strain gauge member of the strain sensor assembly shown in FIG. 31.
Figure 35:
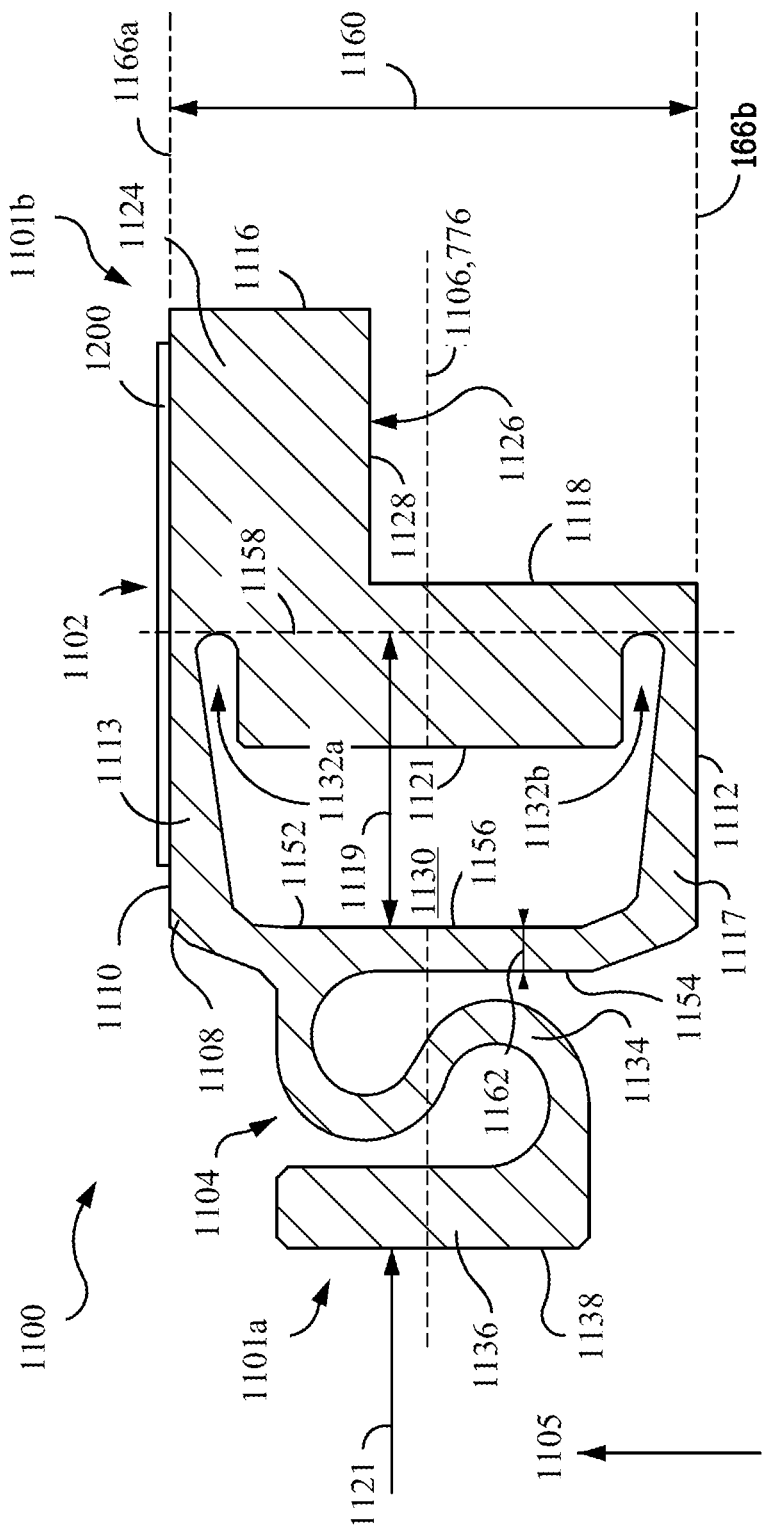
FIG. 35 is a cross-sectional view of the strain gauge member taken along line 36-36 in FIG. 34.
Figure 36:
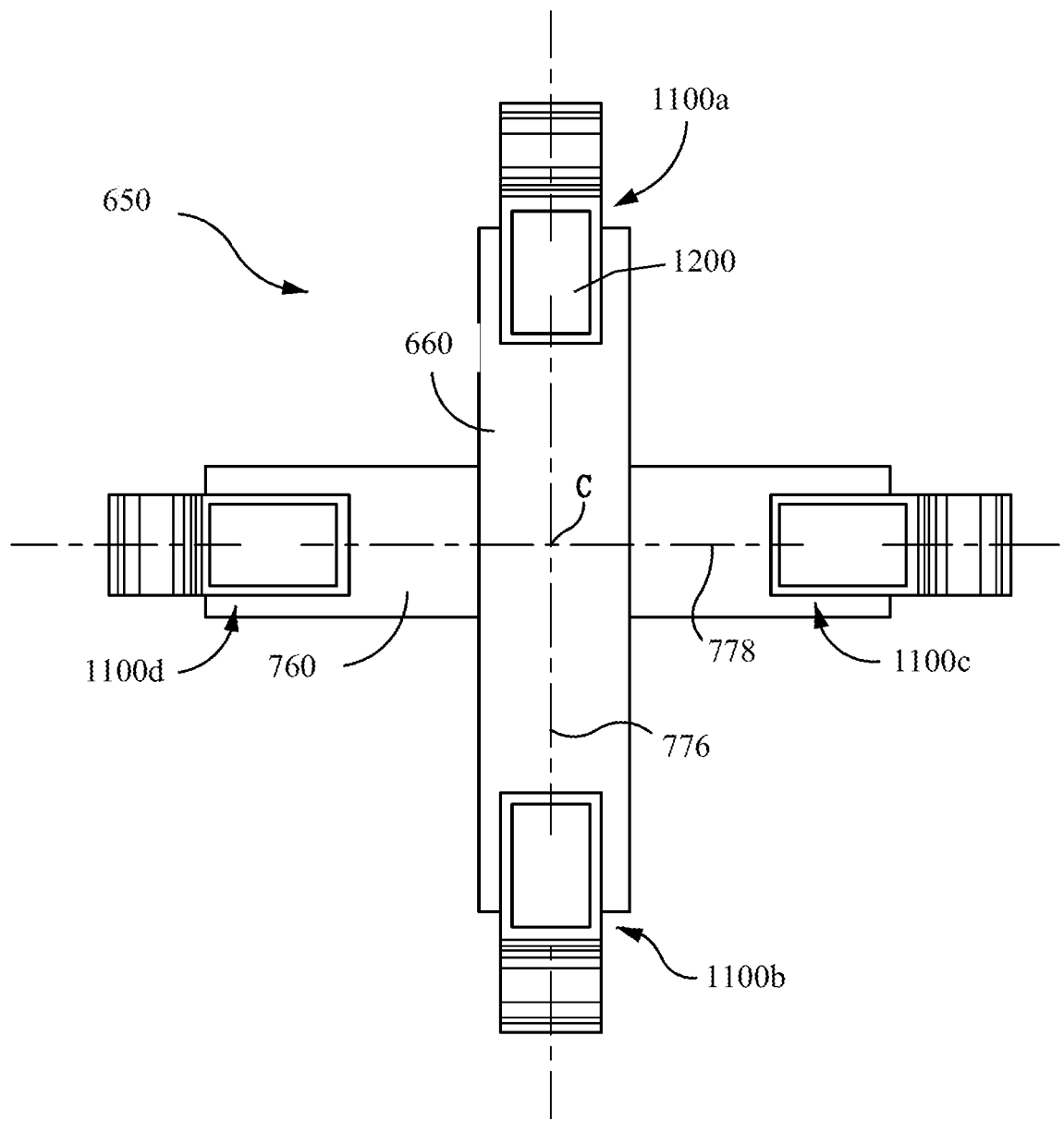
FIG. 36 is a top plan view of the strain sensor according an alternative embodiment of the disclosure.

Turning now to FIGS. 28-36, which illustrate an alternate embodiment of a sensor carried by the measurement subassembly 400 and used to obtain data indicative of loads applied the subassembly 400 and drill bit 13. In accordance with an alternative embodiment and referring to FIGS. 28-30, the force measurement system 20 (not shown) can include a sensor, such as a strain sensor assembly 550, that is configured for removable placement in the pocket P1, P2, etc., of the measurement subassembly 400. The strain sensor assembly 550 includes a support member 560 and a plurality of strain gauge members 1100 supported by, for instance attached to, the strain sensor assembly 550. As noted above, the strain gauge members 1100a, 1100b, 1100c and 1100d (or a pair of strain gauge members 1100a and 1100b) extend out from the support member 560 to apply a biasing force against the wall 438 of the recess such that the strain sensor assembly 550 forms an interference fit with the wall 438. In accordance with the illustrated embodiment, the support member 560 defines a support member body 562 that includes an upper surface 564 and an opposed lower surface 566 spaced from the upper surface 564 along a support member central axis 67. The support member body 562 includes four side portions 69a, 69b, 69c, and 69d. Opposing pairs of the side portions 69a . . . 69d are equidistantly spaced from the support member central axis 67 such that the support member central axis 67 extends through a geometric center C of the support member 560. The support member body 562 also includes a central opening 68 that extends through the support member body 562 along the support member central axis 67. The central opening 568 can be circular and is coaxial with the support member central axis 67 and center C. In the illustrated embodiment, the support member body 562 defines a ring shape. While a ring shape is illustrated, it should be appreciated that the support member body can define a circular, oval, or square shaped plate, i.e. without a central opening. In other alternative embodiments, the support member body 562 can define a rectilinear shape configured to support a pair of strain gauge members (FIG. 36). The support member body also defines a plurality of holes 571 that extend from the upper surface to the lower surface through the body. The plurality of holes 571 reduce the overall mass of the support member body, can be used to help orient sensor in the recess and may be used as wire passageways.

Figure 31:
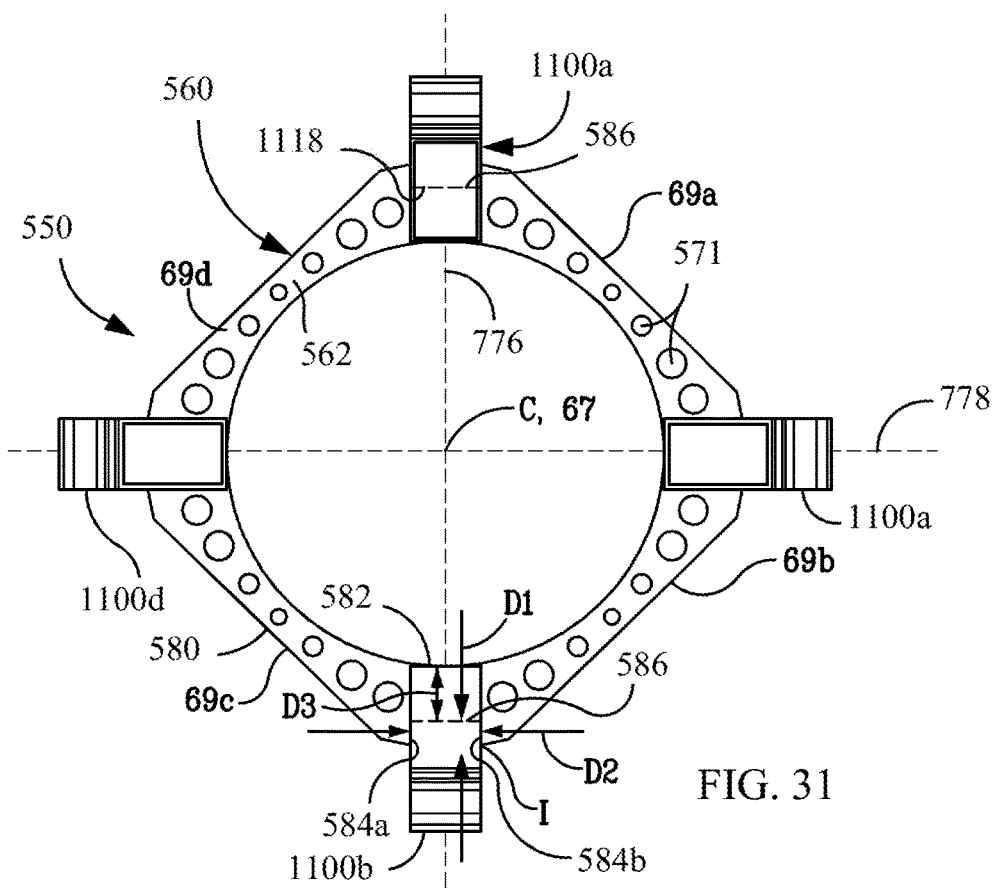
FIG. 31 is a top plan view of a sensor assembly shown in FIGS. 28-30.
Figure 32:
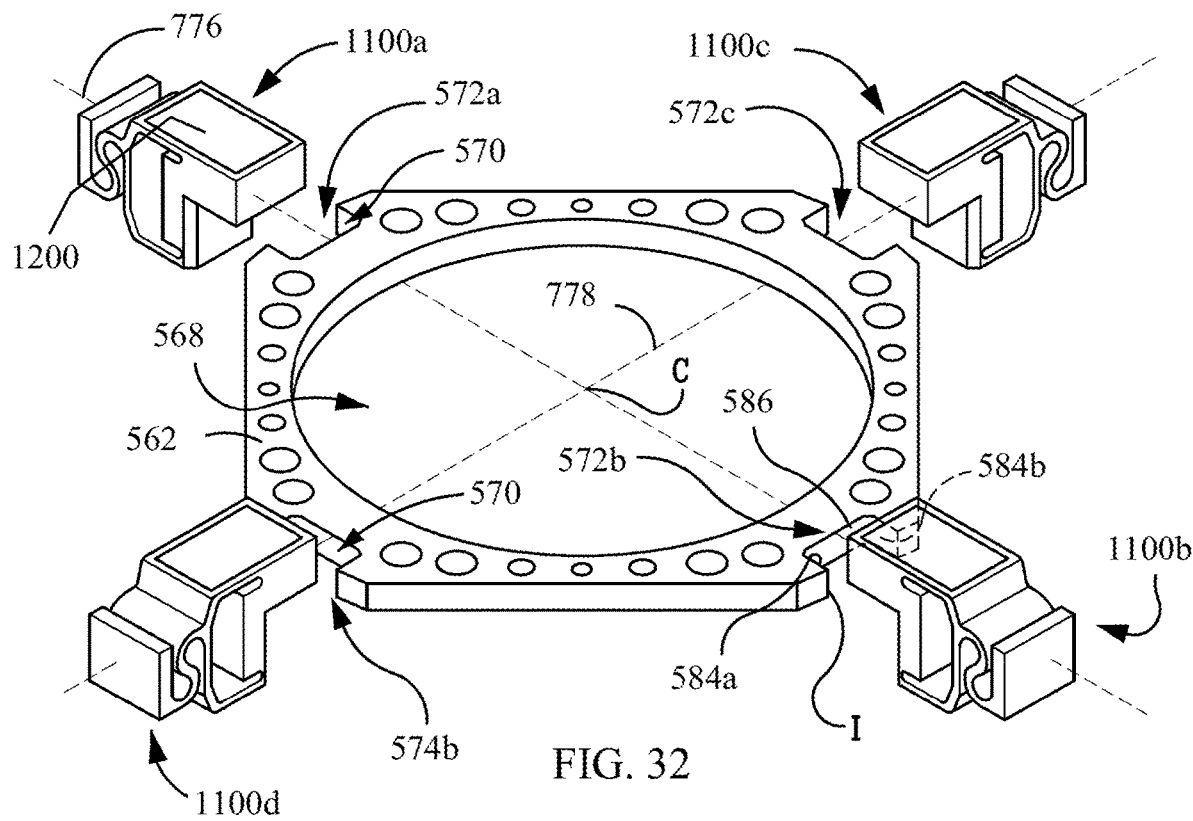
FIG. 32 is an exploded perspective view the sensor assembly shown in FIG. 31.

As shown in FIGS. 31 and 32, the support member body 562 includes a plurality of notches 572, such as at least two notches, each configured to receive a respective strain gauge member 1100. The plurality of notches includes a first pair of notches 572a and 572b and a second pair of notches 574a and 574b. The first pair of notches 572a and 572b are aligned along a first axis 776 that is perpendicular to the support member central axis 67. The second pair of notches 574a and 574b are aligned along a second axis 778 that is perpendicular to the first axis 776 and the support member central axis 67. The first, second and central axes 776, 778, and 67, respectively, can intersect at the common intersection point, such as the center C. As will be further detailed below, the orientation of the strain sensor assembly 550 in the respective recess determines how the respective first and second axes 776 and 778 align with central longitudinal axis 8 of the drill string 6. The support member body 562 (FIG. 31) defines an outer side wall 580 that extends from the upper surface 564 to the lower surface 566 and an opposed inner wall 582. The inner wall 582 at least partially defines the central opening 568. The outer and inner walls 580 and 582 can have a thickness that is less than a width of the upper and lower surfaces 564 and 566 of the support member.

Continuing with FIGS. 31 and 32, the support member body 562 further define, for each respective notch, a pair of notch side walls 584a and 584b and an abutment wall 586. The notch side walls 584a and 584b extend from the outer wall 580 along respective first and second axes 776 and 778 toward the abutment wall 586. The outer walls 580 intersect notch side's walls 584a and 84b at an intersection I. The abutment wall 586 is opposed to and spaced from the inner wall 582. Accordingly, the notch 572 has a first dimension D1 (FIG. 31) defined as the distance from the intersection I to the abutment wall 86 along a direction that is aligned with the axis 776. Notch 572 can have a second dimension D2 defined as the distance that extend from notch side wall 584a to notch side wall 584b along an axis (not shown) that is perpendicular to axis 776. The support member body 562 can define a third dimension D3 (FIG. 31) that is the distance from the abutment wall 586 to the inner wall 582 along the respective first and second axes 776 and 778. The first, second and third dimensions are D1, D2, and D3 are selected so as to receive similarly dimensioned portions of the strain gauge member 1100 as will be detailed below. It should be appreciated that the configuration of the notch 572 can vary based on the design of the strain gauge member 1100. For instance, the notch can have curvilinear portions. In other embodiments, the notch can be a plurality of spaced apart slots that extend into the support member body 562. In still other embodiments, the notches can be defined by at least one of the upper and lower surfaces of the support member body 562. In still other alternative embodiments, the support member body 562 may not have notches.

Continuing with FIGS. 31 and 32, the support member 560 is rigid so as to assist positioning the strain sensor in the recess P2 and is yet configured to such that loads applied the structure over a range of operating conditions can be transferred between the structure and the support member. In a preferred embodiment, the support member 560 is made of a material that will match or at least possess a similar coefficient of thermal expansion as the material of the recess structure. The support member 560 is preferably made of metallic materials such as metallic alloys, stainless steel, titanium, nickel, non-ferrous alloys, and/or metal matrix composites.

Figure 33:
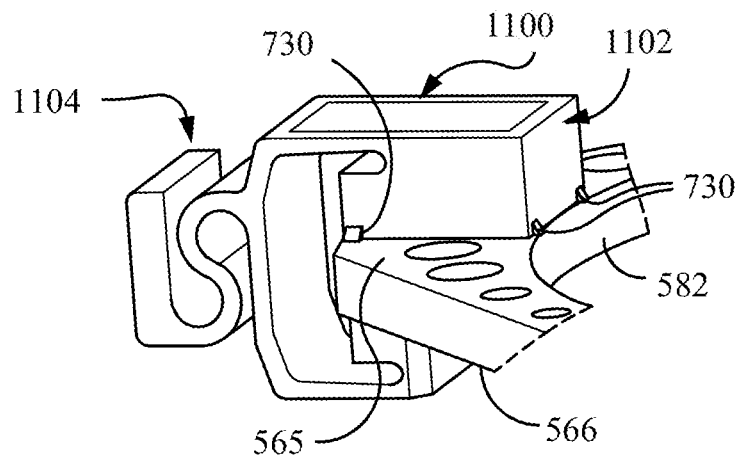
FIG. 33 is a perspective view of a portion of the sensor assembly shown in FIG. 31.

Continuing with FIGS. 33-35, each strain gauge member 1100 includes a support portion 1102 and a biasing portion 1104 that extends from the support portion 1102 along a strain gauge member axis 1106. The strain gauge member 1100 can have a first end 1101a that is defined by the biasing portion 1104 and a second end 1101b that is defined by the support portion 1102. In accordance with the illustrated embodiment, the strain gauge member axis 1106 can be aligned with direction of force application when the strain gauge member 1100 is attached to the support member 560.

Accordingly, the strain gauge member axis 1106 is aligned, for instance coaxial, with the first axis 776 or the second axis 778. For ease of illustration, the strain gauge member 1100 will be described with reference to the first axis 776. The biasing portion 1104 is configured to bias against the recess side wall 438 of the subassembly 400 when the strain sensor assembly 550 is placed inside the recess P2, such that the strain sensor assembly 550 has an interference fit with the recess side wall 438. In particular, when strain sensor assembly 550 is inserted in the recess P2 the first pair of strain gauge members 1100*a* and 1100*b* form an interference fit with the recess side wall 438 and the second pair of strain gauge members 1100*c* and 1100*d* form an interference fit with a different portion of the recess side wall 438.

Continuing with FIGS. 33-35, the support portion 1102 includes a support wall 1114, a support plate 1124 and a pair of bending walls 1113 and 1117 that extend from support wall 1114 toward the support plate 1124. The first bending wall 1113 connects the support wall 1114 to the support plate 1124. The second bending wall 1117 connects the support wall 1114 to the support body portion (not numbered) below the support plate 1124. The bending walls 1113, 1117 and support plate 1124 extend along the axis 1106 in a direction away from the support wall 1114 and the biasing portion 1104. In accordance with the illustrated embodiment, the strain gauge member body 1108 defines an upper surface 1110, a lower surface 1112 spaced from the upper surface 1110 along a vertical direction 1105 that is substantially perpendicular to the axis 1106. The support wall 1114 extends between the upper and lower surfaces 1110 and 1112, and includes an outer transverse surface 1154 and an opposed inner transverse surface 1156. The body 1108 includes first and second transverse surfaces 1116 and 1118 that are spaced from and opposite the support wall 1114 along the axis 1106. The first bending wall 1113 and a second bending wall 1117 extend between and connect the support wall 1114 to the support plate 1124.

Continuing with FIGS. 33-35, the support plate 1124 can carry the strain sensor 1200 along the upper surface 1110 and also connect to the support member 560 along a contact surface 1128 that is opposite a portion of the upper surface 1110. The support plate 1124 can be defined by opposed side walls 1120 and 1122 along the vertical direction 1105. The support plate 1124 also defines a ledge 1126 that includes the contact surface 1128 spaced from the upper surface 1110 along the vertical direction 1105. The contact surface 1128 is configured to engage with the upper surface 564 of the support member 560. The support plate 1124 defines at least a portion of the upper surface 1110, the first transverse surface 1116, and the second transverse surface 1118. The second transverse surface 1118 is configured to engage the abutment wall 586 of the support member 560. The support member abutment wall 586 can be referred to as the first abutment surface 86 and the second transverse surface 1118 can be referred to as a second abutment surface 1118.

As shown in FIGS. 33-35, the body 1108, and in particular the first bending wall 1113 includes a first inner surface 1111 opposed to the upper surface 1110. The second bending wall 1117 includes a second inner surface 115 opposed to the lower surface 1112. The body 1108 also includes a wall 1121 facing and opposite the inner transvers surface 1156. The wall 1121 is defined by the support body portion (not numbered) that extends between the slots 1132*a* and 1132*b*. The inner transverse surface 1156, first inner surface 1113, wall surface 1121, and second inner surface define a body inner surface 1152. The body 1108, for instance the body inner surface 1152, defines a cavity 1130 that extends along a transverse direction 107 between the sides walls 1120 and 1122. The transverse direction 1107 is substantially perpendicular to the axis 1106 and the vertical direction 1105. The body 1108 defines a pair of slots 1132*a* and 1132*b* that extend into the support plate 1124 along the axis 1106 toward the transverse surface 116. The slots 1132 terminate where the first and second bending walls 1113 and 1117 connect to the plate 1124.

Referring FIGS. 33-35, the body 1108 defines a plane 1158 that is perpendicular the upper and lower surfaces 1110 and 1112 and pass along, or intersects terminal ends (not numbered) of the slots 1132*a* and 1132*b*. The first and second bending walls 1113 and 1117 extend from the support wall 1114 to the plate 1124. In this regard, the first and second bending walls 1113 and 1117 define a length 1119 that extends from the support wall surface 1156 to the plane 1158. Further, the first and second bending walls 1113 and 1117 taper as the walls 1113 and 117 extend along the axis 1106 toward the plate 1124. The body 1108, for instance the support wall 1114, defines a transverse height 1160 that extends from the upper surface 1110 to the lower surface 1112. The support wall 1114 also defines a thickness 1162 that extends from the outer surface 1154 to the inner surface 1156. The body 1108 is configured such that the support wall 1114 may have a greater resistance to bending than the bending walls 1113 and 1117. In other words, the support wall 1114 can be said to be stiffer than the walls 1113 and 1117. For instance, the thickness 1162, length 1119 and height 1160 can be selected so that walls 1113 and 1117 can flex or bend in response to a load 1121 applied normal the outer surface 1154 along the axis 1106. When a load 121 is applied normal to the support wall 1114, the walls 1113 and 1117 bend outwardly and away from each other along the vertical direction 1105. The bending of the walls 1113 and 1117 create a tensile stress toward the center of the first and second bending walls 1113 and 1117 and compressive stresses at the bending walls 1113 and 1117 closer to the support wall 1114. The strain gauge member 1100 is configured to create tensile and compression amplification zones 1212 and 1214 along the upper surface 1110, as further detailed below.

Referring FIGS. 33-35, the biasing portion 1104 includes a biasing member 1134 and an endplate 1136 spaced apart from the support wall 1114 along the axis 1106 in an extended position. The biasing member 1134 couples the support wall 1114 to the endplate 1136. The endplate 1136 is configured to contact the recess side wall 438 when the strain sensor assembly 50 is disposed in the recess. Thus, the endplate 1136 defines an engagement surface 1138 that is disposed along vertical direction 1105 so as to face the recess side wall 438. Accordingly, the engagement surface 1138 can be opposed to the first and second abutment surfaces 586 and 1118 described above. Further, the biasing member 1134 biases the endplate 1136 outwardly away from the support wall 1114 in an extended position. The biasing member 1134 is also configured so that, in response to a force applied to the endplate 1136 along the axis 1106, the endplate 1136 is deflected toward the support wall 1114 into a loaded position. In accordance with the illustrated embodiment, the biasing member 1134 has a serpentine shape. It should be appreciated that the biasing member 1134 can be a spring, for instance a helical spring, or leaf spring. The biasing member 1134 can be any structure or device that can bias the endplate 1136 away from the support wall 1114 yet allow the endplate 1136 to deflect toward the support wall 1114 when a force is applied to the endplate 1136 along the axis 1106.

Referring FIGS. 31, 33-35, the strain sensor assembly 550 is configured to have a first or initial configuration and an installed configuration. The initial configuration is when the strain sensor assembly 550 is outside of the recess and the respective endplates 1136 are in their extended positions. When the strain sensor is in the installed configuration, for instance placed in the recess P2, the biasing member 1134 urges the endplate 1136 against the recess side wall 438, applying a force against the recess side wall 438. Further, the biasing member 1134 causes the opposing strain gauge member abutment surface 1118 to apply an opposing force against the abutment wall 586. When the endplates 1136 of each pair of strain gauge members 1100a and 1100b engage the recess side wall 438, the strain sensor assembly 550 has an interference fit with the recess side wall 438.

Referring FIGS. 33-36, in a preferred example of the strain gauge member 1100, the body 1108 is configured so that when a force or load 1121 is applied normal to the plate 1136 along the axis 1106, both tensile and compression components are applied along the upper surface 1110. The body 1108 can define at least one plane 1166a (and/or 1166b) that extends along the upper and/or lower surfaces 1110 and 112. When a force 1121 is applied normal to the plate 1136, tensile and compression stress are created along at least one plane 1166a and 1166b defined by the body 1108, the plane 1166a and/or 1116b being parallel to the direction along which the force 1121 is applied. As will be further detailed below, when a force 1121 is applied the strain gauge member 1100, the body 1108 creates tensile and compression amplification zones 1212 and 1214. The load amplification zones 1212 and 1214 improve load detection capabilities not realized in typical strain sensors.

Continuing with FIG. 35, each strain gauge sensor 1200 is supported by the support plate 1124 along the upper surface of the body 1108. Various strain gauge configurations can be used in accordance with the present disclosure. For instance, the strain gauge sensor according to one embodiment is a thin film strain gauge sensor 1220 or "thin film sensor." In other embodiments, the strain gauge sensor 1200 can be a bonded foil strain gauge. Any strain gauge implementation can be used on strain gauge sensor 1200.

When the strain sensor assembly 550 is placed in the recess P1, P2 or P3 and subject to a load, strain is distributed along the strain gauge sensor 1200 such that tensile and compressive components of strain are spaced apart from each other along the axis 1106. For instance, when a load 1121 is applied to the strain gauge member 1100 along the axis 1106, via the recess side wall 438, the tensile strain components are arranged along the plane 1166a aligned with the surface 1110 above the support wall 1114 and cavity 1137 of the strain gauge member 1100. Compressive strain components are concentrated along the plane 1166a aligned with the surface 1110 above the terminal end (not numbered) of the upper most slot 1132. It can be said that the strain gauge sensor 1200 has a tensile amplification zone 1212 and a compression amplification zone 1214 spaced from the tensile amplification zone along the axis 1106. The strain gauge member 1100 thus has a structure that magnifies or concentrates the deformation from the load applied to the strain gauge member 1100, for instance which would be loads applied the subassembly 400. In this regard, stress risers are produced at the respective tensile and compression amplification zones 1212 and 1214 that concentrate the tensile and compressive strain components applied to the strain gauge member 1100 at the respective amplification zones. Because the tensile and compressive strain component loads are amplified along the respective strain gauge, the strain gauge member 1100 amplifies the resistance change detected across a series of strain gauge members 1100 connected in a circuit, when such loads are applied to the strain sensor assembly 550. Because the resistance change due to a respective load is amplified, the signal generated by strain sensor assembly 550 has less noise and voltage amplifiers are not required to generate the signal indicative of the applied load. It should be appreciated that in certain applications, a voltage amplifier could be used.

Figure 37:
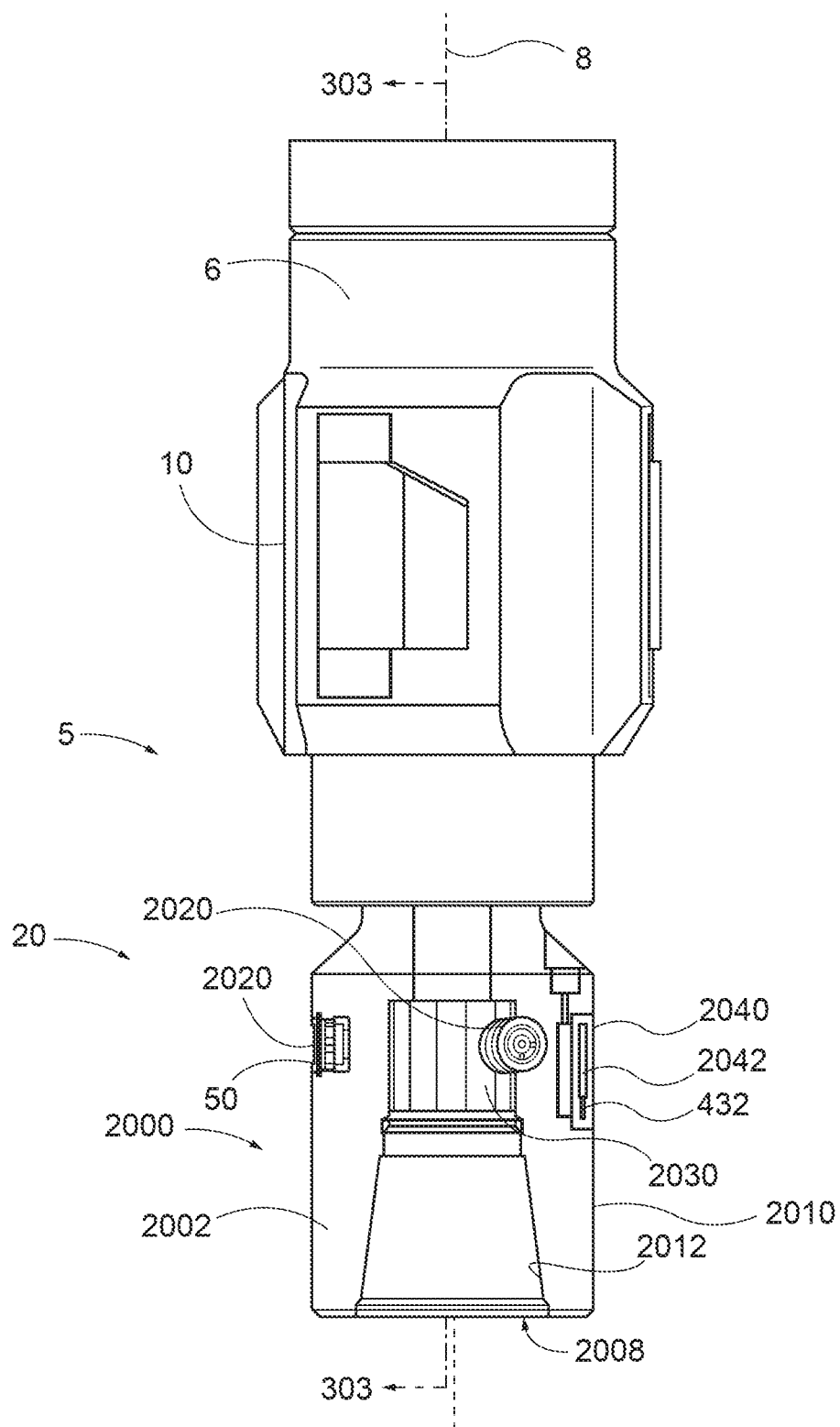
FIG. 37 is a side view of a portion of the drill string component showing a measurement sub assembly, according to another embodiment of the present disclosure.
Figure 38:
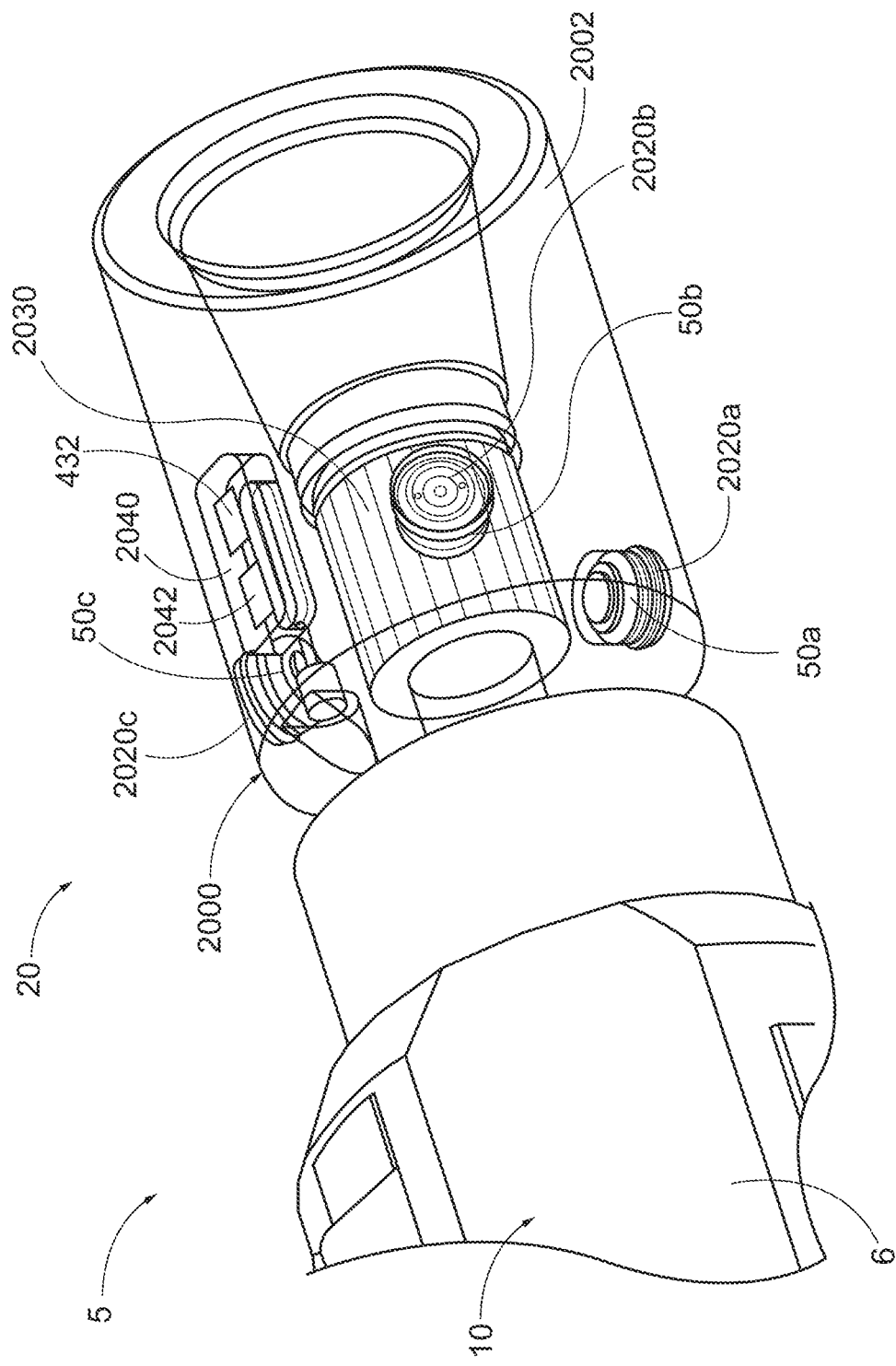
FIG. 38 is a detailed perspective view of the portion of the drill string show in FIG. 37.
Figure 39:
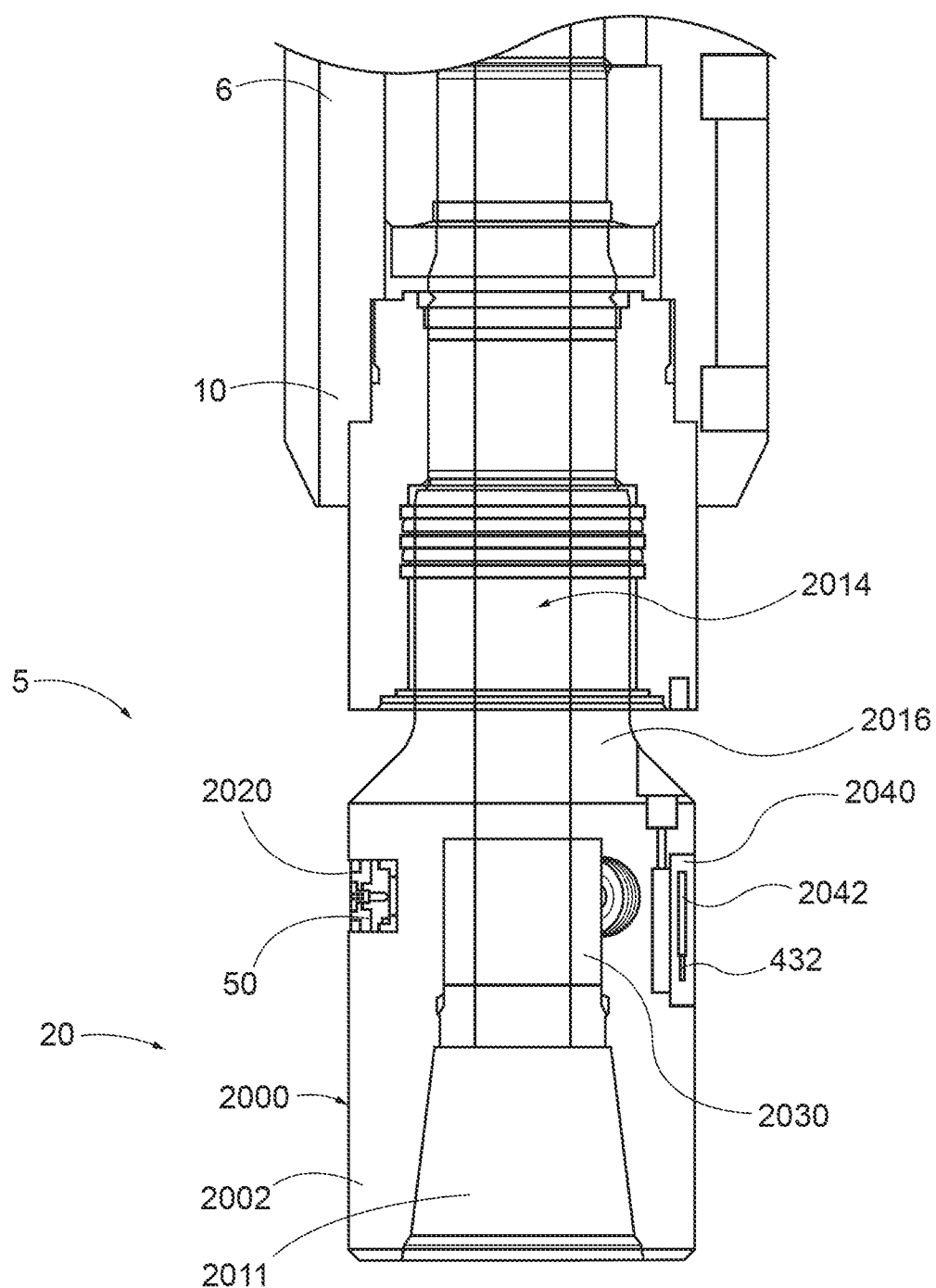
FIG. 39 is a cross-sectional view of the portion of the drill string show in FIG. 37 taken along lines 303-303.

FIGS. 37-39 illustrates an alternative configuration for the force measurement system 20. As illustrated, the drill string component 6 includes a housing (not numbered) that supports the steering module 10. In accordance with the alternative embodiment, the drill string component 6 includes a measurement subassembly 2000 that partially defines a bit box configured to be coupled to a drill bit 13 (drill bit 13 not shown in FIGS. 37-39). The measurement subassembly 2000 includes a body 2002 that carries at least one sensor 50, a controller 432, a communications module 2042 in communication with both the controller 432 and the steering module 10. The measurement subassembly 2000 can also include a power source 2030 that supplies power to the sensor 50, the controller 432, and communications module 2042.

Each sensor 50 is configured to obtain data indicative of one or more forces applied to the subassembly 2000 and/or brill bit 13 during the drilling operation. Furthermore, the measurement subassembly 2000 can include one sensor 50 up to a plurality of sensors, such as three sensors or sensor assemblies 50a, 50b, and 50c (FIG. 38). Regardless of the specific type and number of sensors uses, each sensor is configured to obtain data indicative of one or more forces applied to the subassembly 2000 during the drilling operation. For instance, the sensors 50a, 50b, and 50c can be configured to detect one or more forces applied to the drill bit. It should be appreciated that sensors 50a, 50b, and 50c can be one or strain gauges 450 as described above an illustrated in FIGS. 19-27. Furthermore, the sensors 50a, 50b, and 50c can be configured as strain gauges 405 can be connected together along bridges disposed on along a circuit with controller 432 and communications module 2042, similar to circuit 480 as shown in FIG. 27. In other configurations, the sensors 50 are substantially similar the strain sensor assembly 550 described above and illustrated in FIGS. 28-37.

Continuing with FIGS. 37-39, the measurement subassembly body 2002 extends along a central axis 8 of the drill sting as discussed above, and defines an outer surface 2010 and an inner surface 2012 spaced from the outer surface 2010 along a radial direction (not numbered) toward the central axis 8 and perpendicular to the central axis 8. The inner surface 2012 defines a passage 2008 that extends along axis 8. The passage 2008 includes a downhole portion 2011 and an uphole portion 2014 (FIG. 39). The downhole portion 2011 of the passage 2008 is tapered radially outwardly so as receive a portion of the drill bit 13 (not shown). The inner surface 2012 of the body at the downhole portion 2011 of the passage 2008 can include connection members, such as threads, for connecting the drill bit 13 to the subassembly body 2000. The uphole portion 2014 of passage 2008 is configured to allow drilling mud to pass therethrough into to the drill bit 13. The body 2002 includes a shaft portion 2016 extends uphole from area defining the bit box. The shaft portion 2016 can be connected to the drive shaft assembly 31 of steering module 10 or it can be integral with the draft shaft assembly 31 as needed. When the drill bit 13 is coupled to the measurement assembly 2000, the distance from a uphole shoulder of the drill bit 13 to the at least one pocket or recess is up to about between about 6 inches to about 36 inches.

Continuing with FIGS. 37-39, The body 2002 can define plurality of pocket or recesses 2020a, 2020b, and 2020c each configured to receive respective sensor 50a, 50b, and 50c. An additional pocket 2040 is sized to carry the controller 432 and communications module 2042. The pockets 2020 and 2040 can be sealed the hatch covers similar to the subassembly 400 described above. The body 2002 further defines passageways (not shown) that interconnect the pockets 2020a, 2020b, 2020c, and 2040. Pockets 2020a, 2020b, and 2020c are similar to the pockets P1, P2 and P3 discussed above and shown in FIG. 19 and FIG. 28. In the illustrated embodiment, the first pocket 2020a, second pocket 2020b, and third pockets 2020c are aligned along a plane 407 that is perpendicular to the central axis 8. Furthermore, each respective pocket 2020a, 2020b, and 2020c receives a respective sensor. The passageways include conductors that can be used to build one or more Wheatstone bridges across the sensors positioned in the pockets 2020a, 2020b, and 2020c. With the sensors 50a, 50b and 50c arranged along the Wheastone bridges as described above, the controller 432 can determine magnitude of force components of the forces applied the subassembly 2000.

In operation, the sensors 50a-50c, in conjunction with at least one controller 432 are configured to determine the magnitude of bending stress applied to the drill bit as well as the direction in which the bending has occurred. The Wheatstone bridges containing the sensors 50a-50c are configured to result in voltage drop upon application of a load to portion of the subassembly 2000 proximate pockets/sensors 50a-50c. The detected voltage drop is relayed to amplifier, if need, and then a voltage detector or meter. The voltage signals are received by the controller 432, which digitizes the voltage signals. Based on the digitized signals, the controller 432 determines the magnitude of the force components applied to subassembly 400, and as well as the direction along which the forces were applied to the subassembly 400. The magnitude of the forces component and their direction of application can be referred to a force response data. The controller 432 relays force response data to the communications module 2042. The communications module 2042 transmits the force response data to the controller 118 of the steering module 10 through a communication means, such as short-hop telemetry system or type of wireless system. Based on the force response data, the controller 118 can cause the steering module 10 to guide the drill bit 13 back toward the intended well path.

Accordingly, an embodiment of guidance system 5 as described herein is a control system configured to detect and correct drill bit deviations during drilling. The control system can include the sensors, force measurement system controller, communications modules, and steering module controller. The steering module controller 118 is configured to, in response to receipt of the force response data regarding forces applied to the subassembly from the communications module, determine 1) if the one or more forces applied to the drill bit 13 has caused the drill bit to deviate from an expected well path, and 2) cause steering module 10 to redirect the drill bit 13 in a direction toward the planned well path. In particular, the controller 118 can cause one or more of the three actuating arms 112 (FIG. 2) to extend and retract on a selective basis to push the drill bit 13 in a desired direction. Based on the magnitude and the direction of force applied to subassembly and bit box, the controller 118 determines the angular positions at which the valves 120 need to open based on the how far the drill bit 14 has deviated from the well path. The controller 118 then causes the appropriate arms 112 to extend out so as to guide the drill bit 13 back toward the intended well path.

In accordance with another embodiment of the present disclosure, there is provided a method for guiding a drill bit carried by a drill string. The method includes the step of causing the drill bit define the borehole in the earthen formation along a well path. The method also includes, obtaining, via at least one sensor, a force response data indicative of one or more forces applied to the drill bit that has caused the drill bit to deviate from the well path. Based on the force response data, the method can include causing the drill bit define the borehole along the planned well path. As noted above, the method can also include causing, via a at least one controller, a steering module, e.g. a RSM module, to redirect the drill bit from drilling along a first direction that is offset from the planned well path toward a second direction that is aligned with the planned well path. In addition, the method can include transmitting, via a communications system, the force response data to the at least one controller of the steering module 10. For instance, a communications module can transmit the signals the one or more the controllers.

In accordance with another embodiment of the present disclosure, there is provided a method for measuring one or more forces applied to subassembly adjacent the drill bit during a drilling operation. The method can include the step of causing the drill bit to define the borehole in the earthen formation as noted above. The method can also include measuring, via at least one strain gauge carried by subassembly that is positioned adjacent to the drill bit, a magnitude of the force components and a direction along which the one or more forces are applied to subassembly as the drill bit defines the borehole. The method includes transmitting, via communications system, a respective signal from the at least one strain gauge to the at least one controller. In sequence or simultaneously with the aforementioned steps, the method includes processing, via the at least one controller, the respective at least one signal into force response data. As noted above, force response data is indicative of the magnitude and the direction of the one or more forces applied to the measurement subassembly and/or drill bit.

In accordance with another embodiment of the present disclosure, there is provided a method for assembling a drilling system. The method includes the step of configuring at least one sensor carried by the drill string component to detect one or more forces applied to the drill bit or a subassembly proximate the drill bit during the drilling operation. The method can also include connecting the at least one sensor to a communications module so that the communications modules can transmit force response data obtained from the at least one sensor to at least one controller of the steering module 10. In addition, the method can include configuring the at least on controller of a force measurement system to 1) determine if a direction of the drill bit has changed in response the one or more forces applied to the drill bit during the drilling operation, and 2) if the direction of the drill bit has changed in response to the one more forces, cause a steering module, such as and RSM system, to redirect the drill bit along the planned well path.

Embodiments of the present disclosure include the guidance system 5 configured to guide the direction a drill bit 13 as described above. The guidance system 5 is deployed in the downhole tool 6 that is configured to be coupled directly to the drill bit 13. As used herein, the bottom hole assembly 11 includes one or more sensing modules, such as MWD or LWD tool, the downhole tool 6, a drill bit 13. As noted above, the downhole end of the tool 6 may be referred to as the bit box and includes one or more sensors. Accordingly, the sensors are positioned to be in alignment with or in close proximity to the drill bit 13 when the drill bit 13 is attached the tool 6 and can obtain drilling data indicative of forces applied to drill bit 13 is subjected to during drilling as the drill bit 13 drills through the formation. In one embodiment, the sensors can be aligned with a portion of the drill bit 13 along a direction that is perpendicular to the central axis 8.

While sensors are described as being carried by the subassembly 400 and 2000, in certain alternative embodiments, one or more sensors can be carried by the drill bit 13 directly.

The foregoing description is provided for the purpose of explanation and is not to be construed as limiting the invention. While the invention has been described with reference to preferred embodiments or preferred methods, it is understood that the words which have been used herein are words of description and illustration, rather than words of limitation. Furthermore, although the invention has been described herein with reference to particular structure, methods, and embodiments, the invention is not intended to be limited to the particulars disclosed herein, as the invention extends to all structures, methods and uses that are within the scope of the appended claims. Those skilled in the relevant art, having the benefit of the teachings of this specification, may affect numerous modifications to the invention as described herein, and changes may be made without departing from the scope and spirit of the invention as defined by the appended claims.

I claim:

1. A downhole guidance tool configured to control a direction of a drill bit through an earthen formation, the downhole guidance tool comprising:
    a steering module configured to transition between an inactive configuration and an active configuration to control direction of the drill bit;
    a measurement sub that extends from the steering module in a downhole direction, the measurement sub having an uphole portion, a downhole portion spaced from the uphole portion in the downhole direction, and a bit box at the downhole portion;
    a sensor carried by the downhole portion, the sensor being configured to obtain measurements indicative of one or more forces applied to the drill bit during a drilling operation and when the drill bit is coupled to the bit box;
    a plurality of members configured to extend and push the drill bit;
    a first controller configured to process the measurements indicative of the one or more forces applied to the drill bit obtained by the sensor during the drilling operation into force response data; and
    a second controller configured to, based on the force response data, determine 1) if the one or more forces applied to the drill bit has caused the drill bit to deviate from a planned well path, and 2) if the one or more forces applied to the drill bit has caused the drill bit to deviate from the planned well path, cause the steering module to transition from the inactive configuration into the active configuration and independently control the plurality of members sequentially to redirect the drill bit in a direction toward the planned well path.

2. The downhole guidance tool of claim 1, wherein the steering module has at least one movable member that is configured to transition between the inactive configuration and the active configuration to control direction of the downhole guidance tool.

3. The downhole guidance tool of claim 1, wherein the at least one sensor is at least one strain gauge positioned in the downhole portion of the measurement sub.

4. The downhole guidance tool of claim 1, wherein the at least one sensor is a plurality of sensors arranged along one or more Wheatstone bridges.

5. The downhole guidance tool of claim 1, further comprising a power source configured to supply power to the at least one sensor.

6. The downhole guidance tool of claim 1, wherein the measurement sub defines at least one recess that receives the at least one sensor therein, wherein when the drill bit is coupled to the measurement sub, the distance from a shoulder of the drill bit to the at least one recess is between about 6 inches and about 30 inches.

7. The downhole guidance tool of claim 1, further comprising a steering sub that carries the steering module, wherein the plurality of members extend outwardly relative to the steering sub.

8. A downhole guidance tool configured to control a direction of a drill bit through an earthen formation, the downhole guidance tool comprising:
    a steering module configured to transition between an inactive configuration and an active configuration to control direction of the drill bit;
    a measurement sub that extends from the steering module in a downhole direction, the measurement sub having an uphole portion, a downhole portion spaced from the uphole portion along the downhole direction, at least one recess, and a bit box located at the downhole portion;
    at least one member housed in the at least one recess and configured to extend and push the drill bit;
    a first controller configured to process measurements indicative of one or more forces applied to the drill bit obtained during a drilling operation into force response data; and
    a second controller configured to, based on the force response data, determine 1) if the one or more forces applied to the drill bit has caused the drill bit to deviate from a planned well path, and 2) if the one or more forces applied to the drill bit has caused the drill bit to deviate from the planned well path, cause the steering module to transition from the inactive configuration into the active configuration and independently control the at least one member to redirect the drill bit in a direction toward a planned well path.

9. The downhole guidance tool of claim 8, further comprising a sensor carried in the at least one recess, the sensor being configured to obtain measurements indicative of the one or more forces applied to the drill bit during the drilling operation.

10. The downhole guidance tool of claim 9, wherein the sensor is at least one strain gauge positioned in the downhole portion of the measurement sub.

11. The downhole guidance tool of claim 9, wherein the sensor is a plurality of sensors arranged along one or more Wheatstone bridges.

12. The downhole guidance tool of claim 9, further comprising a power source configured to supply power to the sensor.

13. The downhole guidance tool of claim 8, wherein when the drill bit is coupled to the measurement sub, the distance from a shoulder of the drill bit to the at least one recess is between about 6 inches and about 30 inches.

14. The downhole guidance tool of claim 8, further comprising a linear measurement sub that replaces a bent sub.

15. The downhole guidance tool of claim 8, further comprising a first actuating arm, a second actuating arm, and a third actuating arm.

\* \* \* \* \*